United States Patent
Blank et al.

(10) Patent No.: US 9,875,434 B2
(45) Date of Patent: Jan. 23, 2018

(54) METHOD OF PRINTING A PLURALITY OF SECTIONS OF A COMPLETE IMAGE

(71) Applicant: KOENIG & BAUER AG, Würzburg (DE)

(72) Inventors: Alexander Blank, Würzburg (DE); Frank Huppmann, Zell am Main (DE); Christian Jank, Dresden (DE)

(73) Assignee: Koenig & Bauer AG, Wurzburg (DE)

( * ) Notice: Subject to any disclaimer, the term of this patent is extended or adjusted under 35 U.S.C. 154(b) by 0 days.

(21) Appl. No.: 14/904,993

(22) PCT Filed: Jul. 16, 2014

(86) PCT No.: PCT/EP2014/065214
§ 371 (c)(1),
(2) Date: Jan. 14, 2016

(87) PCT Pub. No.: WO2015/007764
PCT Pub. Date: Jan. 22, 2015

(65) Prior Publication Data
US 2016/0155030 A1   Jun. 2, 2016

(30) Foreign Application Priority Data
Jul. 17, 2013   (DE) ........................ 10 2013 214 025

(51) Int. Cl.
*G06K 15/02*   (2006.01)
*B41F 19/00*   (2006.01)
*G06K 15/10*   (2006.01)

(52) U.S. Cl.
CPC .......... *G06K 15/022* (2013.01); *B41F 19/007* (2013.01); *G06K 15/102* (2013.01);
(Continued)

(58) Field of Classification Search
None
See application file for complete search history.

(56) References Cited

U.S. PATENT DOCUMENTS

| 4,721,969 A | 1/1988 | Asano |
| 5,984,446 A | 11/1999 | Silverbrook |

(Continued)

FOREIGN PATENT DOCUMENTS

| DE | 10111216 A1 | 9/2001 |
| DE | 102007040402 A1 | 3/2009 |

(Continued)

OTHER PUBLICATIONS

International Search Report of PCT/EP2014/065214.

*Primary Examiner* — Dung Tran
(74) *Attorney, Agent, or Firm* — Mattingly & Malur, PC

(57) ABSTRACT

A method for printing a strip-shaped material to be printed uses a printing unit of a roller printer. Output data for actuating at least one printing machine printing unit component, which determines the shape of printing images, is generated from stored template image data of a complete printing image in order to generate a printed complete printing image. The complete printing image is determined or described in a primary data packet, and the dimensions of the complete image, which dimensions are measured in a template direction, are assigned to the complete printing image in the template image data or the primary data packet. The dimensions of the complete image are compared with a threshold, and if the threshold is exceeded, the complete printing image is divided into a plurality of sections with respect to the template direction, with the plurality of sections being determined or described in a plurality of secondary data packets. The sections are produced on the material to be printed by printing processes which are carried out by the printing unit and during each of which, output data, based on at least one of the secondary data packets, is processed.

15 Claims, 15 Drawing Sheets

(52) U.S. Cl.
 CPC ..... *G06K 15/1843* (2013.01); *G06K 15/1863*
  (2013.01); *G06K 15/1896* (2013.01)

(56) References Cited

U.S. PATENT DOCUMENTS

| | | | | |
|---|---|---|---|---|
| 6,833,930 | B2* | 12/2004 | Nishikawa | ............. H04N 1/393 |
| | | | | 358/1.18 |
| 8,098,398 | B2* | 1/2012 | Takasaki | ............... G06F 3/1207 |
| | | | | 358/1.18 |
| 2003/0202211 | A1* | 10/2003 | Yudasaka | ............. H04N 1/3875 |
| | | | | 358/1.18 |
| 2010/0171975 | A1 | 7/2010 | Pumomo | |
| 2010/0321429 | A1 | 12/2010 | Saito et al. | |
| 2011/0304886 | A1 | 12/2011 | Hoover et al. | |
| 2012/0081726 | A1 | 4/2012 | Nakamaru | |
| 2013/0258361 | A1* | 10/2013 | Qian | ...................... G06K 15/02 |
| | | | | 358/1.9 |
| 2014/0104360 | A1* | 4/2014 | Hacker | ...................... B41J 3/60 |
| | | | | 347/104 |
| 2014/0184710 | A1* | 7/2014 | Hacker | ...................... B41J 3/60 |
| | | | | 347/102 |
| 2015/0212771 | A1* | 7/2015 | Hori | ...................... G06F 3/1241 |
| | | | | 358/1.18 |
| 2015/0213339 | A1* | 7/2015 | Sawada | ...................... G06F 3/12 |
| | | | | 358/1.15 |
| 2016/0107447 | A1* | 4/2016 | Reder | .................. B41J 2/16517 |
| | | | | 347/22 |

FOREIGN PATENT DOCUMENTS

| | | |
|---|---|---|
| DE | 102009051197 A1 | 5/2011 |
| DE | 102011076899 A1 | 12/2012 |
| EP | 2202081 A1 | 6/2010 |
| EP | 2390101 A2 | 11/2011 |
| JP | 2003-63707 A | 3/2003 |
| WO | 2005/031470 A1 | 4/2005 |
| WO | 2009/005766 A2 | 1/2009 |

* cited by examiner

METHOD OF PRINTING A PLURALITY OF SECTIONS OF A COMPLETE IMAGE

CROSS-REFERENCE TO RELATED APPLICATIONS

This application is the U.S. National Phase, under 35 U.S.C. § 371, of PCT/EP2014/065214, filed Jul. 16, 2014, published as WO 2015/007764A1 on Jan. 22, 2015 and claiming priority to DE 10 2013 214 025.8, filed Jul. 17, 2013, the disclosures of which are expressly incorporated herein by reference.

FIELD OF THE INVENTION

The invention relates to a method for printing a material to be printed.

BACKGROUND OF THE INVENTION

A variety of different printing methods for use in printing machines are known. Such printing methods include, for example, printing methods that do not involve a fixed printing forme. This enables each printed product to be produced individually. As a result, personalized printed products can be produced and/or, since printing formes are dispensed with, small print runs of printed products can be produced at low cost. One such printing method is inkjet printing or ink-jet printing. In this method, individual droplets of coating medium are ejected through nozzles of print heads and are transferred to a printing material so as to produce a printed image on the printing material. By actuating a plurality of nozzles individually, different printed images can be produced.

The precise alignment of printed images on the front and back sides of a printing material that is printed on both sides is referred to as register (DIN 16500-2). In multicolor printing, the merging and precise correlation of individual printed images of different colors to form a single image is referred to as color-to-color registration (DIN 16500-2). Suitable measures are also necessary in inkjet printing in order to maintain color-to-color registration and/or register.

EP 2 202 081 A1 and JP 2003-063707 A each disclose a printing machine, wherein the printing machine comprises a first printing unit and a dryer, and the first printing unit comprises a central cylinder with a separate drive motor assigned to the first central cylinder and at least one inkjet print head.

DE 10 2011 076 899 A1 discloses a printing machine which has at least one printing unit and at least one print head embodied as an inkjet print head.

In inkjet printing, print heads which customarily each have a plurality of nozzles are used. Depending on the printing image, for example depending on the division thereof into color separations, various nozzles will not eject any coating medium for a longer or shorter period of time. Sometimes, when a nozzle has been in resting mode for an extended period of time, the nozzle will not react properly the next time it is activated and, for example, will eject at least one required droplet too late or not at all. This may be caused, for example, by changes in the coating medium when it comes in contact with the ambient air in the region of the nozzle and/or by changes in the nozzle itself, for example by changes in temperatures or by the decay of vibrations of individual components. Methods are known in which, in addition to desired printing images, predetermined preventive maintenance printing images are produced at regular intervals to perform preventive maintenance on all nozzles, and thus to achieve a constant readiness to print on demand at any time. Such preventive maintenance printing images may be strips, for example, which are printed between individual complete printing images and are optionally cut off of the printing material during post-processing. From EP 2 390 101 A2, a method is known in which, to maintain print quality in an inkjet printing process, additional droplets are ejected in addition to the printing image. It is also known to superimpose the actual printing image with an additional printing image, which appears as a finely dispersed pattern of dots in the background of the actual printing image, and for which each nozzle is actuated at least once.

A printed product in the above and in the following is understood particularly as a finished product which is printed and is optionally folded and/or cut to size. Various types of printed products exist, for example printed products consisting of only a single page. In that case, for example, sheets of printing material of the proper size are imprinted, or webs of printing material are imprinted and then cut. Other types of printed products comprise a plurality of individual pages that are printed on at least one common printing material, in particular at least one common printing material web, in which case the printing material is then folded, for example in at least one folding device, and cut. Depending on the type of folding device and/or the method for controlling said at least one device, the individual pages must be printed in a certain arrangement on the printing material so that, once they have been folded, a correct orientation and sequence of the individual pages is ensured. This specific arrangement of individual pages is called a complete printing image or signature, for example. A complete printing image can consist of two rows of four separate pages each, for example, wherein the individual pages of a first of the two rows are oriented upside-down, for example, as compared with the individual pages of a second of the two rows. A first complete printing image is applied to the printing material by means of a first printing unit, for example, and a second complete printing image is correspondingly applied to the printing material by means of a second printing unit, particularly correspondingly to a back side of the printing material. Additionally or alternatively, a complete printing image has a continuous printing image or motif which extends over substantially the entire printed product. This may also be the case with strip-shaped printing material. For example, a complete printing image may extend over substantially the entire width of the printing material.

Frequently, as the printing material is being transported between the first printing unit and the second printing unit, a deformation of the printing material can occur, for example a shrinkage due to a loss of moisture resulting from an intermediate drying process and/or a stretching resulting from a softening of the printing material by solvent and/or water that is applied along with the coating medium. A relative change in the corresponding dimensions of the printing material can be as much as 1% (one percent), for example. This can result in a registration and/or register that no longer meet the standards for quality. Such effects may have a more or less serious impact in different directions, for example, depending on the alignment of the paper fibers of the printing material, in particular they may have a less serious impact in the transport direction of the printing material than in the direction transversely to this transport direction.

From WO 2009/005766 A2 a printing machine is known which has two printing units with print heads aligned toward the same side of the printing material.

From WO 2005/031470 A1 a method is known in which toner images are produced based on bitmaps and in which, based on a projected shrinkage of a printing material, these bitmaps are modified during their generation with respect to the number of pixels to be printed.

From DE 101 11 216 A1 a method is known in which image data are modified to compensate for heat shrinkage, wherein an amount of heat shrinkage is first obtained through experimentation and corresponding data are stored in a memory.

From DE 10 2007 040 402 A1 a method is known in which changes in the dimensions of a printing material are compensated for by placing inkjet print heads in an inclined position.

From DE 10 2009 051 197 A1 a method is known in which rastered image data for inkjet printing are modified to compensate for web shrinkage.

From U.S. Pat. No. 4,721,969 a method is known in which image data for a thermal transfer printer are displaced or stretched to compensate for changes in the dimensions of a printing material.

From U.S. Pat. No. 2,010,171 975 A1 a method is known in which sheet-type printed products are produced by dividing a printed image up among a plurality of sheets since it is larger than the sheets at hand.

From U.S. Pat. No. 2,011,304 886 A1 a method is known in which the alignment of printed images on a front side and a back side of sheets is synchronized.

U.S. Pat. No. 2,010,321 429 A1 discloses an inkjet printing method in which ink droplets of different sizes are used.

SUMMARY OF THE INVENTION

The object of the present invention is to devise a method for printing a material to be printed.

The object is attained according to the invention by the printing of a strip-shaped printing material by at least one printing element of a web-fed printing machine. Output data for actuating at least one component of at least one first printing unit of the printing machine, which component determines at least one form of printing images, is generated from stored template image data of at least one complete printing image to produce at least one printed complete printing image. The at least one complete printing image is determined and described in a primary data packet. At least one complete image dimension, measured in a template direction, is assigned to the at least one complete printing image in the template image data or in the primary data packet. This at least one complete image dimension is compared with at least one threshold value. If the at least one complete image dimension of the at least one complete printing image exceeds the at least one threshold value, the at least one complete printing image is divided, with respect to this template direction, into a plurality of sections of the at least one complete printing image. The plurality of sections are determined and described in a plurality of secondary data packets. The plurality of sections of the at least one complete printing image are produced on the printing material by printing processes which are carried out by the at least one first printing unit and during each of which output data based on at least one of the secondary data packets is processed.

Preferred is a method for printing at least one first particularly strip-shaped material to be printed using at least one printing element of a printing machine, in particular a web-fed printing machine, wherein output data for actuating at least one component of at least one first printing unit of the printing machine, which component determines at least one form of printing images, are generated preferably from stored template image data of at least one particularly digitally stored first complete printing image in order to produce at least one first printed complete printing image, and wherein the at least one particularly digitally stored first complete printing image preferably will be and/or is determined and/or described in a primary data packet, and wherein at least one dimension of the complete image, measured in a template direction, is assigned to the at least one particularly digitally stored first complete printing image in the template image data and/or the primary data packet, and wherein this at least one complete image dimension is preferably compared with at least one threshold value, and wherein, if the at least one complete image dimension of the at least one particularly digitally stored complete printing image exceeds the at least one threshold value, the at least one first complete printing image is preferably divided with respect to said template direction into a plurality of sections of the at least one particularly digitally stored first complete printing image, and wherein the plurality of sections are preferably stored and/or described in a plurality of secondary data packets, and wherein the plurality of sections of the at least one particularly printed first complete printing image are produced on the at least one first printing material, preferably by means of printing processes which are preferably carried out by means of the at least one first printing unit and during each of which output data based on at least one of the secondary data packets are preferably processed.

Digital data which are determined, particularly described, in the secondary data packets preferably define, for each secondary data packet, an image in the form of a section of the image which is defined by digital data that are determined, particularly described, in the primary data packet.

A complete printing image has at least one or more individual pages, for example, or consists, for example, of only one print motif and/or only one page of corresponding size. A complete printing image of this type extends, for example, across the entire width of a printing material, with a section that preferably corresponds to at least twice and more preferably at least five times, and even more preferably at least ten times the width of the printing material along a direction of transport of the printing material and/or a processing direction of the complete printing image. The dimensions of the complete printing image preferably result from page description data of the corresponding complete printing image.

One advantage of this preferred method consists particularly in that a relatively small memory can be used for the secondary data packets and/or in that particularly large printing images that originate from a digital printing image template, in principle even printed printing images that extend infinitely in at least one direction, can be produced. If the data were not segmented, the process would be subject to limitation, for example, by the memory that is used for storing raster data, for example, which are then retrieved from said memory and converted to output data. Segmenting data packets that are too large for such a memory, for example, preferably enables very long printed printing images of high quality to be produced. In particular, the preferred use of a buffer and/or circular buffer and/or shift register enables gapless printing even at high printing speeds, since fewer large data memories must be emptied and refilled. In particular, this allows the emptying and/or filling of a corresponding data memory to be uncoupled from the reading of data from said data memory, for example. If, as is preferred, a primary data packet is segmented into a plurality of secondary data packets only when a threshold value is exceeded, and/or if said segmentation is performed by a machine controller and/or a printing data processing unit and/or by an algorithm stored therein, the process can be particularly flexible because, for example, a print shop that has printing machines of different configurations does not need to determine in advance what printing machine will be used and therefore how the data packets should be segmented. In particular, if each printing machine has its own configuration-dependent at least one threshold value, for example, unnecessary data processing costs can be avoided.

Particularly if the primary data packet contains template image data or geometrically modified template image data, sections can preferably first be produced from said data, and can then be converted to raster data or geometrically modified raster data. This allows the raster process to preferably be carried out using relatively small data packets in each case. This simplifies the handling of data during rastering and allows very large printing images to be printed.

Preferably, the method is alternatively or additionally characterized in that the plurality of sections of the at least one particularly printed complete printing image are produced on the same printing material.

Preferably, the method is alternatively or additionally characterized in that at least two of the sections of the same complete printing image differ in terms of their section dimensions in the template direction.

Preferably, the method is alternatively or additionally characterized in that each of the secondary data packets is smaller than the primary data packet in terms of the amount of storage space that is required.

Preferably, the method is alternatively or additionally characterized in that the at least one complete image dimension is compared with the at least one threshold value by a machine controller and/or a printing data processing unit of the printing machine itself and/or by means of at least one stored algorithm of a machine controller and/or printing data processing unit of the printing machine.

Preferably, the method is alternatively or additionally characterized in that the dimensions of each of the sections in the template direction do not exceed the at least one threshold value.

Preferably, the method is alternatively or additionally characterized in that the dimensions in the template direction of a plurality of sections of the at least one particularly digitally stored complete printing image produced therefrom are equal. Preferably, the method is alternatively or additionally characterized in that the dimensions in the template direction of a plurality of sections of the at least one particularly digitally stored complete printing image produced therefrom are equal to the threshold value.

Preferably, the method is alternatively or additionally characterized in that each secondary data packet contains data relating to precisely one section of the at least one particularly digitally stored complete printing image.

Preferably, the method is alternatively or additionally characterized in that the secondary data packets are loaded at least partly in sequence into at least one memory. Preferably, the method is alternatively or additionally characterized in that the secondary data packets are processed at least partly in sequence by means of at least one raster graphics processor. Preferably, the method is alternatively or additionally characterized in that the secondary data packets are read out at least partly in sequence from at least one memory.

Preferably, the method is alternatively or additionally characterized in that the at least one printing element is an inkjet printing element and/or in that the printing machine is an inkjet printing machine and/or in that the at least one component of the at least one first printing unit, which determines at least one form of printing images, is at least one inkjet print head of the at least one first printing unit printing machine and/or in that the respective output data are control data for respective nozzles to be used of print heads of at least one inkjet printing unit of the printing machine, and/or in that from the stored template image data of the at least one particularly digitally stored complete printing image, output data for actuating nozzles of print heads of the at least one first printing unit of the printing machine are generated, according to which coating medium is ejected through said nozzles of print heads in order to produce the at least one printed complete printing image.

Preferably, the method is alternatively or additionally characterized in that at least two of the sections of the same at least one particularly digitally stored complete printing image differ in terms of their section dimensions in the template direction characterized as the processing direction.

Preferably, the method is alternatively or additionally characterized in that the at least one particularly digitally stored complete printing image consists of only one print motif and/or only one individual page.

Preferably, the method is alternatively or additionally characterized in that the primary data packet contains page description data. Preferably, the method is alternatively or additionally characterized in that the primary data packet contains the template image data of the at least one particularly digitally stored complete printing image or template image data of the at least one particularly digitally stored complete printing image that have been geometrically modified by the stretching or displacement of individual pages. Preferably, the method is alternatively or additionally characterized in that the template image data or geometrically modified template image data are present in the form of a vector-based page description and/or as page description data.

Preferably, the method is alternatively or additionally characterized in that the at least one complete image dimension is a length of the at least one particularly digitally stored complete printing image, measured in the template direction.

Preferably, the method is alternatively or additionally characterized in that at least one length is assigned to the at least one particularly digitally stored complete printing image in the template image data and/or in the primary data packet.

Preferably, the method is alternatively or additionally characterized in that the sections each have a width that corresponds to the width of the at least one particularly digitally stored complete printing image, and/or in that the sections each have a length that results from the segmentation into secondary data packets and/or from a maximum processable size of secondary data packets.

Preferably, the method is alternatively or additionally characterized in that the template direction is characterized as the processing direction. Preferably, the method is alternatively or additionally characterized in that the processing direction is a direction in which a row of such image elements within an image, which are produced in the printing process by means of one and the same nozzle of a print head, are arranged consecutively in the template image data.

Preferably, the method is alternatively or additionally characterized in that the dimensions of each of the sections in the template direction differ from one another by deviations of no more than 5%.

Preferably, the method is alternatively or additionally characterized in that the threshold value that is used to determine whether the primary data packet will be segmented into secondary data packets and to determine the maximum size of the secondary data packets is based on the maximum volume of data that can be processed at any one time by the raster graphics processor and on the width of the particularly digitally stored complete printing image and on the resolution in image elements per unit of width in the widthwise direction of the printing material and on the resolution in image elements per unit of length in the lengthwise direction of the printing material.

Preferably, the method is alternatively or additionally characterized in that the threshold value is defined and/or stored as a unit of length. Preferably, the method is alternatively or additionally characterized in that the at least one complete image dimension is defined and/or stored as a unit of length. Preferably, the method is alternatively or additionally characterized in that the at least one section dimension is defined and/or stored as a unit of length.

Preferably, the method is alternatively or additionally characterized in that the plurality of sections of the at least one complete printing image are produced by printing processes which are carried out by means of the at least one first printing unit, during each of which output data based on at least one of the secondary data packets are processed.

Preferably, the method is alternatively or additionally characterized in that the at least one printed complete printing image is thereby produced on the same printing material. Preferably, the method is alternatively or additionally characterized in that the at least one printed complete printing image is produced without gaps on the at least one first printing material.

Preferably, the method is alternatively or additionally characterized in that pixels which are directly adjacent to one another in the template direction and which have been generated based on output data originating from the same secondary data packet are produced on the same printing material at the same distance from one another as the distance with which pixels which are directly adjacent to one another in this template direction and have been generated based on output data originating from different secondary data packets are generated on the same printing material.

Preferably, the method is alternatively or additionally characterized in that, at least occasionally, at least two of the sections of the at least one complete printing image are produced at least partially simultaneously on the same printing material. Preferably, the method is alternatively or additionally characterized in that, at least occasionally, output data that are based on at least two different secondary data packets are used simultaneously, each for producing a part of one of the sections of the particularly first complete printing image on the same printing material.

Preferably, the method is alternatively or additionally characterized in that the printing image data within each of the secondary data packets are present, at least at first, in the form of at least one vector-based page description. Preferably, the method is alternatively or additionally characterized in that the at least one secondary data packet contains page description data. Preferably, the method is alternatively or additionally characterized in that the secondary data packets each contain template image data or geometrically modified template image data. Preferably, the method is alternatively or additionally characterized in that the secondary data packets contain the same type of data as the primary data packet.

Preferably, the method is alternatively or additionally characterized in that the data contained in the secondary data packets are processed by means of at least one raster graphics processor. Preferably, the method is alternatively or additionally characterized in that the output data are generated directly or indirectly from packets of raster data resulting therefrom. Preferably, the method is alternatively or additionally characterized in that packets of raster data that are based on different secondary data packets are each used at least partly in sequence to generate output data for printed sections of the at least one complete printing image. Preferably, the method is alternatively or additionally characterized in that the secondary data packets and/or the raster data obtained therefrom are processed in sequence to generate output data, according to which the printing image is produced. Preferably, the method is alternatively or additionally characterized in that the secondary data packets and/or the raster data obtained therefrom are processed in sequence to generate output data, according to which coating medium is ejected from nozzles. Preferably, the method is alternatively or additionally characterized in that the secondary data packets are processed at least partly in sequence by means of at least one raster graphics processor. Preferably, the method is alternatively or additionally characterized in that the secondary data packets are processed at least partly in sequence to generate output data.

Preferably, the method is alternatively or additionally characterized in that the secondary data packets and/or packets of raster data, each of which is based on a different secondary data packet, are stored as a complete unit in at least one memory. Preferably, the method is alternatively or additionally characterized in that the secondary data packets and/or packets of raster data, each of which is based on a different secondary data packet, are each read out as a unit from the at least one memory, at least partly in sequence. Preferably, the method is alternatively or additionally characterized in that such a memory is at least one image data memory and/or at least one raster data memory.

Preferably, the method is alternatively or additionally characterized in that all of the raster data and/or output data generated from a plurality or all of the secondary data packets originating from a primary data packet are stored simultaneously in at least one memory.

Preferably, the method is alternatively or additionally characterized in that all of these raster data and/or output data generated from a plurality or all of the secondary data packets originating from this primary data packet are used in sequence to produce the sections of the particularly first printed complete printing image.

Preferably, the method is alternatively or additionally characterized in that all of these raster data and/or output data generated from a plurality or all of the secondary data packets originating from this primary data packet are used in sequence in cyclic repetitions to produce the sections of the at least one printed complete printing image.

Preferably, the method is alternatively or additionally characterized in that a beginning and an end of the at least one particularly digitally stored complete printing image are synchronized with one another graphically to enable a gapless and visually undetectable transition between them when the beginning and the end of the at least one complete printing image are strung directly together.

Preferably, the method is alternatively or additionally characterized in that the stored template image data of the at least one particularly digitally stored complete printing image contain template image data of at least one first individual page and template image data of at least one second individual page, and in that the at least one first individual page and the at least one second individual page are displaced relative to one another at least in one template direction within stored data based on the template image data and/or based on order data that refer to a print order and/or based on correction data stored in at least one correction memory.

Preferably, the method is alternatively or additionally characterized in that the stored template image data of the at least one particularly digitally stored complete printing image contain at least template image data of at least one first individual page and template image data of at least one second individual page, and in that the at least one first individual page and the at least one second individual page are displaced relative to one another in at least one template direction within stored data, based on the template image data and/or based on order data that refer to a print order and/or based on correction data stored in at least one correction memory, while maintaining at least their respective absolute virtual page dimensions, measured in a first template direction. Preferably, the method is alternatively or additionally characterized in that the stored template image data of at least the at least one particularly digitally stored complete printing image contain at least template image data of at least one first individual page and in that at least the at least one first individual page is stretched with a stretching factor in at least one template direction, within stored data, before and/or during generation of the output data, based on the template image data and/or based on order data that refer to a print order and/or based on correction data stored in at least one correction memory. Preferably, the method is alternatively or additionally characterized in that said template direction is a different template direction from the template direction in which the at least one particularly digitally stored complete printing image is divided into sections.

Preferably, the method is alternatively or additionally characterized in that at least five different coating mediums are applied to the same side of the printing material, and in that each of these at least five different coating mediums is applied to the printing material by means of a plurality of individually actuable components of the at least one first printing unit and/or at least one second printing unit of the printing machine, which components determine individual pixels of printing images on the basis of control data, and in that at least one of the at least five different coating mediums is applied to the printing material by means of the at least one first printing unit, after which at least one other of the at least five different coating mediums is applied to the printing material by means of the at least one second printing unit of the printing machine. Preferably, the method is alternatively or additionally characterized in that the sections and the secondary data packets are generated before data are allocated to the at least one first printing unit and the at least one second printing unit.

Preferably, the method is alternatively or additionally characterized in that the division of the at least one particularly digitally stored complete printing image into a plurality of sections and the generation of the secondary data packets is carried out by means of at least one image data computer and/or by means of at least one raster data computer and/or by means of another computer of the printing machine and/or the machine controller and/or the printing data processing unit.

Preferably, the method is alternatively or additionally characterized in that the secondary data packets are generated by means of at least one image data computer, after which raster data are generated from the secondary data packets by means of at least one raster data computer.

One advantage of the invention preferably consists in that the need to remove, for example cut off, regions of the printed product after printing can preferably be avoided. The result is a savings of printing material and a reduction in the number of devices and operating steps that are required. This results in particular from a preferably additionally or alternatively usable method for operating a printing machine, wherein the printing machine preferably has at least one print head with at least one first nozzle, and wherein control data and/or raster data of at least one printing image to be printed are preferably forwarded to the at least one print head in the form of entries to be processed, and wherein each entry preferably is and/or will be assigned to one of the at least one first nozzles and/or either has a value that corresponds to an instruction to rest or has a value that corresponds to an instruction to eject a droplet, and wherein, preferably based on data assigned to the at least one printing image, at least one additional droplet which does not represent a pixel of this printing image to be printed is ejected by means of the at least one first nozzle, at least between two droplets which do not represent pixels of the same printing image to be imprinted and are likewise ejected by means of this at least one first nozzle.

This preferably additionally or alternatively results from a preferred method for operating a printing machine, wherein the printing machine preferably has at least one print head having at least one first nozzle, and wherein raster data and/or control data of at least one printing image to be printed preferably are and/or will be stored in at least one data memory in the form of entries to be processed, and wherein each entry preferably is and/or will be assigned to one nozzle and either has a value that corresponds to an instruction to rest or has a value that corresponds to an instruction to eject a droplet, and wherein at least one of these first sequences of entries to be processed in sequence and assigned and/or assignable to at least one first nozzle is preferably checked to determine whether it contains at least one subsequence which contains only entries with instructions to rest and which exceeds a predefined number of entries, and wherein, if such a subsequence is found, at least one entry in said at least one subsequence is preferably modified such that it then contains a value that corresponds to an instruction to eject a droplet.

A further advantage of the invention preferably consists in that, preferably as a result of the selective actuation of nozzles of the at least one print head, the volume of ejected coating medium, for example ejected printing ink, is low as compared with a method in which all nozzles eject coating medium at regular intervals.

A further advantage preferably consists in that unnecessary defects in a printed printing image are avoided.

Raster data and/or output data and/or control data belonging to sequential printing images and/or template image data are preferably processed together and checked for corresponding sequences. This enables an even greater savings of coating medium and/or even better print quality.

An individual page is understood, for example, as an object which is part of a complete printing image. It may be an individual page of a newspaper or book or journal.

However, an individual page may also be a poster, and can be imprinted as a single motif on a sheet of a finished printed product. For example, an individual page may also have a plurality of objects which are treated as a collective unit in describing the complete printing image. For example, a complete printing image may contain two individual pages which correspond to two pages of a newspaper, with at least one of these individual pages containing at least one text block and at least one graphic as objects. At least with respect to displacements that are carried out within data, an individual page is preferably the smallest unit that remains unchanged. A complete printing image can also contain a single individual page and/or can consist of a single individual page.

One advantage of the invention preferably consists in that higher quality color-to-color registration and/or register of printed products can be achieved, and particularly in that, as is preferred, changes in the dimensions of a printing material can be compensated for before a corresponding coating medium is applied. A further advantage preferably consists in that the invention allows individual print orders to be handled individually, thereby increasing the quality of the printed products more than if non-individualized solutions are used. A further advantage preferably consists in the ease of operation for operators of the printing machine, particularly due to a potentially high level of automation.

Advantageous variants of a preferred method for printing at least one printing material by means of at least one printing element of a printing machine will be described, in which first output data for production or for actuating at least one component of at least one first printing unit of the printing machine, which component determines at least one form of printing images, in particular at least individual pixels of printing images, are generated, preferably from particularly digitally stored template image data of at least one first complete printing image, in order to produce at least one first printed complete printing image. For example, the particularly digitally stored template image data of the at least one first complete printing image contain at least template image data of at least one first individual page and, for example, also template image data of at least one second individual page. The at least one first printed complete printing image is preferably produced on the at least one printing material by a first printing process by means of the at least one first printing unit, according to the first output data.

The at least one first individual page and the preferably at least one second individual page are preferably displaced in relation to one another in at least one first template direction within particularly digitally stored data based on order data that refer to a print order and/or based on correction data stored in at least one correction memory, while maintaining at least their respective absolute virtual page dimensions, measured in said first template direction. This preferably results in the advantage that printed individual pages that are produced on different printing units have the proper color-to-color registration and are true-to-register relative to one another in the finished printed product. A degree of relative displacement is preferably dependent on the prior spacing between the individual pages. For example, printed individual pages that are spaced a greater distance from one another will be moved a greater distance relative to one another by changes in the dimensions of the printing material; this is preferably compensated for by a greater relative displacement of the individual pages in the template image data. Order data that refer to a print order preferably contain at least data relating to the properties of the printing material to be printed and/or data relating to at least one coating medium to be applied and/or data relating to properties and/or settings of at least one dryer and/or data relating to at least one printing image to be applied and/or data relating to a transport speed of the printing material and/or data relating to a printing machine and/or printing unit by means of which the printed product will be printed. Examples of properties of the printing material to be printed include the material of the printing material and/or the thickness of the printing material to be printed. One example of such data relating to at least one printing image to be applied is a surface coverage, that is, a volume of printing ink per unit of surface area, which can influence the change in the at least one dimension of the printing material, for example. Examples of data relating to at least one printing image to be applied include the format the imprinted printed product will have and/or the number and/or sequence of pages the printed product will have. The order data are preferably also dependent on at least one post-processing device. In the preceding and/or in the following, a virtual page dimension is preferably understood particularly as an assigned page dimension particularly within an image which is stored in a digitally stored form in a data memory.

Individual pages whose center points lie on top of one another are also considered to be arranged with proper color-to-color registration, regardless of whether their page dimensions are different. Such differences are perceived as less objectionable to the viewer than entire individual pages that are displaced relative to one another. Individual pages whose center points lie on top of one another as viewed in light transmitted through the printing material are also considered to be arranged true-to-register, regardless of whether their page dimensions are different. Such differences are likewise perceived as less objectionable to the viewer than entire individual pages that are displaced relative to one another.

Preferably, at least one virtual first page dimension in a first template direction and one virtual first reference point are assigned to the at least one first individual page in its template image data, and at least one virtual second reference point and more preferably also at least one virtual second page dimension in this first template direction are assigned to the at least one second individual page in its template image data, and a reference distance, measured in a first printing image direction, between the first reference point and the second reference point on the at least one first printed complete printing image, on one hand, and the first page dimension of printed first individual page, on the other hand, are in a dimensional-print ratio in relation to one another which, preferably based on order data that refer to a print order and/or based on correction data stored in at least one correction memory, differs from a dimensional-template ratio, which a virtual reference distance, measured in the first template direction and assigned to the virtual first reference point and the virtual second reference point relative to one another in the template image data of the at least one first complete printing image, on one hand, and the virtual first page dimension of the at least one first individual page in the template image data, on the other hand, have in relation to one another. This can be achieved merely by displacing the individual pages relative to one another. It is also possible, however, to achieve this by a combination of displacement of individual pages and stretching of individual pages and/or of complete printing images. For example, by displacing the individual pages, their center points can be aligned, and by stretching the separate pages individually, their lateral dimensions can be adjusted. In the preceding and/or in the following, a virtual reference point is particularly understood as a reference point particularly within an image which is stored in digitally stored form in a data memory.

Preferably, at least the at least one first individual page is alternatively or additionally stretched with a first stretching factor, at least in the first template direction, within particularly digitally stored data, before and/or during the generation of the output data, based on the template image data and based on order data that refer to the print order, and based on correction data stored in at least one correction memory. Stretching at least one individual page and/or stretching a complete printing image, for example, allows uniform changes in the dimensions of the printing material to be compensated for, preferably largely or even fully. Although this variant requires intervention in the template image data of the corresponding individual pages themselves, it produces very high quality results in terms of color-to-color registration and/or register.

On one hand, the preferred method is preferably suitable for actuating nozzles of print heads of at least one first printing unit of the printing machine, especially for controlling an ejection of coating medium through nozzles of print heads, for example of an inkjet printing element. The method is alternatively suitable for all types of digital printing methods, especially those in which individually controlled elements generate pixels, for example digital thermal transfer printing methods, printing methods that are based on an electric charge, for example which use a toner as the coating medium, or the like. On the other hand, the method is preferably suitable for controlling at least one manufacturing device for producing fixed printing formes, for example for imaging printing plates for offset printing and/or for producing printing formes for letterpress printing and/or for flexographic printing and/or for intaglio printing. In that case, the method is used for producing particularly fixed printing formes, for example printing plates.

Preferably, the at least one printing element is an inkjet printing element and/or the printing machine is an inkjet printing machine, and/or the particularly digitally stored template image data of the at least one first complete printing image are used for generating first output data for actuating nozzles of print heads of the at least one first printing unit of the printing machine, according to which coating medium is ejected through said nozzles of print heads in order to generate the at least one first printed complete printing image, and/or the respective output data are control data for nozzles of print heads, respectively to be used, in at least one inkjet printing element of the printing machine, and/or the at least one component of the at least one first printing unit of the printing machine, which component determines at least one form of printing images, is at least one inkjet print head.

Especially in connection with digital printing methods, for example inkjet printing methods, the advantage is preferably achieved that the change in data, for example the displacement of individual pages and/or the stretching of individual pages or of complete printing images, can be performed relatively late, in particular not until it has been established with which printing machine and/or on which printing material and/or under what climatic conditions and/or with what coating medium a print order will be produced. For example, if a different printing material will be used from what is specified in the order plan, for example because a certain type of printing material is no longer on hand in sufficient quantity, the method can be applied immediately prior to the start of printing and these changes can be taken into account. Adjustments may also be made due to changes in environmental conditions, for example changes in air humidity. In the case of digital printing methods, such changes can even be made while a print order is being filled, regardless of whether the changes are due to altered conditions, a change in printing material with a flying roll change, or due to measurements taken of printed products already finished during the same print order.

The displacement of at least one individual page and/or the stretching of at least one individual page and/or at least one complete printing image and/or at least one reference distance is preferably dependent on the template image data in that the template image data contain information regarding where individual pages are arranged in the complete printing image. A displacement of an individual page will preferably have a greater impact the farther said individual page was already located from a reference point, for example a center line of the complete printing image, particularly because the change in the at least one dimension of the printing material will then also have a greater impact. A shrinking of a printing material web, for example, would displace individual pages located at the edge of said printing material web farther than individual pages that are located close to the center line of the printing material web. To compensate for this, the individual pages located at the edge must be displaced a greater distance in advance. This becomes more relevant the more individual pages are arranged side by side and/or the smaller each of the individual pages is. With a uniform stretching of the complete printing image, a uniform change in the dimensions of the printing material can be uniformly compensated for.

Alternatively or additionally preferred is a method for printing at least one printing material by means of at least one printing element of a printing machine, wherein from stored template image data of at least one first complete printing image, first output data for production or for actuating at least one component of at least one first printing unit of the printing machine, which component determines at least one form of printing images, are generated for producing at least one first printed complete printing image, and wherein the stored template image data of the at least one first complete printing image contain at least template image data of at least one first individual page and template image data of at least one second individual page, and wherein the at least one first individual page and the at least one second individual page are displaced relative to one another at least in a first template direction within stored data by means of a machine controller and/or a printing data processing unit of the printing machine itself and/or by means of at least one stored algorithm in the machine controller and/or printing data processing unit, while maintaining at least their respective absolute virtual page dimensions measured in said first template direction, and wherein the at least one first printed complete printing image is produced on the at least one printing material in a first printing process by means of the at least one first printing unit, according to the first output data.

On advantage of a preferred, additional or alternative method for coating a printing material by means of printing elements of a printing machine, wherein the printing material is coated along a transport path by means of at least one first printing unit and preferably also at least one second printing unit, and wherein at least six different coating mediums are applied to the same first side of the printing material, and wherein each of these at least six different coating mediums is applied by means of a plurality of individually actuable components of at least one first printing unit and/or at least one second printing unit of the printing machine, which components determine individual pixels of printing images based on output data and particularly control data, and wherein at least three different coating mediums are applied to the first side of the printing material by means of the at least one first printing unit and at least three different coating mediums are applied to the first side of the printing material by means of the at least one second printing unit, consists particularly in that high-quality printed products which are distinguished from simpler printed products, for example, by their range of colors and/or by varnishes and/or by other factors can be produced by means of actuable, particularly digitally actuable components of at least one printing element which determine individual pixels of printing images. In this manner, high-quality but individual printing images can be produced even in package printing, for example. This is true particularly with inkjet printing elements, since these are capable of applying a multiplicity of different coating mediums in variable printing images in a particularly simple manner. In that case, the individually actuable components that determine individual pixels of printing images on the basis of output data and particularly control data are preferably nozzles of inkjet print heads of printing elements of the at least one first printing unit and/or the at least one second printing unit of the printing machine.

This also applies in particular to a printing machine in which at least one first printing unit and at least one second printing unit are preferably arranged along a transport path through the printing machine provided for at least one printing material to be printed, and wherein the printing machine has at least five, more preferably at least six, even more preferably at least seven and more preferably still at least eight different intermediate reservoirs for different coating mediums, and wherein each of these at least five, more preferably at least six, even more preferably at least seven and more preferably still at least eight intermediate reservoirs is and/or can be connected to at least a plurality of individually actuable components of the at least one first printing unit or the at least one second printing unit of the printing machine, and wherein each of these elements or components, particularly individually actuable components, can preferably produce individually printed pixels of printed printing images based on output data and particularly control data, and wherein each of these elements or components, particularly individually actuable components, is preferably arranged on the same side of the transport path through the printing machine provided for the at least one printing material to be printed, and wherein the at least one first printing unit preferably has at least one, more preferably at least two, even more preferably at least three and more preferably still at least four of the different intermediate reservoirs for different coating mediums, and wherein the at least one second printing unit preferably has at least one, more preferably at least two, even more preferably at least three and more preferably still at least four of the different intermediate reservoirs for different coating mediums.

One advantage of a preferred method in which, preferably also from stored template image data of at least one first complete printing image, first output data and/or control data for actuating the at least one component of the at least one first and/or second printing unit, which component determines individual pixels of printing images, are generated for producing at least one first printed complete printing image, and the stored template image data of the at least one first complete printing image preferably contain at least template image data of at least one first individual page and preferably also template image data of at least one second individual page, and the at least one first individual page and the at least one second individual page are displaced relative to one another in at least one first template direction, preferably within stored data, based on order data that refer to a print order and/or based on correction data stored in at least one correction memory, preferably while maintaining at least their respective absolute virtual page dimensions, measured in this first template direction, and/or at least the at least one first individual page is stretched within stored data, before and/or during the generation of the output data, with a first stretching factor, at least in the first template direction, based on the template image data and based on order data that refer to a print order and based on correction data stored in at least one correction memory, consists particularly in that said method enables printing that maintains proper color-to-color registration and is true-to-register, even when different printing units are used and/or when dimensions of the printing material change between the printing units, for example due to the action of a dryer.

This advantage is realized particularly when, as is preferred, at least one change in at least one dimension of the printing material is at least partially compensated for by the stretching of the at least one first individual page and/or the stretching of the at least one second individual page and/or the stretching of the at least one virtual reference distance and/or by the relative displacement of the at least one first individual page and the at least one second individual page relative to one another in the template image data. A virtual reference distance in the preceding and/or in the following is understood particularly as a distance, particularly within an image, which is stored in digitally stored form in a data memory.

A further advantage is realized particularly when, as is preferred, the printing material is coated with at least one of the different coating mediums along a transport path by means of the at least one first printing unit and is then dried by means of at least one dryer, after which it is coated with at least one other of the at least five, especially at least six, more preferably at least seven and more preferably still at least eight different coating mediums by means of the at least one second printing unit. Undried coating medium can then particularly be prevented from soiling the printed product and/or the printing machine, and a clean and true-to-register printed image, and/or an image with proper color-to-color registration is preferably achieved. For this purpose, at least one first printing unit and at least one first dryer and at least one second printing unit are preferably arranged along the transport path through the printing machine provided for at least one printing material to be printed.

A further advantage is achieved particularly when, as is preferred, at least one of the at least five, especially at least six, more preferably at least seven and more preferably still at least eight different coating mediums is a printing ink in at least one of the colors cyan and/or magenta and/or yellow and/or black, and/or is a white printing ink and/or is a transparent coating medium, and/or is a coating medium in the color gold and/or silver and/or contains iron oxide particles and/or has a positive or negative magnetic susceptibility and/or ferromagnetic or ferrimagnetic or antiferromagnetic properties and/or is a water-based coating medium and/or contains at least one organic solvent and/or can be cured by means of UV-light and/or is capable of conducting current and/or is visible only under UV light, because this preferably allows a plurality of different and/or complex and/or forgery-proof and/or functional printed images to be produced.

In the preceding and/or in the following, when stored data are mentioned, these are preferably understood as image data and/or template image data and/or geometrically modified template image data and/or raster data and/or geometrically modified raster data and/or output data and/or control data. In the preceding and/or in the following, when image data and/or template image data and/or geometrically modified template image data and/or raster data and/or geometrically modified raster data and/or output data and/or control data are described as being moved and/or stretched and/or displaced and/or geometrically modified, and/or when individual pages and/or complete printing images are described as being moved and/or stretched and/or displaced and/or geometrically modified within stored data, this is particularly understood to mean that the stored data, particularly image data and/or template image data and/or geometrically modified template image data and/or raster data and/or geometrically modified raster data and/or output data and/or control data are modified in such a way that, after the modification, corresponding graphic components of an image defined by these stored data, particularly image data and/or template image data and/or geometrically modified template image data and/or raster data and/or geometrically modified raster data and/or output data and/or control data, are defined as correspondingly stretched and/or displaced and/or geometrically modified graphic components of the image which is thereafter defined by these correspondingly modified stored data, particularly image data and/or template image data and/or geometrically modified template image data and/or raster data and/or geometrically modified raster data and/or output data and/or control data. In particular, this is not understood to mean that an at least partially different physical memory map is assigned to the stored data, in particular image data and/or template image data and/or geometrically modified template image data and/or raster data and/or geometrically modified raster data and/or output data and/or control data, however this does not exclude the possibility that a change in the physical memory map may occur.

BRIEF DESCRIPTION OF THE DRAWINGS

Some embodiment examples of the present invention are illustrated in the set of drawings and will be specified in greater detail in the following.

The drawings show.

DESCRIPTION OF THE PREFERRED EMBODIMENTS

Figure 1A:
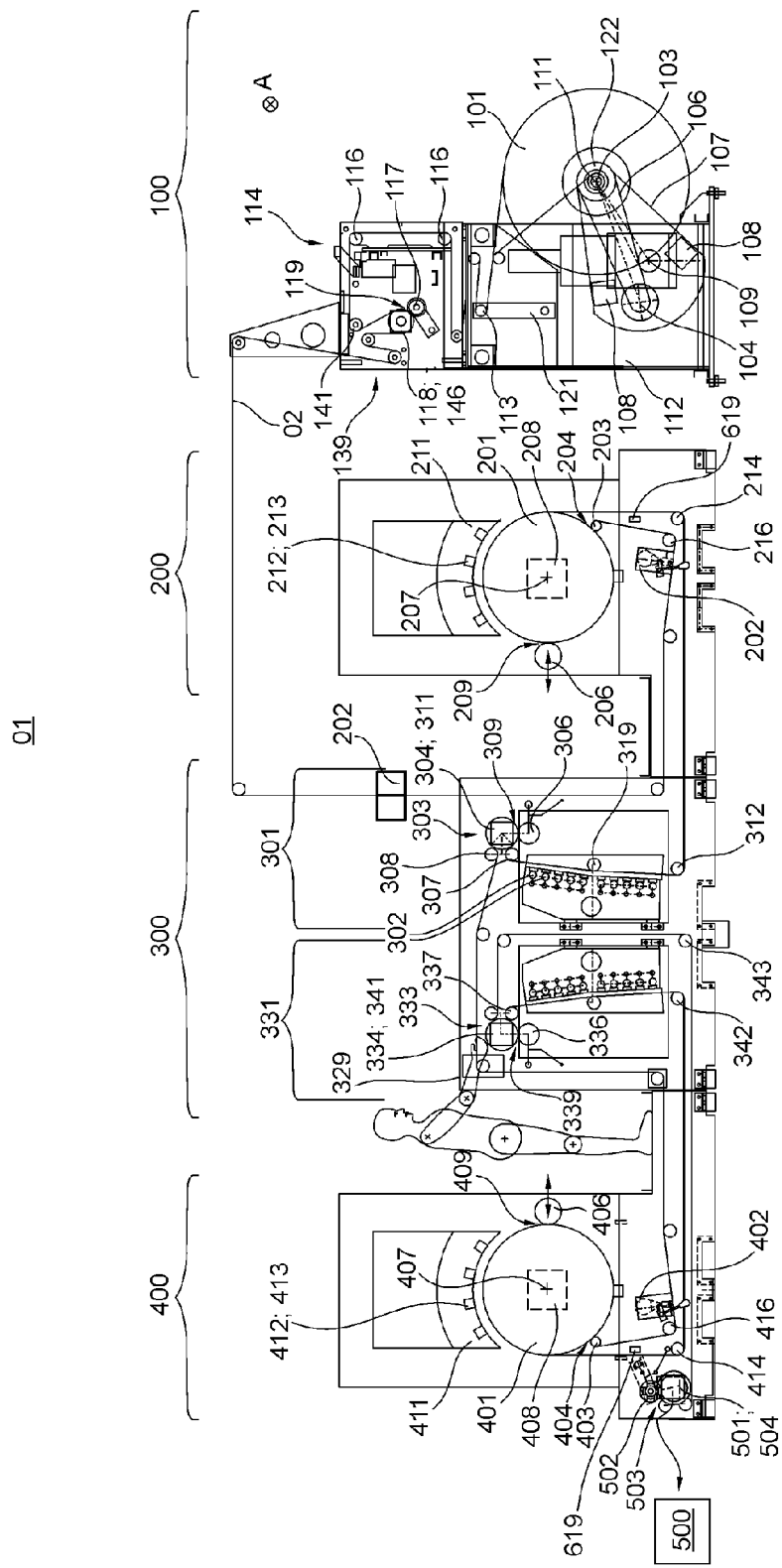
FIG. 1a a schematic illustration of a printing machine.
Figure 1B:
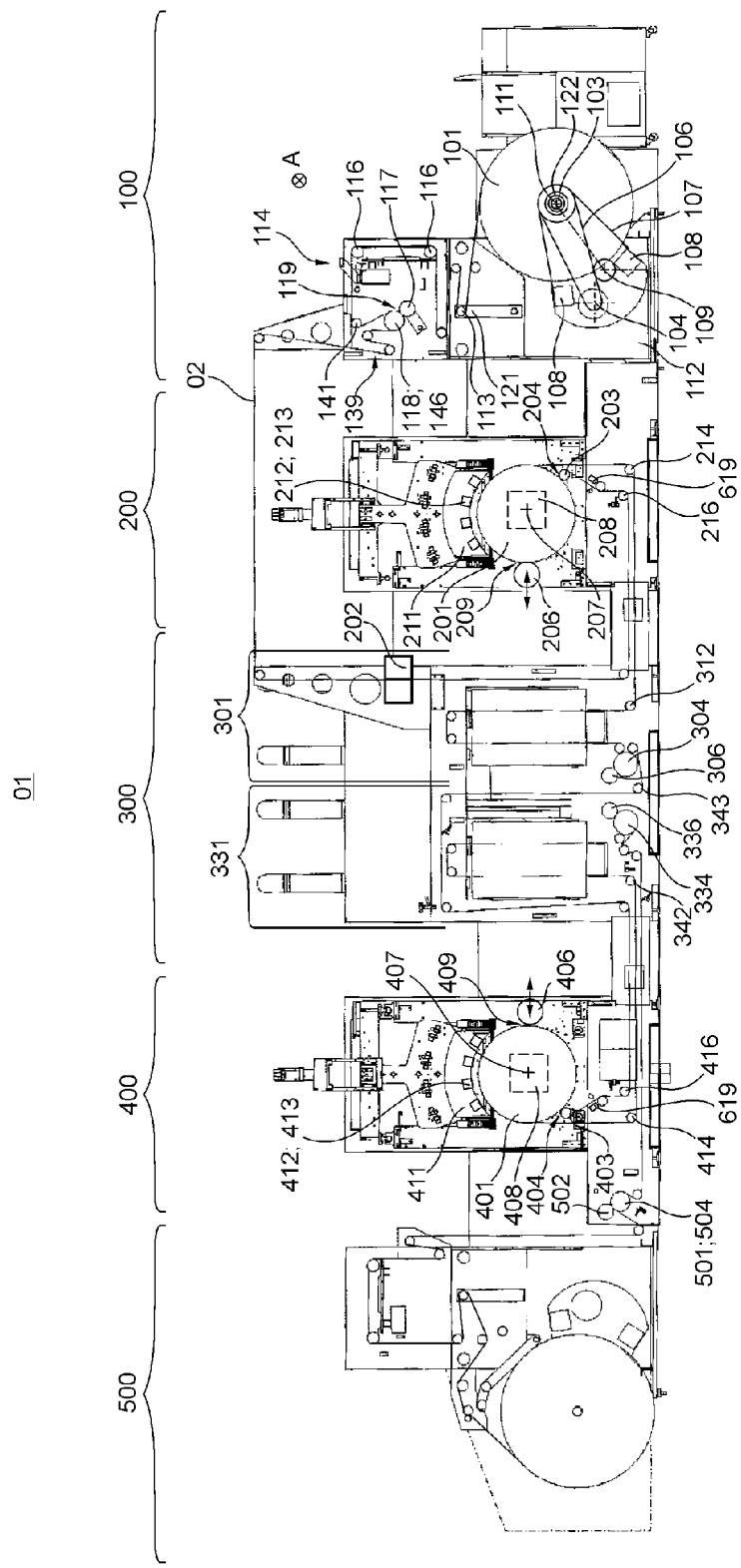
FIG. 1b a schematic illustration of a printing machine with an alternate web path.
Figure 2:
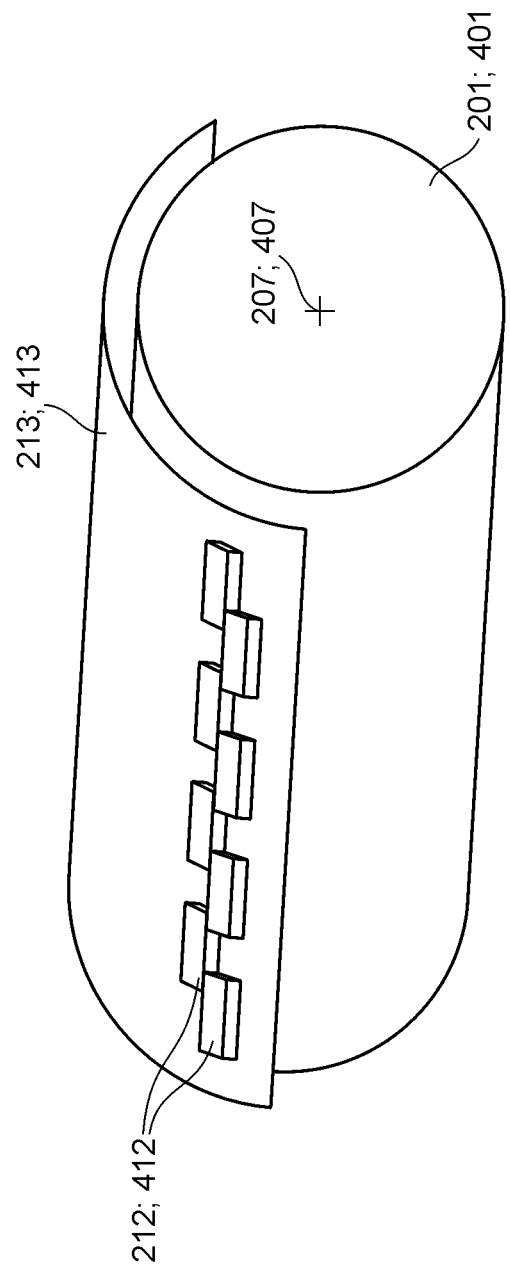
FIG. 2 a schematic illustration of a part of a printing unit having a double row of print heads.
Figure 3:
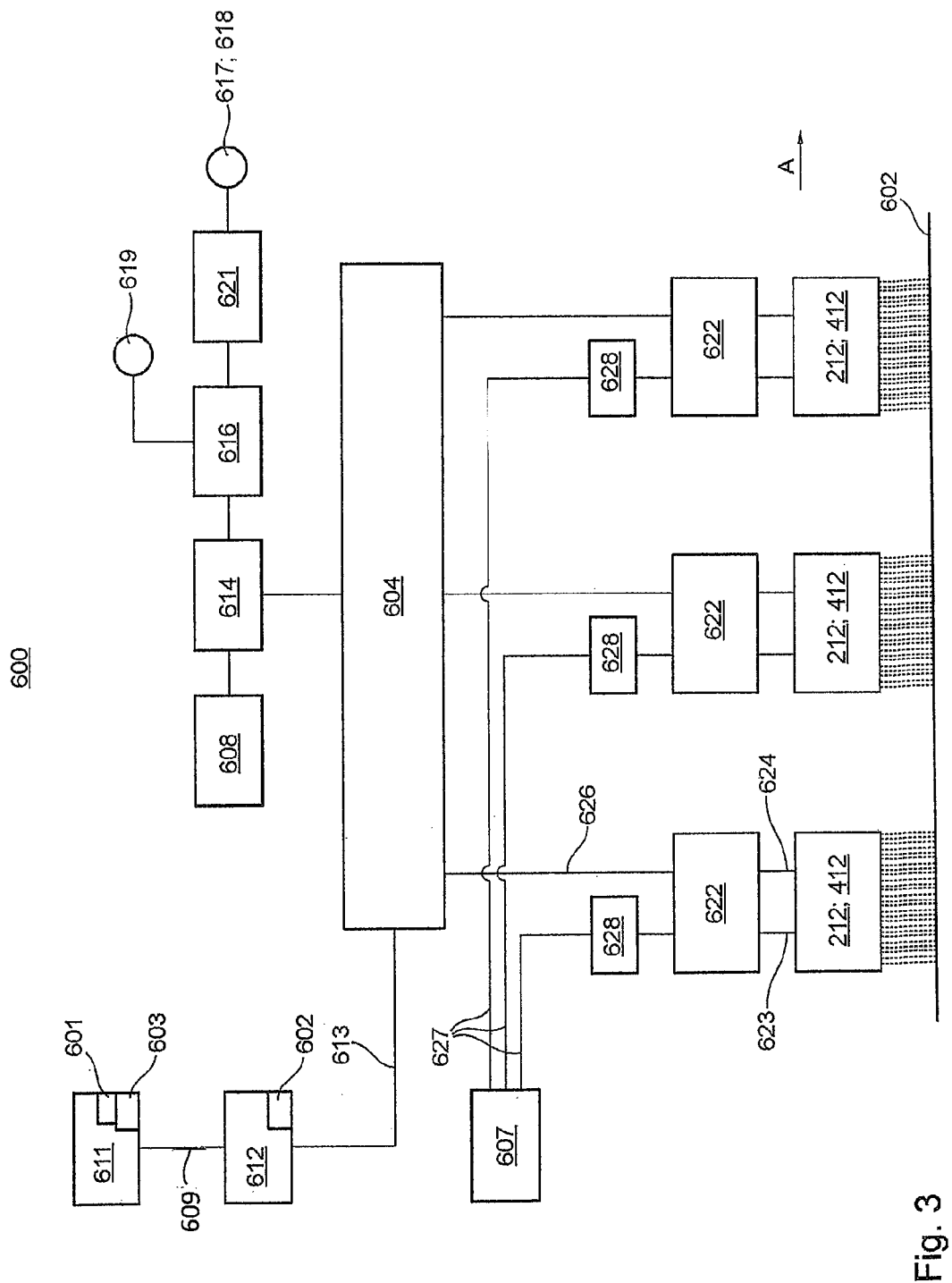
FIG. 3 a schematic illustration of a part of a printing data processing unit.
Figure 4:
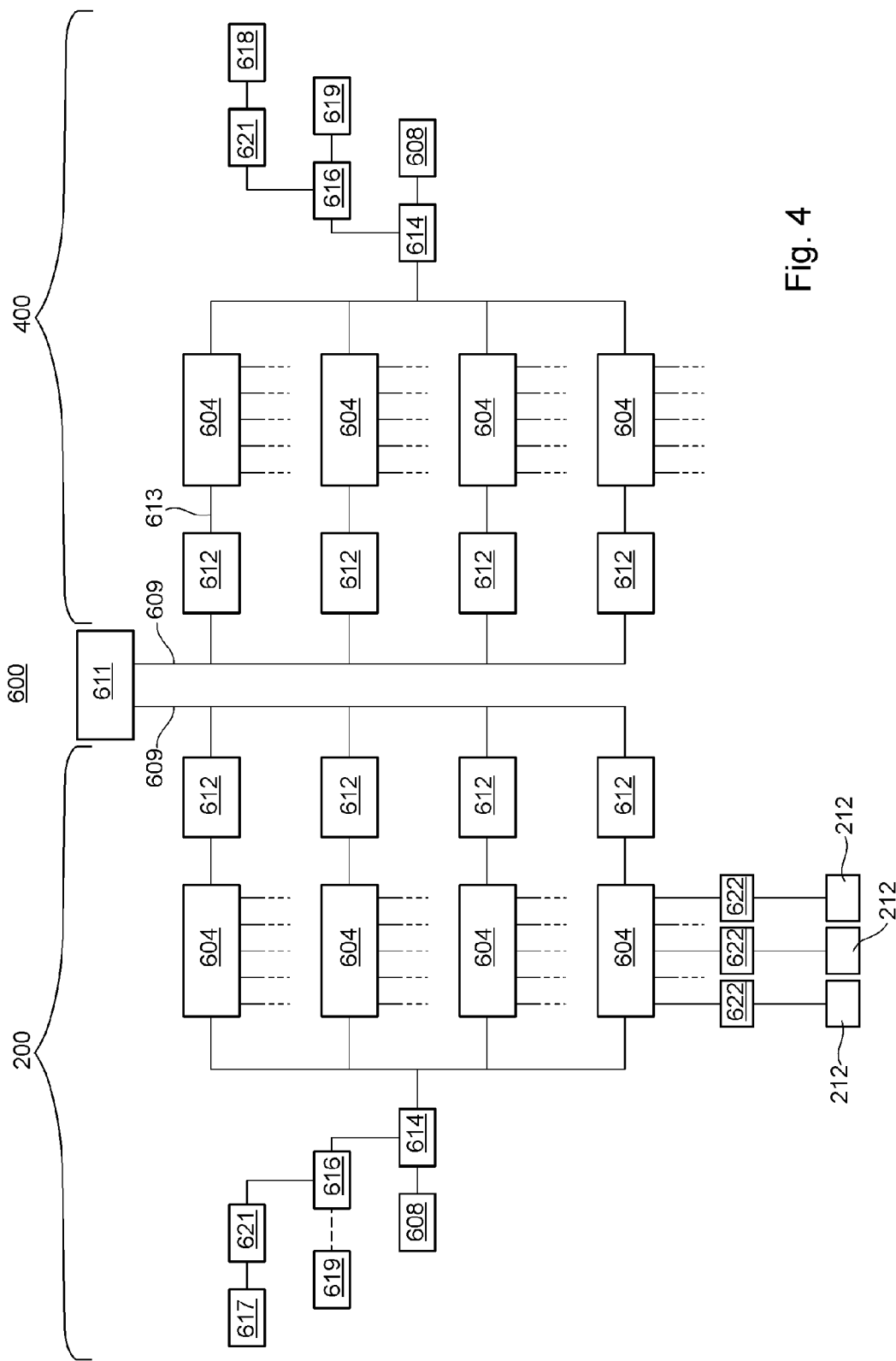
FIG. 4 a schematic illustration of a part of a printing data processing unit, wherein dashed lines indicate a plurality of print head controls and print heads.
Figure 5:
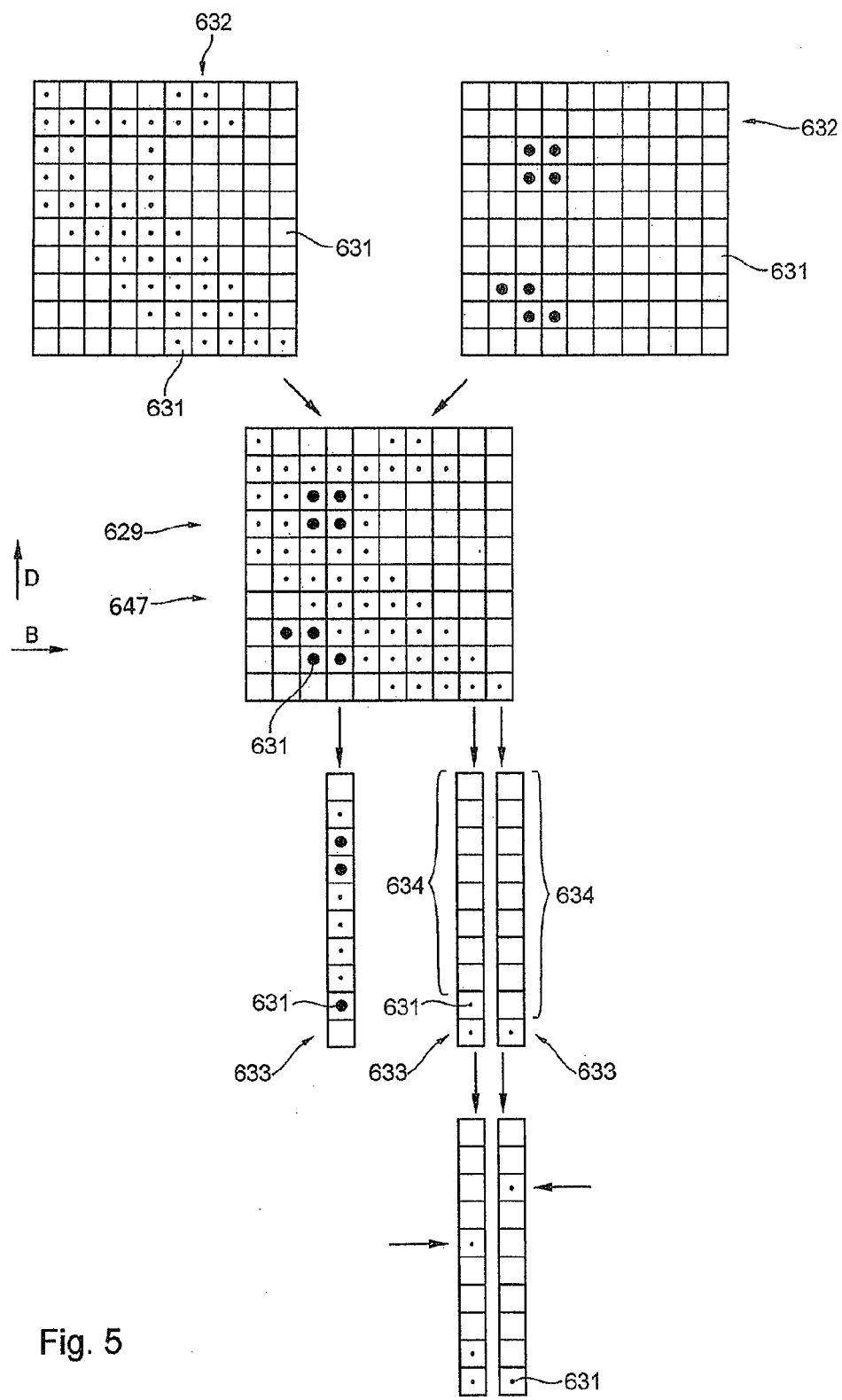
FIG. 5 a schematic illustration of partial image data, for example within raster data, in which additional pixels are inserted.
Figure 6:
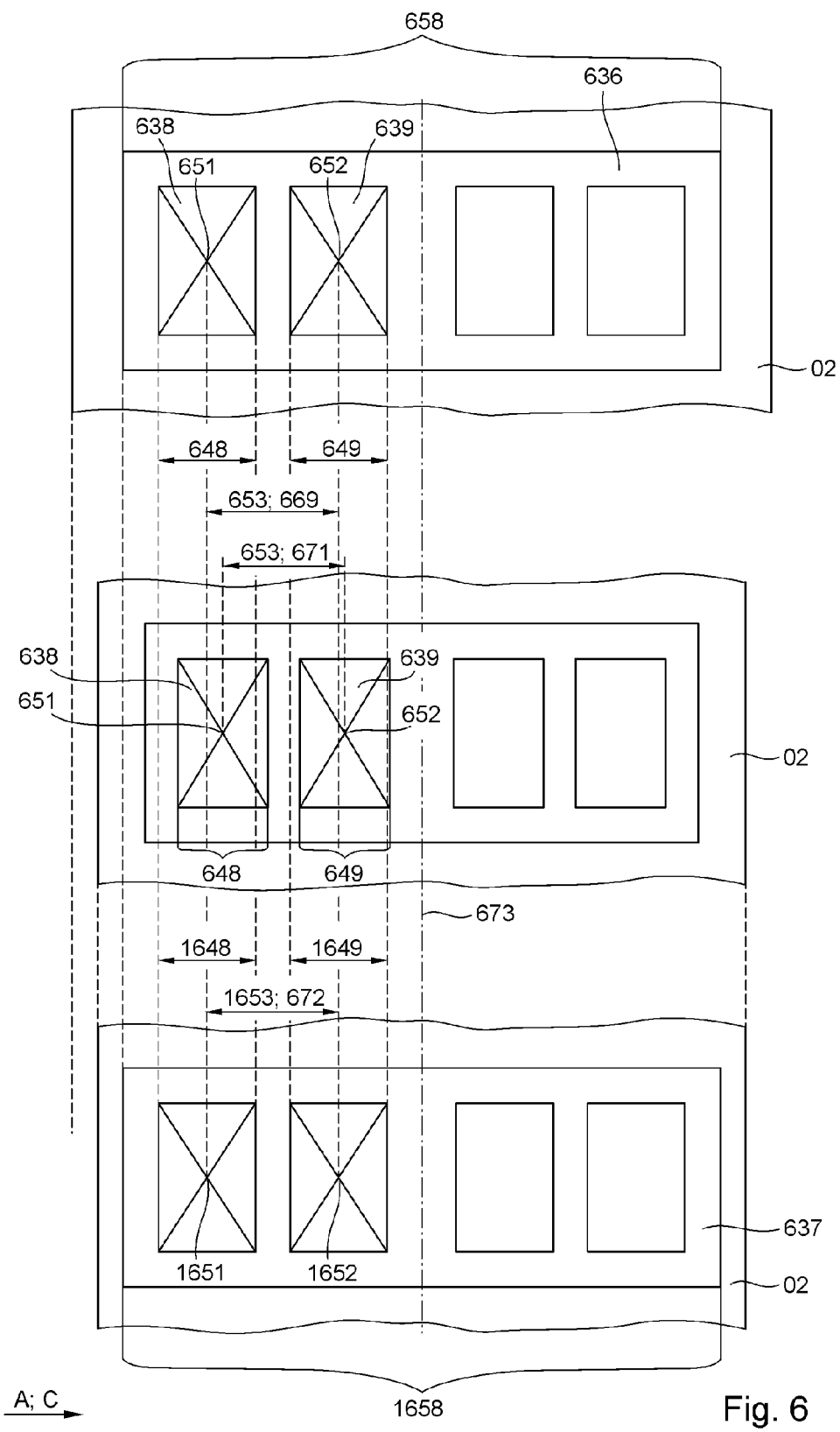
FIG. 6 a schematic illustration of printed regions of a printing material, wherein the upper portion of the illustration shows a first region of the printing material and a first signature which has been printed by a first printing unit and has not yet been dried, and wherein the center portion of the illustration shows the first region after drying, and wherein the lower portion of the illustration shows a second signature which has been applied to the first region of the printing material, on a front or a back side, and wherein a change in a dimension of the printing material has not yet been taken into account.
Figure 7A:
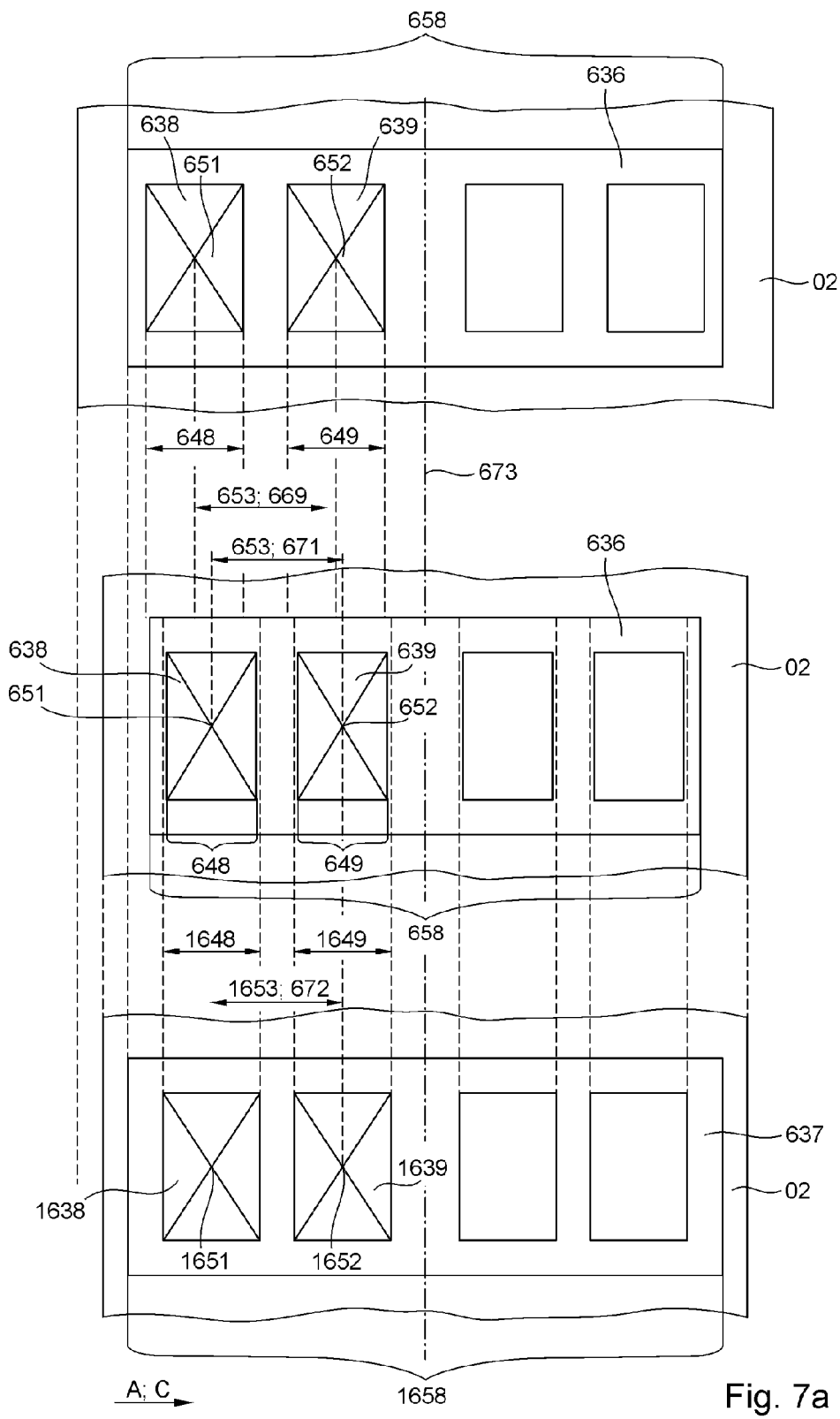
FIG. 7a a schematic illustration of printed regions of a printing material, wherein the upper portion of the illustration shows a first region of the printing material and a first signature which has been printed by a first printing unit and has not yet been dried, and wherein the center portion of the illustration shows the first region after drying, and wherein the lower portion of the illustration shows a second signature which has been applied to the first region of the printing material, on a front or a back side, and wherein a change in a dimension of the printing material has been taken into account by a displacement of individual pages.
Figure 7B:
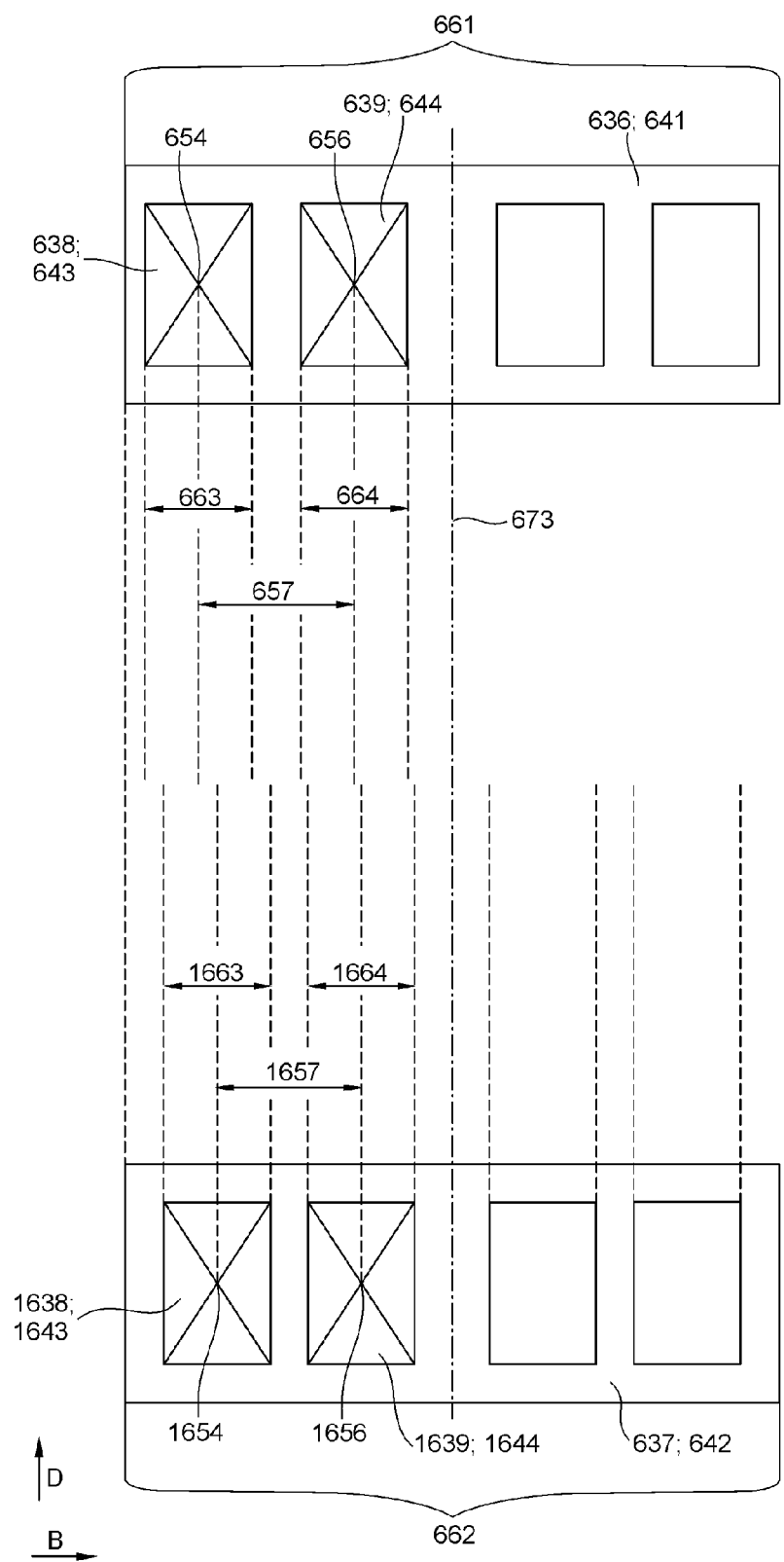
FIG. 7b a schematic illustration of two complete printing images, preferably to be printed by means of different printing units, in their template image data, wherein individual pages of the upper complete printing image are displaced in relation to individual pages of the lower complete printing image.
Figure 8:
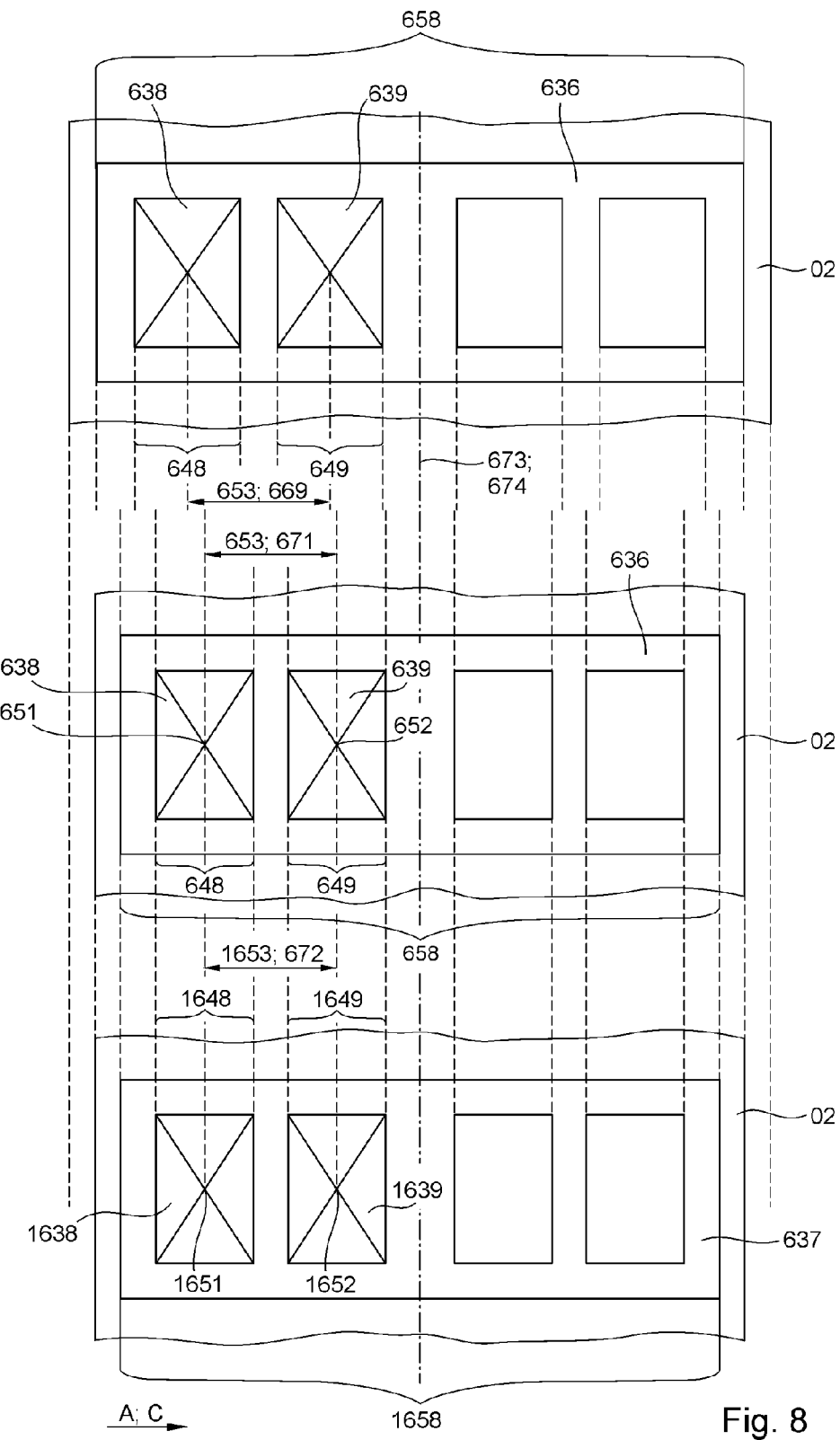
FIG. 8 a schematic illustration of printed regions of a printing material, wherein the upper portion of the illustration shows a first region of the printing material and a first signature which has been printed by a first printing unit and has not yet been dried, and wherein the center portion of the illustration shows the first region after drying, and wherein the lower portion of the illustration shows a second signature which has been applied to the first region of the printing material, on a front or a back side, and wherein a change in a dimension of the printing material has been taken into account by stretching of the first complete printing image.

A printing machine 01 comprises at least one printing material source 100, at least one first printing unit 200, preferably at least one first dryer 301, preferably at least one second printing unit 400 and preferably at least one second dryer 331, and preferably at least one post-processing unit 500. Printing machine 01 is further preferably embodied as an inkjet printing machine 01. Printing machine 01 is preferably embodied as a web-fed printing machine 01, and more preferably as a web-fed inkjet printing machine 01. Printing machine 01 is embodied, for example, as a rotary printing machine 01, for example as a web-fed rotary printing machine 01, in particular a web-fed rotary inkjet printing machine 01. In the case of a web-fed printing machine 01, printing material source 100 is embodied as a roll unwinding device 100. In the case of a sheet-fed printing machine or a sheet-fed rotary printing machine, printing material source 100 is embodied as a sheet feeder. In printing material source 100, at least one printing material 02 is preferably aligned, preferably with respect to at least one edge of said printing material 02. In the roll unwinding device 100 of a web-fed printing machine 01, at least one web-type printing material 02, that is, a printing material web 02, for example, a paper web 02 or a textile web 02 or a film 02, for example a plastic film 02 or a metal film 02, is unwound from a roll of printing material 101 and is preferably aligned with respect to its edges in an axial direction A. Axial direction A is preferably a direction A that extends parallel to a rotational axis 111 of a roll of printing material 101 and/or at least one central cylinder 201; 401. A transport path of the at least one printing material 02 and particularly of printing material web 02 downstream of the at least one printing material source 100 preferably extends through the at least one first printing unit 200, where printing material 02 and particularly printing material web 02 is provided with a printing image, preferably using at least one coating medium, in particular at least one printing ink, at least on one side, and in combination with the at least one second printing unit 400, preferably on both sides.

After passing through the at least one first printing unit 200, the transport path of printing material 02 and particularly of printing material web 02 preferably passes through the at least one first dryer 301, where the applied printing ink is dried. Printing ink in the above and in the following is generally understood as a coating medium, including particularly varnish. The at least one first dryer 301 is preferably a component of a dryer unit 300. After passing through the at least one first dryer 301 and preferably the at least one second printing unit 400 and/or the at least one second dryer 331, printing material 02 and particularly printing material web 02 is preferably fed to the at least one post-processing unit 500, where it is further processed. The at least one post-processing unit 500 is embodied, for example, as at least one folding apparatus 500 and/or as a winding apparatus 500 and/or as at least one planar delivery unit 500. In the at least one folding apparatus 500, printing material 02, preferably imprinted on both sides, is preferably further processed to produce individual printed products.

Preferably, along the transport path of printing material 02 and particularly of printing material web 02 through printing machine 01, at least the first dryer 301 is preferably arranged downstream of the at least one first printing unit 200, and/or at least the second printing unit 400 is preferably arranged downstream of the at least one first dryer 301, and/or the at least one second dryer 331 is preferably arranged downstream of the at least one second printing unit 400, and/or the at least one post-processing unit 500 is preferably arranged downstream of the at least one second dryer 331. This serves to ensure capability for high quality double-sided imprinting of printing material 02 and particularly of printing material web 02.

In the following, a web-fed printing machine 01 will be described in greater detail. Corresponding specifics can be applied likewise to other printing machines 01, for example to sheet-fed printing machines, where such specifics are not incompatible. Rolls of printing material 101, which are preferably used in roll unwinding device 100, preferably each have a core onto which web-type printing material 02 for use in web-fed printing machine 01 is wound. Printing material web 02 preferably has a width of 700 mm to 2000 mm, but can also have any smaller or preferably greater width. At least one roll of printing material 101 is rotatably arranged in roll unwinding device 100. In a preferred embodiment, roll unwinding device 100 is configured suitably for receiving one roll of printing material 101, and thus has only one storage position for a roll of printing material 101. In another embodiment, roll unwinding device 100 is embodied as roll changer 100 and has storage positions for at least two rolls of printing material 101. Roll changer 100 is preferably embodied to enable a flying roll change, that is, a splicing of a first printing material web 02 of a roll of printing material 101 currently being processed to a second printing material web 02 of a roll of printing material 101 to be subsequently processed while both the roll of printing material 101 currently being processed and the roll of printing material 101 to be subsequently processed are in rotation.

A working width of printing machine 01 is a dimension that preferably extends orthogonally to the provided transport path of printing material 02 through the at least one first printing unit 200, more preferably in axial direction A. The working width of printing machine 01 preferably corresponds to a maximum allowable width of a printing material for processing in printing machine 01, that is, a maximum printing material width that can be processed in printing machine 01.

Roll unwinding device 100 preferably has at least one roll holding device 103, embodied as a chucking device 103 and/or as a clamping device 103, for example, for each storage position. The at least one roll holding device 103 preferably represents at least one first motor-driven rotational body 103. The at least one roll holding device 103 rotatably secures at least one roll of printing material 101. The at least one roll holding device 103 preferably has at least one drive motor 104.

Along the transport path of printing material web 02 downstream of roll holding device 103, roll unwinding device 100 preferably has a dancer roller 113, preferably arranged to swivel outward on a dancer lever 121, and/or a first web edge aligner 114, and/or an infeed unit 139, which has an infeed nip 119 formed by a traction roller 118 and a traction pressure roller 117, and has a first measurement device 141, embodied as a first measuring roller 141, particularly as a nip measuring roller 141. Said traction roller 118 preferably has its own drive motor 146, embodied as a tractive drive motor 146, which is preferably connected to a machine controller. Traction roller 118 preferably represents at least one second motor-driven rotational body 118. A web tension can be adjusted and held within limits by means of the dancer roller 113, and/or the web tension is preferably held within limits. Roll unwinding device 100 optionally has a splicing and cutting device, by means of which a roll change can be carried out on a flying basis, i.e. without stopping the printing material web 02.

Infeed unit 139 is preferably arranged downstream of the first web edge aligner 114. The at least the traction roller 118 is preferably provided as a component of infeed unit 139, and preferably cooperates with traction pressure roller 117 to form infeed nip 119. Infeed nip 119 serves to control a web tension and/or to transport printing material 02. The web tension can preferably be measured by means of the at least one first measuring device 141, embodied as first measuring roller 141. The at least one first measuring device 141, embodied as first measuring roller 141, is preferably arranged upstream of infeed nip 119 in the direction of transport of printing material web 02.

A first printing unit 200 is arranged downstream of roll unwinding device 100 along the transport path of printing material 02. First printing unit 200 has at least one first central printing cylinder 201, or central cylinder 201. In the following, when a central cylinder 201 is mentioned, a central printing cylinder 201 is always meant. The at least one first central cylinder 201 preferably represents at least one third motor-driven rotational body 201. During printing operation, printing material web 02 wraps at least partially around first central cylinder 201. The wrap angle in this case is preferably at least 180° and more preferably at least 270°. The wrap angle is the angle, measured in the circumferential direction, of the circumferential cylinder surface of first central cylinder 201 along which printing material 02, and particularly printing material web 02, is in contact with first central cylinder 201. Therefore, during printing operation, as viewed in the circumferential direction, preferably at least 50% and more preferably at least 75% of the circumferential cylinder surface of first central cylinder 201 is in contact with printing material web 02. This means that a partial surface area of a circumferential cylinder surface of the at least one first central cylinder 201, provided as the contact surface between the at least one first central cylinder 201 and printing material 02, preferably embodied as printing material web 02, has the wrap angle around the at least one first central cylinder 201 that preferably measures at least 180° and more preferably at least 270°.

Along the transport path of printing material web 02, upstream of first central cylinder 201 of first printing unit 200, at least one second measuring device 216, preferably embodied as a second measuring roller 216, is provided for measuring web tension. Along the transport path of printing material web 02, upstream of first central cylinder 201 of first printing unit 200, at least a first printing material preparation device 202 or web preparation device 202 is preferably arranged so as to act on printing material web 02 and/or as aligned toward the provided transport path of printing material web 02. The first printing material preparation device 202 is assigned at least to a first side and preferably to both sides of printing material web 02, and is particularly aligned to act or be capable of acting at least on this first side of printing material web 02 and preferably on both sides of printing material web 02. Infeed nip 119 formed by traction roller 118 and traction pressure roller 117 is preferably arranged between first web edge aligner 114 and the at least one first central cylinder 201 along the transport path of printing material web 02.

In a preferred embodiment, the at least one first printing material preparation device 202 is arranged downstream of infeed nip 119 and upstream of first central cylinder 201 along the transport path of printing material web 02, acting on printing material web 02 and/or aligned toward the transport path of printing material web 02. The at least one first printing material preparation device 202 is preferably embodied as at least one printing material cleaning device 202 or web cleaning device 202. Alternatively or additionally, the at least one printing material preparation device 202 is embodied as at least one coating device 202, particularly for water-based coating medium. A coating of this type is used, for example, as a base coat (primer). Alternatively or additionally, the at least one printing material preparation device 202 is embodied as at least one corona device 202 and/or discharge device 202 for corona treatment of printing material 02.

A roller 203, embodied as a first turning roller 203 of first printing unit 200, is preferably arranged with its rotational axis parallel to the first central cylinder 201. This first turning roller 203 is preferably arranged spaced from first central cylinder 201. In particular, a first gap 204, which is greater than the thickness of printing material web 02, is preferably provided between first turning roller 203 and first central cylinder 201. The thickness of printing material web 02 in this context is understood as the smallest dimension of printing material web 02. Printing material web 02 preferably wraps around part of the first turning roller 203 and is turned by said roller such that the transport path of printing material web 02 in first gap 204 extends both tangentially to first turning roller 203 and tangentially to first central cylinder 201. The circumferential surface of turning roller 203 in this case is preferably made of a relatively inelastic material, more preferably of a metal, even more preferably of steel or aluminum.

At least one first cylinder 206, embodied as first impression cylinder 206, is preferably provided in first printing unit 200. First impression cylinder 206 preferably has a circumferential surface made of an elastic material, for example an elastomer. First impression cylinder 206 is preferably arranged such that it can be thrown on and/or thrown off of first central cylinder 201 by means of an actuating drive. In a state in which it is thrown onto first central cylinder 201, first impression cylinder 206, together with first central cylinder 201, preferably forms a first impression nip 209. During printing operation, printing material web 02 preferably passes through first impression nip 209. By means of first turning roller 203 and/or preferably by means of first impression cylinder 206, printing material web 02 is preferably placed in planar contact, and more preferably in a specific and known position, against first central cylinder 201. Preferably, apart from first impression cylinder 206 and/or optionally additional impression cylinders, no additional rotational elements, in particular no additional roller and no additional cylinder, is in contact with the at least one first central cylinder 201. The rotational axis of first impression cylinder 206 is preferably arranged below rotational axis 207 of first central cylinder 201.

First central cylinder 201 preferably has its own first drive motor 208, assigned to first central cylinder 201, which drive motor is preferably embodied as an electric motor 208 and is more preferably embodied as a direct drive 208 and/or an independent drive 208 of first central cylinder 201. A direct drive 208 in this case is understood as a drive motor 208 which is connected to the at least one first central cylinder 201 so as to transmit torque or be capable of transmitting torque, without interconnection of additional rotational elements that are in contact with printing material 02. An independent drive 208 in this context is understood as a drive motor 208 which is embodied as the drive motor 208 exclusively of the at least one first central cylinder 201. First drive motor 208 of first central cylinder 201 preferably has at least one permanent magnet, which further preferably is part of a rotor of first drive motor 208 of first central cylinder 201.

On first drive motor 208 of first central cylinder 201 and/or on first central cylinder 201 itself, a first rotational angle sensor 617 is preferably provided, which is embodied to measure and/or be capable of measuring an angular position of first drive motor 208 and/or of first central cylinder 201 itself, and to transmit and/or be capable of transmitting said measurement to a higher level machine controller. The first rotational angle sensor 617 is embodied, for example, as a rotation encoder 617 or absolute value encoder 617. A first rotational angle sensor 617 of this type can be used to determine in absolute terms the angular position of first drive motor 208 and/or preferably the angular position of first central cylinder 201, preferably by means of the higher level machine controller. Additionally or alternatively, first drive motor 208 of first central cylinder 201 is connected in terms of circuitry to the machine controller such that the machine controller is informed at all times regarding the angular position of first drive motor 208 and therefore at the same time regarding the angular position of first central cylinder 201, on the basis of first target data 617 relating to the angular position of first drive motor 208, predefined by the machine controller to first drive motor 208 of first central cylinder 201. In particular, a region of the machine controller that specifies the rotational angle position or angular position of first central cylinder 201 and/or of first drive motor 201 is preferably connected directly, in particular without an interconnected sensor, to a region of the machine controller that controls at least one print head 212 of first printing unit 200.

At least one first printing element 211 is arranged inside first printing unit 200. The at least one first printing element 211 is preferably arranged downstream of first impression cylinder 206 in the direction of rotation of first central cylinder 201 and therefore along the transport path of printing material web 02, preferably so as to act and/or be capable of acting on, and/or as aligned and/or capable of being aligned toward the at least one first central cylinder 201. The at least one first printing element 211 is embodied as a first inkjet printing element 211, and is also referred to as first inkjet printing element 211. First printing element 211 preferably has at least one nozzle bar 213 and preferably a plurality of nozzle bars 213. The at least one first printing element 211, and therefore the at least one first printing unit 200, preferably comprises the at least one first print head 212, which is embodied as inkjet print head 212. Each at least one nozzle bar 213 has at least one print head 212 and preferably a plurality of print heads 212. Each print head 212 preferably has a plurality of nozzles, from which droplets of coating medium, in particular droplets of printing ink, are and/or can be ejected. A nozzle bar 213 in this case is a component that preferably extends across at least 80% and more preferably at least 100% of the working width of printing machine 01 and serves as a support for the at least one print head 212. The axial length of the body of the at least one first central cylinder 201 is preferably at least as great as the working width of printing machine 01. A single nozzle bar or a plurality of nozzle bars 213 is/are provided per printing element 211. Each nozzle is preferably assigned a clearly defined target region with respect to direction A of the width of printing material web 02 and preferably with respect to direction A particularly of rotational axis 207 of the at least one first central cylinder 201. Each target region of a nozzle, particularly with respect to the circumferential direction of the at least one first central cylinder 201, is preferably clearly defined, at least during printing operation. A target region of a nozzle is particularly the spatial region, particularly substantially rectilinear, that extends outward from said nozzle in an ejecting direction of said nozzle.

The at least one first nozzle bar 213 preferably extends orthogonally to the transport path of printing material 02 across the working width of printing machine 01. The at least one nozzle bar 213 preferably has at least one row of nozzles. The at least one row of nozzles, as viewed in axial direction A, preferably has nozzle openings spaced evenly across the entire working width of printing machine 01 and/or across the entire width of the body of the at least one first central cylinder 201. In one embodiment, a single continuous print head 212 is provided for this purpose, which extends in axial direction A across the entire working width of printing machine 01 and/or across the entire width of the body of the at least one first central cylinder 201. In this case, the at least one row of nozzles is preferably embodied as at least one linear row of individual nozzles, extending across the entire width of printing material web 02 in axial direction A. In another preferred embodiment, a plurality of print heads 212 are arranged side by side in axial direction A on the at least one nozzle bar 213. Since such individual print heads 212 are usually not equipped with nozzles up to the edges of their housing, preferably at least two and more preferably precisely two rows of print heads 212, extending in axial direction A, are preferably arranged offset from one another in the circumferential direction of first central cylinder 201, preferably such that successive print heads 212 in axial direction A are preferably assigned alternatingly to one of the at least two rows of print heads 212, preferably alternating constantly between a first and a second of two rows of print heads 212. Two such rows of print heads 212 form a double row of print heads 212. The at least one row of nozzles is preferably not embodied as a single linear row of nozzles, and instead results as the sum of a plurality of individual rows of nozzles, more preferably two, arranged offset from one another in the circumferential direction.

If a print head 212 has a plurality of nozzles, all the target regions of the nozzles of said print head 212 together form an operating region of said print head 212. Operating regions of print heads 212 of a nozzle bar 213 and particularly of a double row of print heads 212 border one another as viewed in axial direction A and/or overlap as viewed in axial direction A. This serves to ensure that target regions of nozzles of the at least one nozzle bar 213 and/or particularly of each double row of print heads 212 are spaced at regular and preferably periodic distances, as viewed in axial direction A, even if print head 212 is not continuous in axial direction A. In any case, an entire operating region of the at least one nozzle bar 213 preferably extends across at least 90% and more preferably across 100% of the working width of printing machine 01 and/or across the entire width of the body of the at least one first central cylinder 201 in axial direction A. On one or on both sides with respect to axial direction A, a narrow region of printing material web 02 and/or of the body of first central cylinder 201 may be provided which is not assigned to the operating region of nozzle bar 213. An entire operating region of the at least one nozzle bar 213 is preferably composed of all the operating regions of the print heads 212 of said at least one nozzle bar and is preferably composed of all the target regions of nozzles of said print heads 212 of said at least one nozzle bar 213. An entire operating region of a double row of print heads 212, as viewed in axial direction A, preferably corresponds to the operating region of the at least one nozzle bar 213.

The at least one nozzle bar 213 preferably has a plurality of rows of nozzles in the circumferential direction with respect to the at least one first central cylinder 201. Preferably, each print head 212 has a plurality of nozzles, which are further preferably arranged in a matrix of a plurality of lines in axial direction A and/or a plurality of columns, preferably in the circumferential direction of the at least one first central cylinder 201, with columns of this type more preferably being arranged extending at an angle relative to the circumferential direction, for example in order to increase the resolution of a printed image. In a direction orthogonally to axial direction A, particularly in the transport direction along the transport path of printing material 02 and/or in the circumferential direction with respect to the at least one central cylinder 201, preferably a plurality of rows of print heads 212, more preferably four double rows, and even more preferably eight double rows of print heads 212 are arranged in succession. Further preferably, at least during printing operation, a plurality of rows of print heads 212, more preferably four double rows, and even more preferably eight double rows of print heads 212 are arranged in succession in the circumferential direction with respect to the at least one first central cylinder 201, aligned toward the at least one first central cylinder 201.

Thus at least during printing operation, print heads 212 are preferably aligned such that the nozzles of each print head 212 point substantially in the radial direction toward the circumferential cylinder surface of the at least one first central cylinder 201. Deviations of radial directions within a tolerance range of preferably 10° at most and more preferably 5° at most are considered substantially radial directions. This means that the at least one print head 212, aligned toward the circumferential surface of the at least one first central cylinder 201, is aligned with respect to rotational axis 207 of the at least one first central cylinder 201 in a radial direction toward the circumferential surface of the at least one first central cylinder 201. Said radial direction is a radial direction with respect to rotational axis 207 of the at least one first central cylinder 201. A printing ink of a specific color, for example one each of the colors black, cyan, yellow and magenta, or a varnish, for example a clear varnish, preferably is and/or can be assigned to each double row of print heads 212. The corresponding inkjet printing element 211 is preferably embodied as a four-color printing element 211, and enables single-sided, four-color imprinting of printing material web 02. It is also possible to use one printing element 211 to print with fewer or more different ink colors, for example additional special ink colors. In that case, correspondingly more or fewer print heads 212 and/or double rows of print heads 212 are preferably arranged within said corresponding printing element 211. In one embodiment, at least during printing operation, a plurality of rows of print heads 212, more preferably four double rows and even more preferably eight double rows of print heads 212 are arranged in succession, aligned toward at least one surface of at least one transfer element, for example at least one transfer cylinder and/or at least one transfer belt.

The at least one print head 212 acts to generate droplets of coating medium, preferably using the drop-on-demand method, in which droplets of coating medium are produced selectively as needed. At least one piezoelectric element is preferably used per nozzle, which is capable of reducing a volume filled with coating medium by a certain percentage at high speed when a voltage is applied. This causes coating medium to be displaced and ejected through a nozzle connected to the volume that is filled with coating medium, forming at least one droplet of coating medium. By applying different voltages to the piezoelectric element, the actuating path of the piezoelectric element and as a result the reduction in the volume and thus the size of the coating medium droplets can be influenced. This allows color gradations to be achieved in the resulting printed image, without altering the number of droplets used to produce the printed image (amplitude modulation). It is also possible to use at least one heating element per nozzle, which generates a gas bubble at high speed in a volume filled with coating medium by vaporizing coating medium. The additional volume of the gas bubble displaces coating medium, which is in turn ejected through the corresponding nozzle, forming at least one droplet of coating medium.

In the drop-on-demand method, droplet deflection once a droplet has been ejected from the corresponding nozzle is not necessary, because the target position of the respective coating medium droplet on the moving printing material web 02 can be defined in relation to the circumferential direction of the at least one first central cylinder 201 based solely on an ejection time of the respective coating medium droplet and a rotational speed of first central cylinder 201 and/or based on the rotational position of first central cylinder 201. Actuating each nozzle individually allows coating medium droplets to be transferred only at selected times and at selected locations from the at least one print head 212 onto the printing material web 02. This is carried out as a function of the rotational speed and/or the rotational angle position of the at least one first central cylinder 201, the distance between the respective nozzle and printing material web 02 and the position of the target region of the respective nozzle in relation to the circumferential angle. This results in a desirable printed image, produced as a function of the actuation of all nozzles. Ink droplets are preferably ejected from the at least one nozzle of the at least one print head 212 based on the angular position of first drive motor 208, as predefined by the machine controller. The first target data 617 relating to the angular position of first drive motor 208, as specified by the machine controller to first drive motor 208, are preferably incorporated in real time into a calculation of data for actuating the nozzles of the at least one print head 212. A comparison with actual data regarding the angular position of first drive motor 208 is preferably not necessary, and preferably is not carried out. Thus a precise and constant positioning of printing material web 02 relative to the at least one first central cylinder 201 is critical for producing a printed image that is true to registration and/or register.

The nozzles of the at least one print head 212 are arranged in such a way that the distance between the nozzles and the printing material web 02 arranged on the circumferential cylinder surface of the at least one first central cylinder 201 is preferably between 0.5 mm and 5 mm and more preferably between 1 mm and 1.5 mm. The high angular resolution and/or high scanning frequency of the first rotational angle sensor 617 and/or the high precision of the first target data 617 relating to the angular position of first drive motor 208 of first central cylinder 201, as predefined by the machine controller and processed by first drive motor 208 of first central cylinder 201, enable a highly precise position determination and/or knowledge of the location of printing material web 02 in relation to the nozzles and the target regions thereof. The droplet flight time between the nozzles and printing material web 02 is known, for example, from a learning process and/or from the known distance between the nozzles and printing material web 02 combined with a known droplet speed. The rotational angle position of the at least one first central cylinder 201 and/or of the first drive 208 of the at least one first central cylinder 201, the rotational speed of the at least one first central cylinder 201 and the droplet flight time are used to determine the ideal time for ejection of a respective droplet so that printing material web 02 will be imprinted in a manner that is true to registration and/or true to register.

At least one sensor embodied as a first printed image sensor is preferably provided, more preferably at a point along the transport path of printing material web 02 downstream of first printing element 211. The at least one first printed image sensor is embodied, for example, as a first line camera or as a first surface camera. The at least one first printed image sensor is embodied, for example, as at least one CCD sensor and/or as at least one CMOS sensor. The actuation of all the print heads 212 and/or double rows of print heads 212 of first printing element 211, arranged and/or acting in succession in the circumferential direction of the at least one first central cylinder 201, is preferably monitored and controlled by means of this at least one first printed image sensor and a corresponding analysis unit, for example the higher level machine controller. In a first embodiment of the at least one printed image sensor, only a first printed image sensor is provided, the sensor field of which encompasses the entire width of the transport path of printing material web 02. In a second embodiment of the at least one printed image sensor, only a first printed image sensor is provided, however it is embodied as movable in direction A, orthogonally to the direction of the transport path of printing material web 02. In a third embodiment of the at least one printed image sensor, a plurality of printed image sensors are provided, the respective sensor fields of which each encompass different regions of the transport path of printing material web 02. These regions are preferably arranged offset from one another in direction A, orthogonally to the direction of the transport path of printing material web 02. The total of the sensor fields of the plurality of printed image sensors preferably makes up one entire width of the transport path of printing material web 02.

The positioning of pixels formed by coating medium droplets, each of which emerges from a respective first print head 212, is preferably compared with the positioning of pixels formed by coating medium droplets, each of which emerges from a respective second print head 212 situated downstream of the respective first print head 212 in the circumferential direction of the at least one first central cylinder 201. This is preferably carried out regardless of whether said respective first and second print heads 212, which are arranged and/or act in succession in the circumferential direction of the at least one first central cylinder 201, are processing the same or a different coating medium. The correlation of the positions of the printed images coming from different print heads 212 is monitored. If the same coating mediums are being used, the true-to-register joining of partial images is monitored. If different coating mediums are being used, the registration or color-to-color registration is monitored. Quality control of the printed image is also preferably carried out based on the measured values of the at least one printed image sensor.

During regular printing operation, all print heads 212 are arranged as stationary. This serves to ensure a consistently proper color-to-color registration and/or true-to-register alignment of all nozzles. Various situations are conceivable in which a movement of the print heads 212 might be necessary. A first such situation is a flying roll change or generally a roll change involving a splicing process. In such a process, one printing material web 02 is connected by means of an adhesive strip to another printing material web 02. This results in a splice point, which must pass through the entire transport path of the printing material web 02. The thickness, that is, the smallest dimension of said splice point is greater than the thickness of the printing material web 02. The splice point has essentially the same thickness as two printing material webs 02 plus the adhesive strip. This can cause difficulties when the splice point passes through the gap between the nozzles of print heads 212 and the circumferential cylinder surface of the at least one first central cylinder 201. Therefore the at least one nozzle bar 213 can be moved in at least one direction relative to rotational axis 207 of the at least one first central cylinder 201. This allows the spacing to be increased sufficiently; however, it must be decreased again accordingly afterward. A second such situation arises, for example, during maintenance and/or cleaning of at least one of print heads 212. Print heads 212 are preferably secured individually to the at least one nozzle bar 213 and can be individually removed from the at least one nozzle bar 213. This allows individual print heads 212 to be maintained and/or cleaned and/or replaced.

When a plurality of nozzle bars 213 that can be moved relative to one another is provided, minimal misalignments of the nozzle bars 213 relative to one another can occur during the return of at least one nozzle bar 213 to its printing position. Thus it can be necessary to perform an alignment, specifically of all the print heads 212 of one nozzle bar 213 in relation to the print heads 212 of other nozzle bars 213. When a new print head 212 and/or a print head to be replaced is installed on the at least one nozzle bar 213 on which at least one other print head 212 is already installed, this will not necessarily produce a precisely matched alignment of this new print head 212 and/or print head to be replaced with the at least one print head 212 that is already installed, specifically in the circumferential direction and/or in axial direction A with respect to the at least one first central cylinder 201; at best, such an alignment will occur accidentally. Thus it may also be necessary to perform an alignment in this case, specifically of an individual print head 212 in relation to other print heads 212 of the same nozzle bar 213 and/or other nozzle bars 213.

At least one sensor detects the location of the target region of at least one new and/or replaced print head 212 relative to the location of the target region of at least one previously mounted print head 212. The installed position of the at least one new and/or replaced print head 212 can be adjusted in the circumferential direction with respect to the at least one first central cylinder 201 by actuating the nozzles of said print head 212, preferably in a manner similar to the adjustment of print heads 212 of different double rows of print heads 212 already described. The installed position of the at least one new and/or replaced print head 212 is adjusted in axial direction A with respect to the at least one first central cylinder 201 by means of at least one adjustment mechanism. Preferably, each of a plurality of print heads 212 has its own adjustment mechanism, and more preferably, each print head 212 has its own adjustment mechanism.

Printing machine 01 has at least one system for supplying coating medium, in particular a printing ink supply system. Preferably, a plurality of print heads 212, for example a plurality of print heads 212 of a common nozzle bar 213, in particular a plurality of print heads 212 or more preferably all the print heads in each double row of print heads 212, have a common system for supplying coating medium. This common supply system preferably has at least one main reservoir. At least one first fluid line or ink line per print head 212 is connected to the at least one main reservoir. The at least one main reservoir preferably is connected via at least one supply line and at least one drain line to at least one and preferably at least the same intermediate reservoir.

The fill level of the main reservoir, at least during a printing operation and more preferably perpetually, is preferably constant with only slight deviations within a narrow tolerance range. This constant fill level can be achieved, for example, by providing a preferably passive overflow drain and an influx of coating medium. Preferably, the at least one main reservoir and/or the at least one drain have at least one preferably passive overflow drain, the drain side of which is preferably arranged such that it is and/or can be connected to the at least one intermediate reservoir. At least one valve, preferably embodied as a flow check valve, is preferably arranged within the at least one supply line and/or within the at least one drain line. At least one first liquid pump is preferably arranged in the at least one supply line. A controlled and/or regulated normal pressure is preferably present in the main reservoir, and is more preferably controlled and/or regulated relative to an ambient pressure. The pressure in the main reservoir is preferably a negative pressure in relation to the ambient pressure.

Coating medium is preferably pumped by at least one pump from the intermediate reservoir into the main reservoir. At least one volume provided as a first gas-filled space is preferably arranged in the at least one main reservoir. The at least one first gas-filled space is preferably connected via at least one first gas line to at least one first gas pump. The same pressure as in the at least one first gas-filled space of the at least one main reservoir is preferably present in a second gas-filled space of the intermediate reservoir. Preferably, the at least one intermediate reservoir is connected to at least one buffer reservoir, and more preferably via at least one suction line. The buffer reservoir is preferably at ambient pressure. Coating medium is preferably conveyed out of the buffer reservoir into the intermediate reservoir by virtue of the relative negative pressure.

A plurality of print heads 212, for example a plurality of print heads 212 of a common nozzle bar 213, in particular a plurality of print heads 212 or more preferably all the print heads of a double row of print heads 212, preferably have a common voltage supply system 606. At least one common power supply line for the voltage supply preferably extends within the respective at least one nozzle bar over at least 50%, more preferably at least 75% and even more preferably at least 90% of the width of the operating region of the respective at least one nozzle bar 213 in axial direction A and/or of the working width of printing machine 01. Each print head 212 of said respective at least one nozzle bar 213 preferably has at least one dedicated power line 627, which is connected to said common power supply line for the voltage supply. Each print head 212 of said respective at least one nozzle bar 213 preferably has at least one dedicated data line, which is connected to a computer unit which is arranged outside the operating region of the respective at least one nozzle bar 213 with respect to axial direction A, and/or outside of each transport path provided for printing material 02 in printing machine 01 with respect to axial direction A. Thus at least one data line per print head 212 of said at least one nozzle bar 213 extend parallel to one another, at least along a section of nozzle bar 213 that extends in axial direction A.

Preferably, at least one nozzle cleaning device is provided, which has at least one row of washing nozzles and/or brushes and/or squeegees.

Once printing material web 02 has passed the at least one first printing unit 200, printing material web 02 is transported further along its transport path and is preferably fed to the at least one first dryer 301 of the at least one dryer unit 300. The first side of printing material web 02, which has been imprinted by the at least one first printing unit 200, preferably is not in contact with any component of web-fed printing machine 01 between a last point of contact of printing material web 02 with the at least one first central cylinder 201 of the at least one first printing unit 200 and an area of action of the at least one first dryer 301. The second side of printing material web 02, which particularly has not been imprinted by first printing unit 200 and which is in contact with the at least one first central cylinder 201 of the at least one first printing unit 200, is preferably in contact with at least one turning roller 214 of the at least one first printing unit 200 and/or with at least one turning roller 312 of the at least one first dryer 301, between the last point of contact of printing material web 02 with first central cylinder 201 of the at least one first printing unit 200 and the area of action of the at least one first dryer 301. At least one third measuring device 214, more preferably embodied as a third measuring roller 214, is preferably provided. This third measuring device 214 is used to measure web tension. Further preferably, the at least one turning roller 214 of first printing unit 200 is identical to the third measuring device 214 embodied as the third measuring roller 214.

The at least one first dryer 301 is preferably embodied as an infrared radiation dryer 301. The at least one first dryer 301 preferably has at least one radiation source 302, preferably embodied as an infrared radiation source 302. A radiation source 302, preferably an infrared radiation source 302, in this case is a device by means of which electrical energy is and/or can be purposely converted to radiation, preferably infrared radiation, and is and/or can be directed toward printing material web 02. The at least one radiation source 302 preferably has a defined area of action. The area of action of a radiation source 302 is particularly the area that contains every point that can be connected, in a straight line and without interruption, directly or via reflectors to the radiation source 302. The area of action of the at least one first dryer 301 is composed of the areas of action of all radiation sources 302 of the at least one first dryer 301. The area of action of the at least one first dryer 301 preferably points from the at least one radiation source 302 to a part of the transport path of printing material web 02 that is closest to the at least one radiation source 302. Air is introduced into the interior of the at least one first dryer 301 through at least one ventilation opening. Inside first dryer 301, water and/or solvent from the coating medium to be removed from printing material web 02 is removed by means of the infrared radiation and is absorbed into the introduced air. This air is then removed from the at least one first dryer 301 through at least one venting opening.

In a preferred embodiment, the provided transport path for printing material 02 through the at least one first dryer 301 has at least two sub-sections, each extending in directions that have vertical components, more preferably greater vertical components than any optionally provided horizontal components. The provided transport path of the printing material along the one sub-section preferably extends with at least one component in an upward vertical direction. The provided transport path of the printing material along the other sub-section preferably extends with at least one component in a downward vertical direction. The one sub-section and the other sub-section of the provided transport path are preferably connected to one another by means of at least one provided connecting section of the provided transport path. The at least one connecting section preferably extends in a direction having a horizontal component, more preferably having a greater horizontal component than an optionally provided vertical component. As a result, the at least one dryer 301 can preferably be particularly compact in configuration.

At least one first cooling unit 303 is preferably arranged downstream of the area of action of the at least one radiation source 302 of the at least one first dryer 301 in the direction of transport of printing material web 02. The at least one first cooling unit 303 preferably comprises at least one first cooling roller 304 and preferably a first cooling pressure roller 306, which can be and/or is thrown onto the at least one first cooling roller 304, and preferably comprises at least one turning roller 307; 308 that can be and/or is thrown onto the at least one first cooling roller 304. A first drive motor 311, embodied as a first cooling roller drive motor 311 and assigned to the at least one first cooling roller 304, and the first cooling pressure roller 306 are preferably part of a web tension adjusting unit, that is, they are arranged so as to adjust the web tension and for this purpose are preferably connected at least partially and/or intermittently to the higher level machine controller. The at least one first cooling roller 304 preferably represents at least one fourth motor-driven rotational body 304. Printing material web 02 wraps around and contacts, preferably along its transport path, the at least one first cooling roller 304 with a wrap angle of preferably at least 180° and more preferably at least 270°. The first cooling pressure roller 306 and the at least one first cooling roller 304 together preferably form a first cooling nip 309, in which printing material web 02 is preferably arranged and/or through which printing material web 02 preferably passes. Printing material web 02 is thereby pressed by cooling pressure roller 306 against the at least one first cooling roller 304. The at least one first cooling roller 304 of the at least one first cooling unit 303 is preferably embodied as a cooling roller 304 through which a coolant flows.

Along the transport path of printing material web 02, downstream of the at least one first cooling unit 303, at least one second printing unit 400 is preferably arranged. Along the transport path of printing material web 02, preferably immediately upstream of the at least one second printing unit 400 and preferably downstream of the at least one first dryer 301, and particularly downstream of the at least one first printing unit 200, at least one second web edge aligner, which can preferably be controlled and/or regulated manually or automatically, is preferably provided. The at least one second printing unit 400 is similar in configuration to first printing unit 200. In particular, second printing unit 400 has a second central printing cylinder 401, or a central cylinder 401, around which printing material 02 wraps during printing operation, likewise with a wrap angle of preferably at least 180° and more preferably at least 270°. Second central cylinder 401 preferably represents a fifth motor-driven rotational body 401. The rotational direction of second central cylinder 401 of second printing unit 400 is preferably opposite the rotational direction of the at least one first central cylinder 201. Along the transport path of printing material web 02 upstream of second central cylinder 401 of second printing unit 400, a second printing material cleaning device 402 or web cleaning device 402 is preferably arranged so as to act on printing material web 02.

The transport path of printing material web 02 through the at least one second printing unit 400 extends similarly to the transport path through the at least one first printing unit 200. In particular, printing material web 02 preferably wraps around part of a second turning roller 403 and is turned by said roller such that the transport path of printing material web 02 in the second gap 404 extends both tangentially to second turning roller 403 and tangentially to second central cylinder 401. At least one cylinder 406, embodied as a second impression cylinder 406, is preferably arranged in second printing unit 400. Second impression cylinder 406 is preferably similar in configuration and arrangement to first impression cylinder 206, particularly in terms of its movability and in terms of a second impression nip 409. Second central cylinder 401 is preferably similar in arrangement and configuration to first central cylinder 201, particularly with respect to a second drive motor 408 of second central cylinder 401 and with respect to a corresponding preferably provided second rotational angle sensor 618, which is embodied to measure and/or be capable of measuring the angular position of second drive motor 408 and/or of second central cylinder 401 itself and to transmit and/or be capable of transmitting this measurement to the higher level machine controller.

Additionally or alternatively, the second drive motor 408 of the second central cylinder 401 is connected in terms of circuitry to the machine controller in such a way that the machine controller is informed at all times about the rotational position of the second drive motor 408 and therefore simultaneously about the rotational position of the second central cylinder 401 based on second target data 618 relating to a rotational position of the second drive motor 408 specified by the machine controller to the second drive motor 408 of the second central cylinder 401.

Within second printing unit 400, at least one second printing element 411, embodied as an inkjet printing element 411 or ink-jet printing element 411, is preferably arranged downstream of second impression cylinder 406 in the direction of rotation of second central cylinder 401, and therefore along the transport path of printing material web 02, aligned toward second central cylinder 401. The at least one second printing element 411 of the at least one second printing unit 400 is preferably identical to the at least one first printing element 211 of the at least one first printing unit 200, particularly with respect to at least one nozzle bar 413, at least one print head 412 embodied as an inkjet print head 412 and the arrangement thereof in double rows, the implementation and resolution of the printing process, the arrangement, alignment and actuation of the nozzles and the movability and adjustability of the at least one nozzle bar 413 and the at least one print head 412 by means of at least one adjustment mechanism having a corresponding electric motor. A similar protective cover and/or cleaning device is also preferably provided. The proper alignment of the print heads 412 of the at least one second printing unit 400 is also preferably monitored by at least one sensor which detects a printed image and the machine controller which evaluates said printed image. This at least one sensor is preferably at least one second printed image sensor, which is similar in embodiment to the at least one first printed image sensor. The at least one second printing element 411 is preferably embodied as a four-color printing element 411.

At least one second dryer 331 is arranged downstream of the at least one second printing unit 400 with respect to the transport path of printing material web 02. Once printing material web 02 has passed through the at least one second printing unit 400, printing material web 02 is transported further along its transport path and is preferably fed to the at least one second dryer 331 of the at least one dryer unit 300. The at least one second dryer 331 is preferably similar in configuration to the at least one first dryer 301. The at least one first dryer 301 and the at least one second dryer 331 are components of the at least one dryer unit 300. The second side of printing material web 02, which has been imprinted by the at least one second printing unit 400, is preferably not in contact with any component of web-fed printing machine 01 between a last point of contact of printing material web 02 with second central cylinder 401 of the at least one second printing unit 400 and an area of action of the at least one second dryer 301. At least one turning roller 414 is preferably provided in second printing unit 400. Said at least one turning roller 414 is preferably embodied as a fifth measuring device 414, in particular a fifth measuring roller 414.

The configuration of the at least one second dryer 331 is similar to the configuration of the at least one first dryer 301, particularly with respect to a transport path provided for printing material and/or with respect to its embodiment as an air flow dryer 331 and/or a radiation dryer 331 and/or a hot air dryer 331 and/or an infrared radiation dryer 331 and/or a UV radiation dryer 331. In particular, the at least one second dryer 331 preferably has at least one second cooling roller 334, which preferably represents at least one sixth motor-driven rotational body 334. The second cooling roller 334 preferably is and/or can be driven by means of a second cooling roller drive 341. The at least one second dryer 331 is preferably substantially and more preferably fully symmetrical in configuration to the at least one first dryer 301. The at least one second dryer 331 is preferably part of the same dryer unit 300 as the at least one first dryer 301 and is more preferably arranged in the same housing 329. In terms of a spatial arrangement, dryer unit 300, and therefore preferably the at least one first dryer 301 and the at least one second dryer 331, is preferably arranged between the at least one first printing unit 200 and the at least one second printing unit 400.

Along the transport path of printing material web 02, downstream of the at least one second dryer 331, at least one outfeed roller 501 is provided. The at least one outfeed roller 501 preferably has its own drive motor 504, embodied as outfeed roller drive 504. The at least one outfeed roller 504 preferably represents at least one seventh motor-driven rotational body 504. The at least one outfeed roller 501, preferably together with an outfeed pressure roller 502 that is and/or can be thrown onto the at least one outfeed roller 501, forms an outfeed nip 503, in which printing material web 02 is clamped and through which printing material web 02 is transported. Outfeed nip 503 preferably serves to regulate web tension and/or to transport printing material web 02.

With respect to the transport path of printing material web 02 upstream and/or downstream of outfeed roller 501, but particularly along the transport path of printing material 02 downstream of the at least one first dryer 301, at least one rewetting unit is preferably provided, which preferably compensates for any excess loss of moisture in printing material web 02 as a result of treatment by dryer unit 300.

Along the transport path of printing material web 02 downstream of outfeed nip 503 and/or downstream of the rewetting unit, at least one post-processing unit 500 is arranged, which is preferably embodied as a folding apparatus 500 and/or has a sheet cutter 500 and/or a planar delivery unit 500, or is embodied as a winding apparatus 500. In and/or by means of this post-processing unit 500, printing material web 02 is preferably folded and/or cut and/or stitched and/or sorted and/or inserted and/or transported and/or wound.

In at least one variant of the printing machine, printing machine 01 is embodied as a web-fed rotary inkjet printing machine 01, and at least one transfer element is arranged so as to form a transfer nip with the at least one first central printing cylinder 201. In that case, the at least one print head 212 is preferably aligned toward the at least one transfer element.

Printing machine 01 preferably has at least one printing data processing unit 600, or printing data processor 600. The at least one printing data processor 600 is preferably part of the machine controller of printing machine 01 and/or is and/or can be connected to the machine controller of printing machine 01. Preferably, the at least one printing data processor 600 has at least one first data memory 601 embodied as an image data memory 601. The at least one image data memory 601 is preferably used for at least one storing of image data, particularly in the form of template image data 641; 642; 643; 644; 1643; 1644 and/or geometrically modified image data, in particular geometrically modified template image data 641; 642; 643; 644; 1643; 1644. In this context, image data are understood as data that contain at least one printing image to be printed, in electronically stored form. Such image data may be present in various forms. One such form is a matrix of pixels, for example a bitmap. Another form is a page description, for example in vector form, for example in the form of at least one pdf file ("portable document format" file). However, other file formats for storing the image data may also be used. In particular, template image data 641; 642; 643; 644; 1643; 1644 may be provided in the form of at least one matrix of pixels and/or preferably in the form of at least one page description. It is noted, in particular, that image data and/or template image data 641; 642; 643; 644; 1643; 1644 relate to printing images, in other words information that may also consist at least partially or exclusively of text and/or symbols, for example, and does not necessarily contain graphic elements such as photographs or drawings.

Template image data 641; 642; 643; 644; 1643; 1644 are preferably understood as image data, the motifs and configurations of which correspond to the printing image that a finished printed product would ideally have upon completion of the printing process. Template image data 641; 642; 643; 644; 1643; 1644 are preferably data that are available to printing machine 01 and/or that are and/or have been stored in printing machine 01 and/or that are stored in a data memory of printing machine 01, for example in the at least one image data memory 601. An operator is preferably no longer able to directly influence changes in the image data which are optionally carried out once the template image data 641; 642; 643; 644; 1643; 1644 have been compiled. At least, such influence is preferably unnecessary. Operating the printing machine is therefore simplified. Due to technical aspects, however, at least one such change is preferably carried out, more preferably by means of the at least one data processor 600 and/or the machine controller of printing machine 01. Geometrically modified image data in this context are preferably understood as geometrically modified template image data 641; 642; 643; 644; 1643; 1644 and/or geometrically modified raster data 647. Geometrically modified template image data 641; 642; 643; 644; 1643; 1644 are preferably image data that are generated when portions of the template image data 641; 642; 643; 644; 1643; 1644 are moved, in particular displaced, in relation to other portions of the template image data 641; 642; 643; 644; 1643; 1644, and/or when template image data 641; 642; 643; 644; 1643; 1644 are partially or fully stretched. Geometrically modified raster data 647 are preferably image data that are generated when portions of raster data 647 are moved, in particular displaced, in relation to other portions of raster data 647, and/or when raster data 647 are partially or fully stretched.

In the preceding and/or in the following, when image data and/or template image data 641; 642; 643; 644 and/or geometrically modified template image data 641; 642; 643; 644 and/or raster data 647 and/or geometrically modified raster data 647 and/or output data 646 and/or control data 646 are described as being moved and/or stretched and/or displaced and/or geometrically modified, and/or when individual pages 638; 639 and/or complete printing images 636; 637 are described as being moved and/or stretched and/or displaced and/or geometrically modified within stored data, this is particularly understood to mean that the stored data, in particular image data and/or template image data 641; 642; 643; 644 and/or geometrically modified template image data 641; 642; 643; 644 and/or raster data 647 and/or geometrically modified raster data 647 and/or output data 646 and/or control data 646, are altered such that after the alteration, corresponding graphic components of an image defined by these stored data, in particular image data and/or template image data 641; 642; 643; 644 and/or geometrically modified template image data 641; 642; 643; 644 and/or raster data 647 and/or geometrically modified raster data 647 and/or output data 646 and/or control data 646, are defined as correspondingly stretched and/or displaced and/or geometrically modified graphic components of the image thereafter defined by these correspondingly altered stored data, in particular image data and/or template image data 641; 642; 643; 644 and/or geometrically modified template image data 641; 642; 643; 644 and/or raster data 647 and/or geometrically modified raster data 647 and/or output data 646 and/or control data 646. This is specifically not understood to mean that an at least partially different physical memory map is assigned to the stored data, in particular image data and/or template image data 641; 642; 643; 644 and/or geometrically modified template image data 641; 642; 643; 644 and/or raster data 647 and/or geometrically modified raster data 647 and/or output data 646 and/or control data 646, however this does not exclude the possibility that a change in the physical memory map may occur.

The at least one printing data processor 600 preferably has at least one raster graphics processor 603. The at least one raster graphics processor 603 is preferably used for rastering image data, in particular template image data 641; 642; 643; 644; 1643; 1644 and/or geometrically modified template image data 641; 642; 643; 644; 1643; 1644 and for generating raster data 647 therefrom. The at least one image data memory 601 and the at least one raster graphics processor 603 are preferably components of at least one computer 611, preferably embodied as an image data computer 611. The at least one printing data processor 600 preferably has at least one second data memory 602 embodied as a raster data memory 602. The at least one raster data memory 602 is preferably used for at least one storing of raster data 647. Raster data 647 are preferably rastered template image data 641; 642; 643; 644; 1643; 1644 and/or rastered geometrically modified template image data 641; 642; 643; 644; 1643; 1644. The at least one raster data memory 602 is preferably a component of at least one computer 612, preferably embodied as a raster data computer 612. The at least one raster data computer 612 is preferably arranged such that it is and/or can be connected via at least one first data line 609, for example at least one first Ethernet line 609, to the at least one image data computer 611. More preferably, the printing data processor 600 has at least one raster data memory 602 and/or at least one raster data computer 612 per printing unit 200; 400, and thus preferably at least two raster data memories 602 and/or at least two raster data computers 612 in the case of two printing units 200; 400. Even more preferably, the printing data processor 600 has at least one raster data memory 602 and/or at least one raster data computer 612 for each printing ink and each printing unit 200; 400, and thus preferably at least eight raster data memories 602 and/or at least eight raster data computers 612 in the case of two printing units with four printing inks each.

A partial image is preferably understood as a part of an image which, together with other partial images, produces a complete image. A partial image may be a color separation of a printing image, for example. A multi-color printing image can be produced, for example, by superimposing four partial images in the colors cyan, yellow, magenta and black; other colors may also be used. Raster data 647 preferably represent at least one image matrix of image elements, more preferably at least one partial image matrix 629 of partial image elements. Image elements are pixels, for example. Partial image elements are partial pixels, for example. One image element thus preferably corresponds to a minimal segment of a printing image, in particular to a pixel that may or may not be present. The printing image is produced by arranging all the image elements in their respectively designated positions within the image matrix. This designated position is preferably determined by a uniquely assigned line designation and a uniquely assigned column designation. A partial image element therefore preferably corresponds to a minimal segment of a partial image of the printing image, for example a minimal segment of a color separation of the printing image. The partial image is produced by arranging all the partial image elements in their respective designated positions within the partial image matrix 629 corresponding to the partial image. Each of these designated positions is, in turn, preferably defined by a uniquely assigned line designation and a uniquely assigned column designation.

The at least one printing data processor 600 preferably has at least one data assignment unit 604, in particular image data assignment unit 604, which is further preferably embodied as at least one raster data assignment unit 604. More preferably, the printing data processor 600 has at least one data assignment unit 604 per printing unit 200; 400, and thus preferably at least two data assignment units 604 in the case of two printing units 200; 400. Even more preferably, the printing data processor 600 has at least one data assignment unit 604 per printing ink and per printing unit 200; 400, and thus preferably at least eight data assignment units 604 in the case of two printing units 200; 400, each having four printing inks. The at least one data assignment unit 604 is preferably arranged such that it is and/or can be connected to the at least one image data computer 611 and/or more preferably to the at least one raster data memory 602 and/or the at least one raster data computer 612 by means of at least one second data line 613.

The at least one printing data processor 600 preferably has at least one first input device 608. More preferably, the at least one printing data processor 600 has at least one first input device 608 per printing unit 200; 400, and thus preferably at least two first input devices 608 in the case of two printing units 200; 400. The at least one first input device 608 has, for example, at least one especially touch-sensitive operating device, for example a touchscreen, and/or has at least one display device and/or has at least one data memory, for example, and/or has, for example, at least one data processing unit, for example a computer processor.

The at least one printing data processor 600 preferably has at least one signal source 617; 618 for identifying a rotational angle position particularly of at least one central cylinder 201; 401. The at least one signal source 617; 618 for identifying a rotational angle position is embodied, for example, as the at least one first rotational angle sensor 617 particularly of the first central cylinder 201 and/or as the at least one second rotational angle sensor 618 particularly of the second central cylinder 401 and/or as first target data 617 relating to the angular position of the first drive motor 208 and/or as second target data 618 relating to the angular position of the second drive motor 408.

The at least one printing data processor 600 preferably has at least one register sensor 619, and/or the at least one printing data processor 600 is preferably arranged such that it is and/or can be connected in terms of circuitry to at least one register sensor 619. The at least one register sensor 619 is preferably used to detect at least one first printing image, preferably applied to the printing material 02, for example at least one register mark. The at least one register sensor 619 preferably detects a position of at least one and more preferably of each first printing image applied by the at least one first printing element 211 to the first side of the printing material web 02. A barcode, for example, may be used as the at least one printing image which is detected by the register sensor 619, and which is applied to the printing material web 02 for this purpose in the first printing unit 200. Such a barcode may contain information about the content and/or image dimensions of a printing image applied by the first printing unit 200 to the printing material web 02. However, a simple symbol, for example a dash, may also be used as the at least one printing image that is detected by register sensor 619. At least one entire first complete printing image 636, for example, may also be used as the at least one printing image that is detected by register sensor 619. At least one maintenance printing image, for example, which is generated in addition to desired printing images at regular intervals, for example, to perform maintenance on all nozzles and thereby maintain constant readiness for immediate printing on demand, more particularly strips, for example, which are printed between individual complete printing images and are optionally cut off of the printing material in a post-processing step, may also be used as the at least one printing image that is detected by register sensor 619.

The detection of the printing image preferably facilitates the achievement of high quality in terms of register and/or color-to-color registration of a printing image yet to be applied relative to a printing image that has already been applied, particularly of a second complete printing image 637 yet to be applied relative to a first complete printing image 636 that has already been applied, even if, for example, a section length, that is, a length of printing images applied in the direction of the transport path of printing material web 02, is changed. The at least one register mark is preferably at least one printing image generated for this purpose or a portion of a printing image that is part of the actual print order, for example the first complete printing image 636. At least one register mark, and more preferably a row of register marks at regular intervals, are imprinted by means of the at least one first printing unit 200 and/or by means of an additional printing unit on a first side of the printing material 02. Such an additional printing unit is an offset printing unit, for example, by means of which the printing material 02 is and/or has been imprinted even before being fed to the at least one first printing unit 200.

A printing image printed by the at least one first printing unit 200 and/or a register mark printed by the at least one first printing unit 200 is preferably detected in the at least one second printing unit 400 by means of the at least one register sensor 619. The higher level machine controller and particularly the at least one printing data processor 600 preferably uses the position of this printed printing image and/or this register mark to calculate the ideal timeframe for actuating the nozzles of the print heads 412 of the at least one second printing element 411 of the at least one second printing unit 400. In this manner, a true-to-register alignment and/or an alignment with proper color-to-color registration of the printing image produced by the first printing unit 200 and the printing image produced by the second printing unit 400 can be achieved, more particularly of the at least one second complete printing image 637 relative to the at least one first complete printing image 636. Particularly in the case of double-sided printing, a true-to-register alignment of the first printing image or first complete printing image 636 on the first side of the printing material web 02 in relation to the second printing image or second complete printing image 637 on the second side of the printing material web 02 can be achieved.

A printing image printed by at least one additional printing unit and/or by another printing machine and/or a register mark printed by the at least one additional printing unit and/or other printing machine is preferably detected in the at least one first printing unit 200 by means of at least one register sensor 619. The higher level machine controller and particularly the at least one printing data processor 600 preferably uses the position of this printing image and/or this register mark to calculate the ideal time for actuating the nozzles of the print heads 212 of the at least one first printing element 211 of the at least one first printing unit 200. In this manner, a true-to-register alignment and/or an alignment with proper color-to-color registration of the printing image produced by the first printing unit 200 and of the printing image produced by the additional printing unit and/or other printing machine can be achieved.

If the at least one register sensor 619 is assigned to the at least one second printing unit 400, the at least one register sensor 619 is preferably arranged closer, in relation to the transport path of the printing material web 02, to the second central cylinder 401 and/or transfer element than it is to the first central cylinder 201 and/or transfer element. This allows the greatest number of influences to which printing material web 02 is exposed along its transport path between the at least one first printing element 211 and the at least one second printing element 411, for example stretching of the printing material web 02 along the transport path, to be factored in. The at least one register sensor 619 is preferably embodied as at least one surface camera 619. A surface camera of this type preferably has a sufficiently high resolution to detect register errors and/or registration errors, for example a resolution greater than 0.05 mm. The at least one register sensor 619 is preferably identical to the at least one first printing image sensor with which the actuation of all print heads 212 and/or double rows of print heads 212 of the first printing element 211, particularly arranged and/or acting one in front of the other in the circumferential direction of the first central cylinder 201, is monitored and regulated.

The at least one register sensor 619 is preferably arranged such that it is and/or can be connected directly or via at least one additional interconnected operating device 614; 616 to the at least one data assignment unit 604. The at least one signal source 617; 618 for identifying a rotational angle position is preferably arranged such that it is and/or can be connected directly or via at least one additional interconnected operating device 614; 616; 621 to the at least one data assignment unit 604. The at least one input device 608 is preferably arranged such that it is and/or can be connected directly or via at least one additional interconnected operating device 614 to the at least one data assignment unit 604.

The at least one printing data processor 600 preferably has at least one operating device 614 embodied as a synchronizer 614, more preferably at least one synchronizer 614 for each printing unit 200; 400, in particular at least two synchronizers 614 in the case of two printing units 200; 400. The at least one data assignment unit 604 is preferably arranged such that it is and/or can be connected to the at least one synchronizer 614. The at least one first input device 608 is preferably arranged such that it is and/or can be connected to the at least one synchronizer 614. The at least one first input device 608 is preferably arranged such that it is and/or can be connected via the operating device 614 embodied as at least one synchronizer 614 to the at least one data assignment unit 604. The at least one synchronizer 614 is preferably used to forward incoming signals in synchronization with one another.

The at least one printing data processor 600 preferably has at least one operating device 616 embodied as a data preparation unit 616, particularly a data synchronizer 616, more preferably at least one data preparation unit 616 for each printing unit 200; 400, in particular at least two data preparation units 616 in the case of two printing units 200; 400. The at least one data preparation unit 616 preferably converts incoming data to at least one format that can be processed by devices downstream, for example by synchronizer 614. The at least one register sensor 619 is preferably arranged such that it is and/or can be connected to the at least one data preparation unit 616. The at least one data preparation unit 616 is preferably arranged such that it is and/or can be connected to the at least one synchronizer 614. In particular, the at least one register sensor 619 is therefore arranged such that it is and/or can be connected at least via the at least one data preparation unit 616 and/or at least via the at least one synchronizer 614 to the at least one data assignment unit 604.

The at least one printing data processor 600 preferably has at least one operating device 621 embodied as at least one signal transducer 621 for rotational angle positions, in particular for rotational angle positions of the at least one first central cylinder 201 and/or rotational angle positions of the at least one second central cylinder 401 and/or rotational angle positions of the at least one first drive motor 208 of the at least one first central cylinder 201 and/or rotational angle positions of the at least one second drive motor 408 of the at least one second central cylinder 401. The at least one signal transducer 621 is preferably arranged such that it is and/or can be connected to the at least one data preparation unit 616. The at least one signal transducer 621 is therefore preferably arranged such that it is and/or can be connected at least indirectly to the at least one synchronizer 614 and/or to the at least one data assignment unit 604.

The at least one printing data processor 600 is preferably arranged such that it is and/or can be connected to the at least one common voltage supply system 606 of printing machine 01. Printing machine 01 preferably has at least one common voltage supply system 606 per printing unit 200; 400, more preferably one common voltage supply system 606 for each double row of print heads 212; 412. The at least one common voltage supply system 606 preferably has at least one voltage source 607, which further preferably supplies at least one electric voltage measuring 12 V and/or 24 V and/or 26 V, for example.

The at least one print head 212; 412 preferably has at least one print head controller 622. More preferably, each print head 212; 412 has at least one dedicated and preferably precisely one dedicated print head controller 622. Each print head controller 622 is preferably arranged such that it is and/or can be connected to the at least one voltage source 607 via at least one dedicated power line 627. At least one voltage and fuse connector 628 is preferably arranged along this dedicated power line 627. Said connector ensures, for example, a connection between print head controller 622 and voltage source 607 and/or protection against power surges or the like. Each print head 212; 412 is preferably arranged such that it is and/or can be connected directly and/or via the at least one print head controller 622 assigned to it to the at least one voltage source 607. At least one data line 623 and at least one voltage supply line 624, different from the data line, preferably extend between each print head 212; 412 and the print head controller 622 assigned to it. Alternatively, at least one common line, embodied as both data line and voltage supply line, extends between each print head 212; 412 and the print head controller 622 assigned to it. Each print head controller 622 is preferably arranged such that it is and/or can be connected via at least one control line 626 to the at least one data assignment unit 604. Alternatively, it would also be possible to connect a plurality of or all print head controllers 622 in series and to connect only a few print head controllers or only one print head controller 622 directly to the at least one data assignment unit 604.

Partial images, for example in the form of color separations 629, are preferably generated by means of the at least one raster graphics processor 603, preferably from an image template preferably stored in the at least one image data memory 601, for example in the form of template image data 641; 642; 643; 644; 1643; 1644 and/or geometrically modified template image data 641; 642; 643; 644; 1643; 1644 and/or segments of template image data 641; 642; 643; 644; 1643; 1644, and are further preferably stored in the at least one raster data memory 602. This process is referred to as rastering, for example. Preferably, for each printing color to be printed in each printing unit 200; 400, at least one partial image in the form of at least one color separation is produced. More preferably, for each printing color to be printed, and for each printing unit 200; 400, a plurality of partial image planes 632 in the form of a plurality of different color separations 629 of printing colors that are different from one another but are the same within each color separation are generated, wherein the number n of these partial image planes 632 for each printing color is preferably equal to the number n of the different droplet sizes that can be generated by means of each print head 212; 412. This number n is preferably at least three. Each partial image plane 632 thus contains information about the precise positions at which each pixel of the respective color and the respective size is to be printed. By superimposing the partial image planes 632 of one printing color, for example, the color separation and/or the partial image of this printing color is produced. The complete printing image is then produced by superimposing all the color separations 629 and/or partial images. The partial image planes 632 of one printing color are preferably first compiled and then stored as a partial image of this printing color. The partial images and the partial image planes 632 are also referred to as raster data 647.

In rastering, for each printing color from each printing image at least one and more preferably precisely one partial image in the form of at least one partial image matrix 629 is preferably produced. This at least one partial image matrix 629 preferably contains rows and columns 633. Rows of the at least one partial image matrix 629 preferably correspond to lines of the printed printing image which are oriented orthogonally to the direction of transport of printing material 02, and/or columns 633 of the at least one partial image matrix 629 preferably correspond to lines of the printed printing image that are oriented parallel to the direction of transport of printing material 02. Preferably at least one, and more preferably precisely one entry 631 is assigned to each position in the corresponding partial image matrix 629, and thus to each unique combination of a defined row and a defined column 633. Each entry 631 can have a value of a number of n+1 (n plus one) preset values. Preferably, each entry 631 has either a value that corresponds to an instruction to rest or a value that corresponds to an instruction to eject a droplet, and more preferably to a droplet size assigned to said droplet. Each of these n+1 (n plus one) preset values preferably corresponds to a droplet size or to the information that no pixel is to be generated at that point, and thus no printing ink is to be ejected. Using a two-digit notation, for example, these preset values may be "00" for "no printing ink" or "01" for a "small" pixel and/or droplet or "10" for a "medium" pixel and/or droplet or "11" for a "large" pixel and/or droplet. Each column 633 of this type preferably contains at least one first sequence 633 of a plurality of entries 631, wherein each entry 631 in this at least one first sequence 633 either has a value that corresponds to an instruction to rest or has a value that corresponds to an instruction to eject a droplet and to a droplet size assigned to said droplet.

Each partial image matrix 629 of each printing color is preferably stored and/or processable such that precisely one column 633 of the partial image preferably is and/or will be assigned to each nozzle of the print heads 212; 412 assigned to said printing color. This column 633 then contains entries 631 of different rows, with each said entry having one of the corresponding preset values, therefore causing the corresponding nozzle to eject printing ink at the relevant instants. The synchronized processing of entire rows of the corresponding partial image matrix 629 by the nozzles of the corresponding at least one print head 212; 412 preferably results in the printing image to be produced on the printing material 02 in the form of superimposed matrix-like patterns of pixels, preferably of different printing colors. Synchronized processing is also particularly understood to cover cases in which the nozzles are positioned at different locations with respect to the transport path of printing material 02, and therefore do not eject printing ink simultaneously, for example, in generating a straight line which is oriented orthogonally to the transport direction.

The partial images preferably stored in at least one data memory 601; 602 and more preferably in the at least one raster data memory 602, in particular partial image matrices 629 and/or raster data 647, are preferably transmitted via the at least one second data line 613 to the at least one data assignment unit 604. The at least one data assignment unit 604 is preferably connected to a number of print heads 212; 412, which together have a plurality of nozzles. For example, the at least one data assignment unit 604 is connected to all the print heads 212; 412 of the respective printing unit 200; 400 that are assigned to a specific printing ink and/or are provided for ejecting the printing ink for an entire color separation 629. The at least one data assignment unit 604 preferably assigns each column 633 of the color separation 629 provided to it, thus particularly of the partial image matrix 629 of the raster data 647 provided to it, to at least one and more preferably to precisely one nozzle of a print head 212; 412. The position of a printing image to be printed on printing material 02 in relation to a direction A transversely to the provided transport path of printing material 02 and/or in relation to axial direction A is thereby determined. If it is necessary to change the position of the printing image to be printed with respect to this direction A, this is achieved, for example, by a shift in the assignments among the columns 633 of the partial image matrices 629 to the nozzles of the print heads 212; 412. Thus the raster data 647 preferably are and/or will be stored in the form of entries 631 to be processed, in particular in the form of sequences of entries 631 that are to be processed by respective nozzles. The at least one data assignment unit 604 preferably assigns each nozzle a sequence of entries 631 to be processed by it.

During printing operation, instances at which respective rows of the partial image matrix 629 which represents the partial image will be processed are determined, preferably factoring in the rotational speed and the rotational angle position of the respective central cylinder 201; 401 and/or the respective drive motor 208; 408 with which the print head 212; 412 designated to print said partial image interacts. Both the position and the image dimension of the printing image to be produced and/or printed on printing material 02 in a direction parallel to the designated transport path of printing material 02 and/or in the circumferential direction of the at least one central cylinder 201; 401 are and/or can be influenced by the respective instants at which the corresponding nozzles eject their coating medium droplets and by the rotational angle position and/or rotational speed of the corresponding central cylinder 201; 401 at said instant and/or by a relative position of printing material 02 on the corresponding central cylinder 201; 401 at said instant. The at least one data assignment unit 604 therefore preferably processes both the respective raster data 647 and the data provided by the at least one signal source 617; 618 for the purpose of identifying a rotational angle position particularly of at least one central cylinder 201; 401 in its calculation of conditions, in particular instants at which the nozzles of the print heads 212; 412 connected to said at least one data assignment unit 604 are to eject coating medium. At least the at least one data assignment unit 604 of the at least one second printing unit 400 and more preferably also the at least one data assignment unit 604 of the at least one first printing unit 200 preferably also process the information provided directly or indirectly by the at least one register sensor 619, to enable printing that is true-to-register and/or has proper color-to-color registration, for example when the front side of printing material 02 is imprinted by means of the first printing unit 200 and the back side of printing material 02 is imprinted by means of the second printing unit 400, or when the same side of printing material 02 is imprinted by means of both the first printing unit 200 and the second printing unit 400.

For example, if a plurality of rows of print heads 212; 412, and particularly a plurality of double rows of print heads are used for each printing ink in each printing unit 200; 400, the at least one data assignment unit 604 will preferably assign the columns 633 of the respective color separations 629 and particularly of the partial image matrices 629 according to row, particularly in relation to the axial direction A, to the nozzles of the print heads 212; 412, independently of the arrangement of the nozzles with respect to the transport direction of printing material 02 and/or the circumferential direction of the respective central cylinder 201; 401. This arrangement plays a role only in determining the proper instant for ejection of the coating medium. Particularly in the case of two double rows of print heads 212; 412 per printing unit 200; 400 and per printing ink, the columns 633 of the respective partial image matrix 629 are preferably alternatingly assigned to a corresponding nozzle of a print head 212; 412 of a first of the two double rows of print heads 212; 412 and to a corresponding nozzle of a print head 212; 412 of a second of the two double rows of print heads 212; 412. This assignment can also be made by means of the at least one raster data computer 612, for example, rather than by the at least one data assignment unit 604. The partial printing image and/or the color separation is thus divided by column between two double rows of print heads 212; 412 and is reassembled only when printing ink is applied to printing material 02.

The at least one input device 608 preferably enables an operator to directly influence the ejection of coating medium through the nozzles of print heads 212; 412 that are connected to the same data assignment unit 604 as the at least one input device 608. For example, the operator can use said input device to initiate printing of a test image. Template image data and/or raster data of at least one such test image preferably are and/or can be stored in the at least one data memory of the at least one input device 608 and can preferably be accessed independently of the at least one raster data memory 602.

Printing machine 01 is preferably characterized in that printing machine 01 has at least one print head 212; 412 having at least one first nozzle, and in that printing machine 01 preferably has the at least one printing data processor 600 and the at least one printing data processor 600 has the at least one data memory 601; 602, in particular the at least one raster data memory 602, in which at least one first sequence 633 of entries 631 to be processed in sequence, which are and/or can be assigned to this at least one first nozzle, can be and/or is stored. Each entry 631 preferably has either a value that corresponds to an instruction to rest or a value that corresponds to an instruction to eject a droplet, and more preferably also an instruction regarding a droplet size assigned to said droplet. At least one printing data processor 600 preferably has at least one stored filling algorithm. The at least one filling algorithm is preferably used to check the at least one first sequence 633 of entries 631, which preferably corresponds to a partial image and is preferably stored in the at least one raster data memory 602, to determine whether it contains at least one subsequence 634 which contains exclusively entries 631 with instructions to rest and which exceeds a predefined number of entries 631. Preferably by means of the at least one filling algorithm and more preferably on the basis of this check, at least one entry 631 in this at least one subsequence 634 can be altered in such a way that it thereafter has a value that corresponds to an instruction to eject a droplet and more preferably also corresponds to a droplet size assigned to said droplet. This droplet size preferably corresponds to the smallest droplet size that can be ejected by the at least one first nozzle and/or to the smallest droplet size that is provided in any of the entries in the at least one partial image matrix.

Printing machine 01 is preferably characterized in that printing machine 01 comprises at least one printing data processor 600 which has at least one raster graphics processor 603, by means of which at least the at least one first sequence 633 of entries 631 can be generated from template image data 641; 642; 643; 644; 1643; 1644 and/or geometrically modified template image data 641; 642; 643; 644; 1643; 1644, and/or in that printing machine 01 comprises at least one printing data processor 600 which has at least one raster data memory 602, in which at least one first sequence 633 of entries 631 to be processed consecutively, which is and/or can be assigned to this at least one first nozzle, can be and/or is stored, and/or in that printing data processor 600 comprises at least one image data computer 611 and/or at least one raster data computer 612, by means of which the at least one filling algorithm can be run. Printing machine 01 is preferably characterized in that printing data processor 600 comprises at least one data memory, in which the at least one filling algorithm is stored, wherein this at least one data memory is, for example, the at least one image data memory 601 and/or the at least one raster data memory 602 and/or the at least one data memory of the at least one first input device 608 and/or another data memory. Printing machine 01 is preferably suitable for carrying out at least one preferred method for operating a printing machine 01, described in the following.

The sequences 633 and subsequences 634 of entries 631 preferably relate only to those entries 631 which either have a value that corresponds to an instruction to rest or have a value that corresponds to an instruction to eject a droplet. Other information and/or characters and/or combinations of characters contained in the partial image matrix, such as placeholders which separate individual entries 631 from one another, or the like, are to be disregarded in this context.

Raster data 647 are preferably modified to ensure that the nozzles of print heads 212; 412 are activated regularly to maintain a desired print quality. A method for operating a printing machine 01 is preferably used for this purpose, wherein printing machine 01 preferably comprises at least one print head 212; 412 having at least one first nozzle, and wherein control data 646 and/or raster data 647, in the form of entries 631 to be processed, for at least one printing image to be printed are forwarded to the at least one print head 212; 412 and wherein each entry 631 preferably is and/or will be assigned to one of the at least one first nozzles and either has a value that corresponds to an instruction to rest or has a value that corresponds to an instruction to eject a droplet, and wherein preferably, particularly during a process in which the at least one printing image is being printed, and based on data, for example raster data 647 or template image data 641; 642; 643; 644; 1643; 1644, assigned to the at least one printing image, at least one additional droplet which does not represent a pixel of said printing image to be printed is ejected by means of the at least one first nozzle, preferably at least between two droplets which represent pixels of the same printing image to be printed and which are likewise ejected by means of this at least one first nozzle.

A method for operating printing machine 01 is preferably additionally or alternatively used, wherein printing machine 01 preferably comprises at least one print head 212; 412 having at least one first nozzle, and wherein raster data 647 in the form of entries 631 to be processed for at least one printing image to be printed, which data preferably will be and/or have been compiled in advance, preferably by means of the at least one raster graphics processor 603, from image data, in particular template image data 641; 642; 643; 644; 1643; 1644 and/or geometrically modified template image data 641; 642; 643; 644; 1643; 1644 of the printing image to be printed, preferably are and/or will be stored in at least one data memory 601; 602, more preferably in the at least one raster data memory 602 of printing machine 01, and wherein each entry 631 preferably is and/or will be assigned to one nozzle and either has a value that corresponds to an instruction to rest or has a value that corresponds to an instruction to eject a droplet and more preferably also corresponds to an instruction regarding a droplet size assigned to said droplet. Preferably using the at least one filling algorithm, at least one first sequence 633 of entries 631, which preferably corresponds to one column of a partial image and is preferably to be processed consecutively by said at least one first nozzle, and which is and/or can be assigned to this at least one first nozzle and is more preferably stored in the at least one raster data memory 602, is then checked to determine whether it contains at least one preferably coherent subsequence 634, which contains exclusively entries 631 with instructions to rest and which exceeds a predefined number of entries 631. If such a subsequence 634 is found, at least one entry 631 of this at least one subsequence 634 is preferably modified, more preferably by means of the at least one filling algorithm, such that it thereafter has a value that corresponds to an instruction to eject a droplet and more preferably also corresponds to an instruction regarding the droplet size assigned to this droplet.

The method is preferably characterized in that the number of entries 631 within the at least one first sequence 633 that will be changed and/or the position of the at least one entry 631 within the at least one first sequence 633 that will be changed are determined such that the at least one sequence 633 thereafter no longer contains a subsequence 634 which contains exclusively entries 631 with instructions to rest and which exceeds the predefined number of entries 631. This is achieved, for example, by making sure during the selection of the at least one entry 631 to be modified that no oversized subsequences 634 remain. Alternatively, this can also be ensured through an iterative process in which checks continue and entries 631 are modified until a subsequent check no longer reveals any subsequence 634 of this type.

The method is preferably characterized in that the position of the at least one entry 631 within the at least one first sequence 633 that is modified is determined at least partially by at least one random number. For example, the at least one entry 631 to be modified can be determined by generating a random number between zero and one and multiplying this number by the length of the subsequence 634 that is found, thereby determining the position of the at least one entry 631 to be modified within the corresponding subsequence 634. Alternatively, the random number may be used to select one of a plurality of predefined patterns that will be used to replace the at least one subsequence 634. A pattern of this type extends over only one column 633 of the partial image matrix 629, for example, or preferably over a plurality of adjoining columns 633 of the partial image matrix 629, each of which contains subsequences 634 which contain only entries 631 with instructions to rest and which exceed a predefined number of entries 631.

The method is preferably characterized in that the position of the at least one entry to be modified within the at least one first sequence 633 is selected such that at least one and more preferably precisely one predefined number of entries 631 lies between the beginning and/or the end of said at least one first sequence 633 and the at least one entry 631 to be modified. This serves to prevent additional pixels that are too close to the part of the color separation 629 to be printed from being printed, which might compromise the printed image, for example, by making the printed image appear frayed. A beginning and/or an end of this at least one first sequence 633 is understood as an entry 631 which has a neighboring entry 631 that corresponds to an instruction to eject a droplet. The predefined number can be determined empirically in such a way that the visual impression of the printed image is compromised only minimally, if at all.

The method is preferably characterized in that a plurality of sequences 633 of entries 631 to be processed in succession are checked for subsequences 634 of this type, and are modified if necessary based on the results of this check, and in that each of this plurality of sequences 633 is assigned to a separate nozzle of the at least one print head 212; 412. More preferably, each sequence 633 in the color separation 629 of entries 631 to be processed in succession is checked for subsequences 634 of this type and is modified if necessary based on the results of this check. More preferably, the method is characterized in that the plurality of sequences 633 of entries 631 are and/or will be assigned to adjacent nozzles of print heads 212; 412. Adjacent nozzles in this context are nozzles between which, as viewed orthogonally to a predefined transport direction of printing material 02 and/or in axial direction A, no nozzles that are assigned to the same printing ink and the same printing unit 200; 400 are arranged. More preferably, the number of entries 631 within the plurality of sequences 633 which are modified and/or the positions of the entries 631 within the respective plurality of sequences 633 which are modified is and/or are determined such that the positions of the modified entries 631 are in a predetermined relationship to one another, in particular a spatial relationship with respect to the printing image, over all of the plurality of sequences 633 of entries 631, particularly assigned to adjacent nozzles of print heads 212; 412. This means, for example, that the modified entries 631 represent a preset pattern in the color separation 629 and/or in the printing image. This preset pattern is preferably a presetting that applies to all the nozzles of a printing ink and more preferably to all the nozzles of all printing inks. This enables an established and tested pattern to be used, for which it is known that it will not or will only minimally compromise the overall visual impression of a printing image.

Preferably, second sequences 633 of entries 631 that are adjacent to the sequences 631 to be modified or are at least located in the vicinity of said sequences are also taken into consideration, regardless of whether or not these second sequences are themselves modified by the filling algorithm. This serves to prevent the printing image from appearing frayed in the lateral direction of the printing image as well. The method is preferably characterized in that the position of the at least one entry 631 within the at least one first sequence 633 is changed in synchronization with at least one second sequence 633 of entries 631, wherein this second sequence 633 of entries 631 consists of entries 631 that are to be processed in sequence by means of at least one second nozzle. In particular, the positions of the entries 631 in these second sequences 633 are preferably taken into account in the selection of the first entries 631 to be modified in the at least one first sequence 633. This at least one second nozzle is preferably a nozzle that is adjacent to the first nozzle and/or at least a nozzle which is characterized in that a maximum of ten, more preferably a maximum of five and even more preferably a maximum of two nozzles assigned to the same printing ink and the same printing unit 200; 400 are arranged between it and the first nozzle, viewed orthogonally to the defined transport direction of printing material 02 and/or in the axial direction A.

Preferably, as described, the at least one sequence 633 of entries 631 to be processed in sequence is part of at least one and more preferably of precisely one partial image matrix 629, and each column 633 of the least one and more preferably precisely one partial image matrix 629 preferably is and/or will be assigned to one nozzle of one print head 212; 412. Preferably, adjacent columns 633 of the at least one partial image matrix 629 are assigned to adjacent nozzles of the at least one print head 212; 412. Each column 633 of the at least one partial image matrix 629 preferably corresponds to precisely one sequence 633 of entries 631, which is further preferably assigned to one nozzle of one print head 212; 412. The at least one partial image matrix 629 preferably represents one color separation 629 of the at least one, more preferably multicolored printing image to be printed.

A transport speed of the printing material 02 and/or a resolution of the raster data 647 and/or droplet sizes that can be ejected with the at least one first nozzle and/or temperatures of the print head 212; 412 and/or the coating medium and/or physical properties of the coating medium, for example its viscosity, are preferably taken into account in determining the preset number of entries 631.

If a plurality of partial image planes 632 will be combined to produce a partial image matrix 629, either the respective at least one entry 631 is preferably modified directly within the assembled partial image 629 or the respective at least one entry 631 is modified in a partial image plane 632, for example the partial image plane 632 that determines the smallest pixels, after which the partial image is reassembled from the at least partially modified partial image planes 632. It is also possible to produce an additional partial image plane 632 which represents only those pixels to be entered in addition to the actual printing image, and then to reassemble the corresponding partial image 629 using the previous and new partial image planes 632.

Raster data 647 and/or output data 646 and/or control data 646 that belong to sequential printing images and/or template image data 641; 642; 643; 644; 1643; 1644 are preferably processed together and checked for corresponding sequences. This results in a greater savings of coating medium and/or in even better printing quality.

In the preceding and in the following, a printed product is understood particularly as a finished product which is both printed and optionally folded and/or cut to size. A printed product to be printed preferably comprises at least one complete printing image 636; 637 and/or the at least one printed product to be printed or the at least one complete printing image 636; 637 preferably comprises a plurality of individual pages 638; 639; 1638; 1639, which are printed on at least one common printing material 02, in particular at least one common printing material web 02. The printed product therefore preferably also comprises the at least one complete printing image 636; 637 and/or this plurality of individual pages 638; 639; 1638; 1639. More preferably, printing material 02 is then folded and/or cut, for example, in the at least one post-processing device 500, in particular at least one folding device 500. Depending on the type and/or actuation of the at least one post-processing device 500, the individual pages 638; 639; 1638; 1639 must be printed in a certain arrangement on printing material 02 in order to ensure that the individual pages 638; 639; 1638; 1639 will be in the correct orientation and sequence and relative position after post-processing. Such a specific arrangement of individual pages 638; 639; 1638; 1639, for example, is preferably referred to as a complete printing image 636; 637. At least one complete printing image 636; 637 has at least one row of at least two, for example four individual pages 638; 639; 1638; 1639 arranged side by side, for example. Each of the individual pages 638; 639; 1638; 1639 is thus preferably a component of a complete printing image 636; 637. At least one first complete printing image 636 is preferably applied to printing material 02 by means of the at least one first printing unit 200, and at least one second complete printing image 637, particularly synchronized thereto, is applied to printing material 02 by means of the at least one second printing unit 400. For example, the at least one first complete printing image 636 is applied to a front side of printing material 02 and the at least one second complete printing image 637, synchronized thereto, is applied to a back side of printing material 02, or the at least one first complete printing image 636 and the at least one second complete printing image 637, synchronized thereto, are applied to the same side of printing material 02.

During the course of a print order, a plurality of complete printing images 636; 637 are preferably applied in succession to different, preferably adjacent points on printing material 02. These complete printing images 636; 637 are preferably but not necessarily the same in configuration in terms of the number and/or arrangement of individual pages, but are preferably at least partially different in terms of content.

In the following, a preferred method is described, with which print quality in terms of color-to-color registration and/or register can be increased by compensating for changes in printing material 02 caused by drying and/or printing processes, for example. The method is preferably based on modifying and/or adjusting data of at least one first complete printing image 636 to be printed by means of the first printing unit 200 and/or of individual pages 638; 639 within at least one such first complete printing image 636, prior to printing, preferably by means of printing data processor 600 of printing machine 01, such that changes in printing material 02 caused, for example, by the printing process carried out by first printing unit 200 and/or occurring thereafter and prior to printing by the second printing unit 400 are compensated for. Alternatively or additionally, the method is based on modifying and/or adjusting data of at least one complete printing image 637 to be printed by means of the second printing unit 400 and/or individual pages 638; 639 within at least one such complete printing image 637, prior to its printing, preferably by means of printing data processor 600 of printing machine 01, such that changes in printing material 02 caused by the printing process carried out by first printing unit 200 and/or occurring thereafter and prior to printing by the second printing unit 400 are compensated for.

The method is preferably a method for printing at least one first printing material 02 by means of at least one printing element 211; 411 of a printing machine 01, wherein first output data 646 for production or for actuating at least one component of at least one first printing unit 200 of printing machine 01, which component determines at least one form of printing images, in particular at least individual pixels of printing images, are generated from stored template image data 641; 642; 643; 644 of at least one first complete printing image 636, in order to produce at least one first printed complete printing image 636, and wherein the stored template image data 641; 642; 643; 644 at least of the at least one first complete printing image 636 contain at least template image data 643 of at least one first individual page 638 and preferably also of at least one second individual page 639, and wherein at least the at least one first individual page 638 is stretched and/or displaced within stored data, preferably before and/or during generation of the output data 646.

The at least one printing material 02 is preferably imprinted at least in a first printing unit 200, after which the at least one printing material 02 is imprinted at least in a second printing unit 400 of printing machine 01, and the at least one printed first individual page 638 is produced by the first printing unit 200. Alternatively, it would also be possible to produce the at least one printed first individual page 1638 by means of the second printing unit 400. More preferably, the at least one printed second individual page 639 is produced by the first printing unit 200 and/or the at least one printed first complete printing image 636 is produced by the first printing unit 200, and/or at least one printed second complete printing image 637 is produced by the second printing unit 400. The method is preferably characterized particularly in that the at least one first complete printing image 636 which contains the at least one first individual page 638 is printed on the at least one printing material 02 in the first printing unit 200 of printing machine 01 and particularly inkjet printing machine 01. During this process and/or thereafter, at least one dimension of printing material 02, at least in a first printing image direction C and/or in axial direction A, preferably changes, for example as a result of a drying and/or softening and/or shrinking and/or stretching of printing material 02. Following this change in the at least one dimension of printing material 02, at least one second complete printing image 637 is preferably printed by at least one second printing unit 400 of printing machine 01 and particularly inkjet printing machine 01 on the at least one printing material 02, for example on the same side or on a different side of printing material 02.

The change in the at least one dimension of printing material 02 preferably occurs transversely to the direction of transport of printing material 02, thus particularly in axial direction A. It is also possible, however, for the change in the at least one dimension of printing material 02 to alternatively or additionally occur, for example to the same extent or preferably to a lesser extent, along the direction of transport.

The method is preferably characterized in that the at least one first complete printing image 636 is printed in full on printing material 02 by means of the at least one first printing unit 200 and/or in that the at least one first individual page 638 is printed on printing material 02 at least partially simultaneously with the at least one second individual page 639 by means of the at least one first printing unit 200.

The method is preferably suitable, on one hand, for actuating nozzles of print heads 212; 412 of at least one first printing unit 200 of printing machine 01, in particular for controlling an ejection of coating medium through nozzles of print heads 212; 412 of the at least one inkjet printing element 211; 411 of printing machine 01. In that case, these nozzles of the print heads 212; 412 are regarded as the at least one component of the corresponding printing unit 200; 400 which determines at least one form of printing images. The at least one first printed complete printing image 636 is then preferably produced on the at least one printing material 02 in a first printing process by means of the at least one first printing unit 200 and more preferably by the ejection particularly of coating medium through nozzles of print heads 212; 412 of the at least one inkjet printing element 211; 411 of printing machine 01 according to the first output data 646. Alternatively, the method is suitable for all types of digital printing methods, in particular those in which individually controlled elements generate pixels, for example digital thermal transfer printing methods, printing methods that are based on an electric charge, for example which use a toner as the coating medium, or the like. The method is preferably also suitable for controlling at least one production device for producing fixed printing formes, for example for imaging printing plates in an offset printing process or for producing printing formes for letterpress printing and/or flexographic printing and/or intaglio printing. In that case, the method is used to produce particularly fixed printing formes, for example printing plates. Thus at least one printing forme is regarded as the at least one component of the corresponding printing unit 200; 400 which determines at least one form of printing images, in particular at least individual pixels of printing images. Imaging of this type can be carried out using a controllable laser, for example.

In a process for producing an order, particularly prior to the start of a printing process, order data are preferably compiled, for example by means of an order editor 676, preferably at least partly based on template image data 641; 642; 643; 644; 1643; 1644 belonging to a print order. The template image data 641; 642; 643; 644; 1643; 1644 of the print order particularly represent the content to be displayed on the print product to be printed, and thus at least one desired printed print image. The order data can be defined, for example, in a jdf data format ("job definition format").

Order data that refer to a print order preferably contain at least data relating to properties of the printing material 02 to be imprinted and/or data relating to at least one coating medium to be applied and/or data relating to properties and/or settings of at least one dryer 301; 331 and/or data relating to at least one printing image to be applied and/or data relating to a transport speed of the printing material 02 and/or data relating to a printing machine 01 and/or printing unit 200; 400 by means of which the printed product will be printed. Examples of properties of the printing material 02 to be imprinted include the material of the printing material 02 and/or the thickness of the printing material 02 to be imprinted. One example of such data relating to at least one printing image to be applied is a surface coverage, and thus a volume of printing ink per unit of surface area, which can affect the change in the at least one dimension of the printing material 02, for example. Examples of such data relating to at least one printing image to be applied include the format which the printed print product is to have and/or the number and/or sequence of pages the printed product is to have.

The order data are preferably also dependent on the at least one post-processing device 500, in particular because this determines boundary conditions, for example the sequence of individual pages 638; 639; 1638; 1639 within the complete printing image 636; 637. Preferably taking these boundary conditions into account, for example, at least one document template is preferably retrieved and/or prepared, for example using at least one geometric module 678. This at least one document template represents at least one basic framework which defines positions of individual pages 638; 639; 1638; 1639 relative to one another. Initially, page placeholders for the individual pages 638; 639; 1638; 1639, which do not yet contain any information about the actual printing images of the individual pages 638; 639; 1638; 1639, are preferably arranged in these positions. Any changes in the dimensions of printing material 02 are preferably not yet taken into account. This at least one basic framework preferably at least partially represents the template image data 641; 642 of the respective complete printing image 636; 637. At a later time, the page placeholders will be supplemented with and/or replaced by the information for the actual printing images of the individual pages 638; 639; 1638; 1639. This at least one basic framework is preferably provided in the form of a vector-based page description.

There are preferably at least two possible options for applying the preferred method for imprinting the at least one first printing material 02 prior the generation raster data 647, which allow a response to changes in the dimensions of printing material 02. In one, the page placeholders can be displaced and/or stretched before the placeholders are supplemented with and/or replaced by the information for the actual printing images of the individual pages 638; 639; 1638; 1639. In the other, the individual pages 638; 639; 1638; 1639 can be displaced and/or stretched after they have supplemented and/or replaced the page placeholders. Combinations are likewise possible, for example the page placeholders may be displaced in combination with a stretching of individual pages 638; 639; 1638; 1639 that have already been supplemented with and/or replaced by the information for the actual printing images of the individual pages 638; 639; 1638; 1639. It is also possible to apply the method to the already generated raster data 647, which are provided in the form of matrices of pixels.

The order data are preferably further processed, for example by means of at least one control element 677 and preferably at least partially together with the template image data 641; 642; 643; 644; 1643; 1644 of the print order. The at least one control element 677 preferably accesses at least one correction memory 666, in which correction data are stored. Such correction data relate, for example, to empirically generated compensation instructions which, based on the order data in each case, will result in a maximum possible compensation for projected changes in the dimensions of printing material 02.

The at least one correction memory 666 preferably has at least one database, in which particularly different correction data for different printing materials 02 and/or for different coating mediums and/or for different settings of at least one dryer 301; 331 and/or for different surface coverages of printing images to be applied and/or for different transport speeds of printing material 02 and/or for different combinations of these parameters are stored. Correction data preferably relate, for example, to the shrinkage behavior of different printing materials 02. At least one conversion formula and/or at least one comparison chart is preferably stored in the at least one correction memory 666, and/or the correction data preferably contain at least one conversion formula and/or at least one comparison chart. The at least one correction memory 666 is preferably a data memory of printing machine 01. An algorithm for the actual movement and/or stretching and/or displacement and/or geometric modification of individual pages and/or complete printing images is preferably distinguished from the correction data, and is run, for example, taking the correction data into account.

These correction data are preferably at least partially further processed together with the order data, and more preferably at least partially together with the template image data 641; 642; 643; 644; 1643; 1644 of the print order. More preferably, these correction data are forwarded, at least partially together with the order data, to the at least one geometric module 678 and/or are processed by the at least one geometric module 678, and are even more preferably processed at least partially together with the template image data 641; 642; 643; 644; 1643; 1644 of the print order.

In this preferred at least partially combined further processing of the correction data and/or the order data and/or preferably also at least partially of the template image data 641; 642; 643; 644; 1643; 1644 of the print order, in particular by means of the at least one geometric module 678, the positions and forms in which the individual pages 638; 639; 1638; 1639 are arranged within the complete printing images 636; 637, in particular in the output data 646, are determined. In particular, the displacement and/or stretching of the individual pages 638; 639; 1638; 1639 is carried out by means of the at least one geometric module 678. In this process, geometrically modified template image data 641; 642; 643; 644; 1643; 1644 are preferably first generated, which in the further process form the basis for the production of raster data 647 and/or output data 646, in particular control data 646.

Figure 9A:
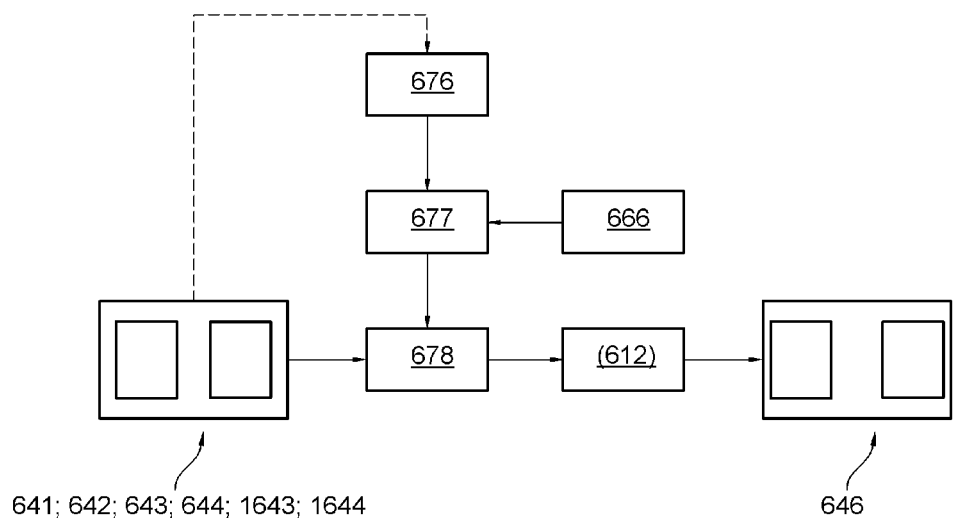
FIG. 9a a schematic illustration of a first further processing of correction data and/or order data and/or template image data.

In a first preferred further processing method of this type, in particular by means of the at least one geometric module 678, as is preferred, first the individual pages 638; 639; 1638; 1639 are generated and/or handled in the form of page placeholders within the document template and/or the basic framework of the respective complete printing image 636; 637, and/or the position and form of these page placeholders within the document template and/or the basic framework of the respective complete printing image 636; 637 are determined based on the order data and the correction data, after which these page placeholders are filled with information, in particular printing image data of the actual printing images of the individual pages 638; 639; 1638; 1639, which represent the respective printing image of the individual pages 638; 639; 1638; 1639. For the purposes of this method, these page placeholders therefore preferably represent the respective individual pages 638; 639; 1638; 1639, and therefore this document template and/or this basic framework of the respective complete printing image 636; 637 with the page placeholders arranged therein preferably represent the stored data, in particular the template image data 641; 642 for the respective complete printing image 636; 637. Such a page placeholder may be in the form of an empty rectangle, for example. Positions in which vector-based printing image data, for example in the form of pdf data, are to be inserted into the corresponding document template and/or the corresponding basic framework of the respective complete printing image 636; 637 are determined, for example, and/or the respective forms in which they are to be inserted are established, and/or, once these determinations have been made, these vector-based printing image data, in particular pdf data, are inserted in corresponding positions and/or in corresponding forms, for example in order to generate a vector-based complete printing image, for example in the form of pdf data (FIG. 9*a*).

Figure 9B:
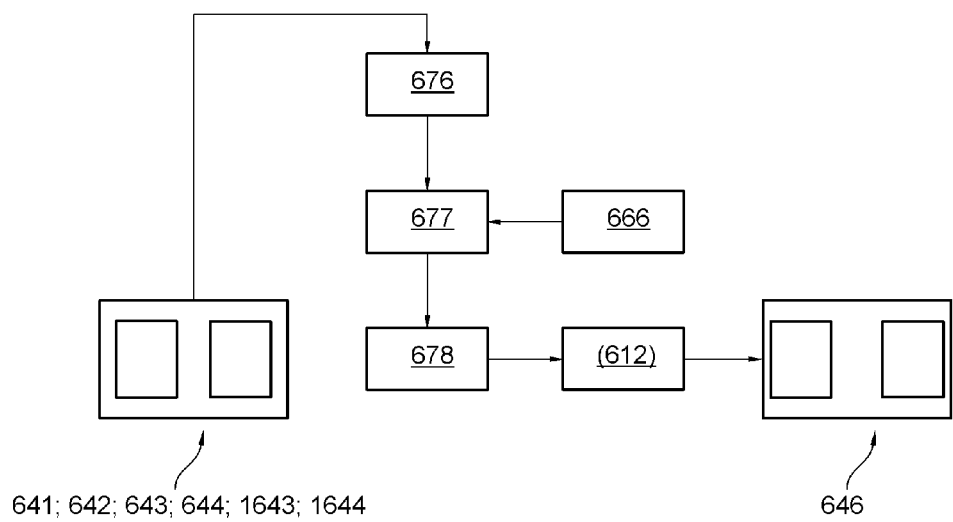
FIG. 9b a schematic illustration of an alternate second further processing of correction data and/or order data and/or template image data.
Figure 10A:
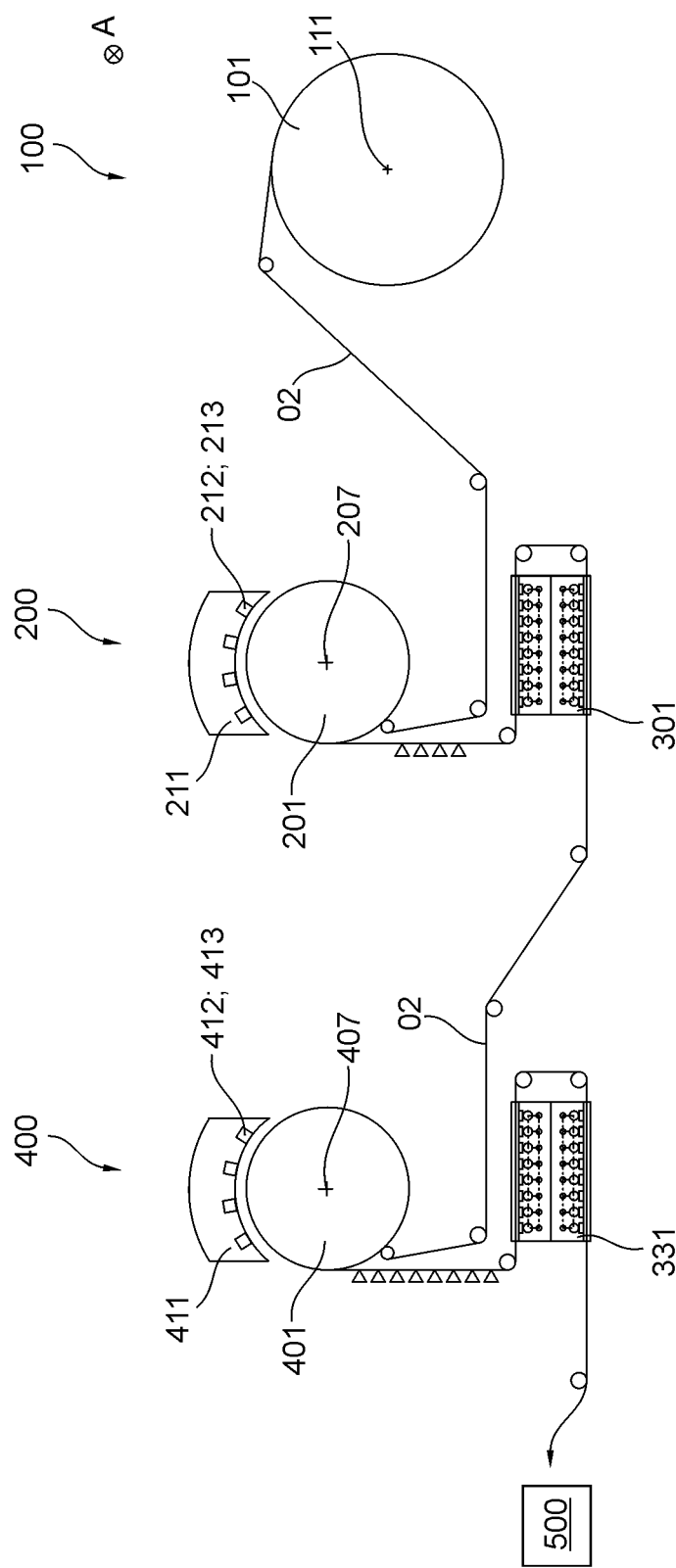
FIG. 10a a schematic illustration of a printing machine with a web path for printing on the same side of a printing material by means of a plurality of printing units.
Figure 10B:
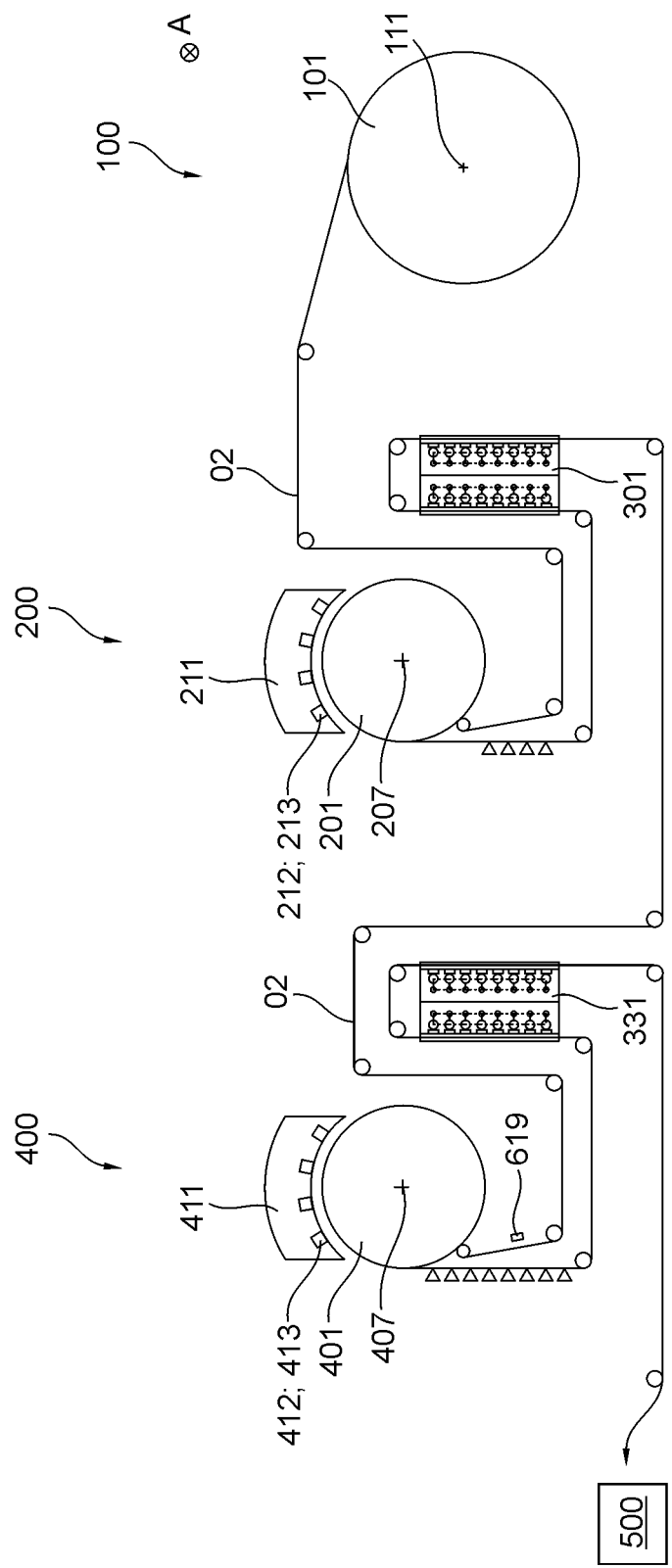
FIG. 10b a schematic illustration of a printing machine with an alternate web path for printing on the same side of a printing material by means of a plurality of printing units.
Figure 11:
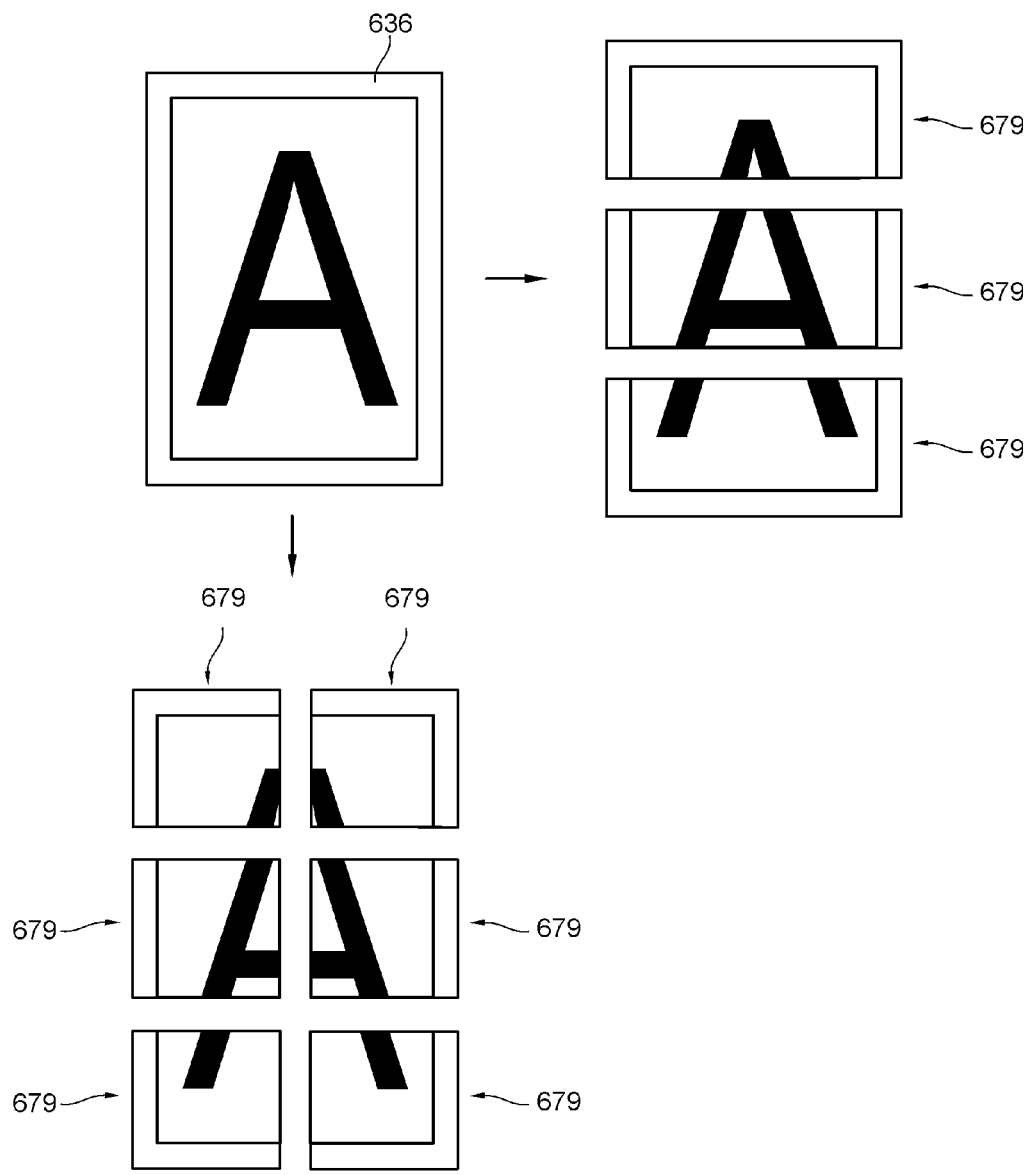
FIG. 11 a schematic illustration of a complete printing image and various possible divisions into sections.

In an alternative second preferred further processing method of this type, in particular by means of the at least one geometric module 678, the printing image data that represent the respective printing images of the individual pages 638; 639; 1638; 1639 are alternatively inserted into the document template, and/or the basic framework of the respective complete printing image 636; 637 is inserted, after which, by displacing and/or stretching these printing image data that represent the respective printing images of the individual pages 638; 639; 1638; 1639, the final position and form of the individual pages 638; 639; 1638; 1639 within the respective complete printing images 636; 637 is determined, particularly based on the order data and the correction data. For the purposes of this method, these printing image data which represent the respective printing images of the individual pages 638; 639; 1638; 1639 then preferably represent the respective individual pages 638; 639; 1638; 1639, and this document template and/or the basic framework of the respective complete printing image 636; 637 with the printing image data of the individual pages 638; 639; 1638; 1639 contained therein then preferably represent the stored data, in particular the template image data 641; 642 of the complete printing images 636; 637. Vector-based printing image data, for example in the form of pdf data, are inserted, for example, at specific positions in their original forms into this document template and/or into the basic framework of the respective complete printing image 636; 637, and only thereafter are the positions at which these vector-based printing image data, in particular pdf data, are to be positioned finally determined and/or are the respective forms in which they are to be positioned determined. This results, for example, in a vector-based complete printing image, for example in the form of pdf data. Preferably once these determinations are complete, these vector-based printing image data of the individual pages are displaced at corresponding positions and/or are stretched in corresponding forms, wherein particularly the vector-based complete printing image, for example in the form of pdf data, is modified (FIG. 9*b*).

In an optional, alternatively or additionally possible third further processing method, individual pages 638; 639; 1638; 1639 are displaced and/or stretched only after the generation of raster data 647, in particular within the raster data 647. For a displacement of individual pages 638; 639; 1638; 1639 within the raster data 647, for example, all the columns of the respective image matrix or partial image matrix that correspond to this individual page are at least partially displaced, and/or in at least one location, columns are deleted, and/or in at least one other location columns are inserted. For a stretching of individual pages 638; 639; 1638; 1639 within the raster data 647, additional columns are generated and are filled with information in the form of pixels, for example by interpolation, and/or columns are deleted and information in the form of pixels contained in surrounding columns is preferably optionally adjusted. For the purposes of this method, these pixels assigned to the respective individual pages 638; 639; 1638; 1639 therefore preferably represent the respective individual pages 638; 639; 1638; 1639, and therefore the totality of the raster data 647 and/or the partial image matrices preferably represent the stored data, in particular the raster data 647 of the respective complete printing image 636; 637.

Particularly independently of the first, second or third further processing method, the at least one order editor 676 is preferably part of printing data processor 600 of printing machine 01. For example, the at least one order editor 676 is part of the at least one image data computer 611 and/or is directly or indirectly connected to the at least one image data computer 611. The at least one control element 677 is preferably part of printing data processor 600 of printing machine 01. For example, the at least one control element 677 is part of the at least one image data computer 611 and/or is directly or indirectly connected to the at least one image data computer 611. The at least one correction memory 666 is preferably part of printing data processor 600 of printing machine 01. For example, the at least one correction memory 666 is part of the at least one image data computer 611 and/or is directly or indirectly connected to the at least one image data computer 611. The at least one geometric module 678 is preferably part of printing data processor 600 of printing machine 01. For example, the at least one geometric module 678 is part of the at least one image data computer 611 and/or is directly or indirectly connected to the at least one image data computer 611.

The content of the at least one correction memory 666 can preferably be expanded and/or modified, for example with data obtained through experience with printing processes carried out on printing machine 01 and/or at least one other printing machine, and/or with data input by an operator, and/or with data acquired by at least one sensor, in particular at least one sensor which is and/or can be connected to the machine controller and/or printing data processor 600 of the printing machine.

In one embodiment, printing machine 01 has at least one printing element which does not operate according to an inkjet printing principle, and instead preferably has at least one fixed printing forme with respect to the printing image to be transferred, for example at least one offset printing element and/or at least one flat-bed printing element and/or at least one letterpress printing element, in particular flexographic printing element and/or at least one intaglio printing element. In such cases, the at least one inkjet printing element 211; 411 is used, for example, as an imprinting element.

The method is preferably characterized in that the first output data 646 for the ejection of coating medium through nozzles of print heads 212; 412 of the at least one inkjet printing element 211; 411 of printing machine 01 to produce the at least one printed first printing image 636 are generated from the template image data 643 of the at least one first complete printing image 636, directly or via at least one intermediate process, for example a rastering and/or a displacement of individual pages 638; 639 and/or a scaling of individual pages 638; 639 and/or of the at least one complete printing image 636; 637 and/or a division of the at least one complete printing image 636; 637 into sections 679.

The at least one printing element 211; 411 is preferably an inkjet printing element 211; 411, and/or printing machine 01 is preferably an inkjet printing machine 01, and/or first output data 646 for the actuation of nozzles of print heads 212; 412 of the at least one first printing unit 200 of printing machine 01, according to which coating medium is ejected through said nozzles of print heads 212; 412 to generate the at least one first printed complete printing image 636, are preferably generated from the stored template image data 641; 642; 643; 644 of the at least one first complete printing image 636, and/or the respective output data 646 are preferably control data 646 for nozzles of print heads 212; 412 of at least one inkjet printing element 211; 411 of printing machine 01 that are to be used in each case, and/or the at least one component of the at least one first printing unit 200 of printing machine 01, which component determines at least one form of printing images, is preferably at least one inkjet print head 212; 412. The stored data are preferably stored in a data memory of printing machine 01, for example in the at least one image data memory 601 and/or in the at least one raster data memory 602.

Preferably, a relative displacement and/or stretching takes place in at least one first virtual direction B, which is preferably also called first template direction B. A virtual direction is preferably a direction, particularly within an image which is stored in digitally stored form in a data memory. The first template direction B in template image data 641; 642; 643; 644; 1643; 1644 preferably corresponds to a printing image direction C, which is established in a printed print image. This preferably means that a template direction B, which in the template image data 641; 642; 643; 644; 1643; 1644 is oriented parallel to a side edge and/or an edge of a complete printing image 636; 637, corresponds to a printing image direction C, which on a printed individual page 638; 639; 1638; 1639 and/or a printed complete printing image 636; 637 is oriented parallel to a lateral edge and/or an edge of the complete printing image 636; 637. Printing image direction C is preferably oriented parallel to axial direction A. The method is preferably characterized in that the first printing image direction C is oriented orthogonally to a direction of transport of printing material 02 through the at least one printing unit 200; 400 of printing machine 01 and/or is oriented parallel to a rotational axis 207; 407 of at least one central cylinder 201; 401 and/or transfer element and/or printing material conducting element, and/or in that the first template direction B is oriented orthogonally to a second virtual template direction D, in particular processing direction D, in which a row of such image elements are arranged in sequence within the image in the template image data 641; 642; 643; 644; 1643; 1644, and are produced in the printing process by means of one and the same nozzle of a print head 212; 412. The processing direction D is preferably a second template direction D, particularly since it is likewise defined in the template image data 641; 642; 643; 644; 1643; 1644 and thus is particularly a virtual direction D. One virtual page dimension 643; 644 of at least one individual page 638; 639, which is parallel to the first template direction B, is preferably reflected in the template image data 641; 642; 643; 644 as a page dimension 648; 649, parallel to the first printing image direction C, of said at least one printed individual page 638; 639.

A page dimension 648; 649; 1648; 1649 of a printed individual page 638; 639; 1638; 1639 in printing direction C is preferably understood as a maximum possible distance between two printed image elements belonging to this respective individual page 638; 639; 1638; 1639. A virtual page dimension 663; 664; 1663; 1664, particularly of an individual page 638; 639; 1638; 1639 in a template direction B; D in the template image data 641; 642; 643; 644; 1643; 1644, is preferably understood as a maximum possible assignable distance between two image elements of the template image data 641; 642; 643; 644; 1643; 1644 belonging to this respective individual page 638; 639; 1638; 1639 in template direction B; D. The stored data, in particular template image data 641; 642; 643; 644; 1643; 1644, of the at least one first complete printing image 636 preferably contain at least template image data 643 for at least one first individual page 638 and template image data 644 for at least one second individual page 639.

At least one printed first individual page 638 of the at least one first printed complete printing image 636 preferably has at least one first reference point 651. At least one printed second individual page 639 of the at least one first printed complete printing image 636 preferably has at least one second reference point 652. The first reference point 651 and the second reference point 652 preferably have a reference distance 653 from one another on the at least one first printed complete printing image 636.

At least one virtual first page dimension 663, particularly in the first template direction B, is preferably assigned to the at least one first individual page 638 in the template image data 641; 642; 643; 644. At least one virtual second page dimension 664, particularly in the first template direction B, is preferably assigned to at least one second individual page 639 in the template image data 641; 642; 643; 644.

At least one virtual first reference point 654 preferably is and/or will be assigned to the at least one first individual page 638 in the template image data 641; 642; 643; 644. This assignment is further preferably made by means of the at least one order editor 676 and/or by means of the at least one control element 677 and/or by means of the at least one image data computer 611 and/or by means of the at least one geometric module 678. At least one virtual second reference point 656 preferably is and/or will be assigned to the at least one second individual page 639 in the template image data 641; 642; 643; 644. This assignment is further preferably made by means of the at least one order editor 676 and/or by means of the at least one control element 677 and/or by means of the at least one image data computer 611 and/or by means of the at least one geometric module 678. A virtual reference distance 657 preferably is and/or will be assigned to the virtual first reference point 654 and the virtual second reference point 656 relative to one another in the template image data 641 of the at least one first complete printing image 636. This assignment is further preferably made by means of the at least one order editor 676 and/or by means of the at least one control element 677 and/or by means of the at least one image data computer 611 and/or by means of the at least one geometric module 678.

The at least one first virtual reference point 654 of the first individual page 638 in the template image data 641; 642; 643; 644; 1643; 1644 preferably corresponds to the at least one first reference point 651 of the at least one printed first individual page 638. In particular, the at least one first reference point 651 of the at least one printed first individual page 638 is preferably produced according to the template image data 641; 642; 643; 644; 1643; 1644 of the at least one virtual first reference point 654. The at least one second virtual reference point 656 of the second individual page 639 in the template image data 641; 642; 643; 644; 1643; 1644 preferably corresponds to the at least one second reference point 652 of the at least one printed second individual page 639. In particular, the at least one second reference point 652 of the at least one printed second individual page 639 is preferably produced according to the template image data 641; 642; 643; 644; 1643; 1644 of the at least one virtual second reference point 656.

The at least one first complete printing image 636 and/or the at least one second complete printing image 637 preferably each have at least two individual pages 638; 639; 1638; 1639, which are arranged offset in relation to one another in the at least one first template direction B in the preferably digital template image data 641; 642; 643; 644; 1643; 1644, and which are and/or will be arranged at least partially offset in relation to one another in the at least one first printing image direction C on the at least one printing material 02 in the printed printing image. The reference distances 653; 657; 1653; 1657 are particularly determined by these offset arrangements. The template image data of the individual pages 1638; 1639 of the at least one second complete printing image 637 particularly likewise have virtual reference points 1651; 1652, which have a virtual reference distance 1657 from one another.

The first reference point 651; 1651 is preferably a component of the at least one first printed individual page 638; 1638 and/or the second reference point 652; 1652 is preferably a component of the at least one second printed individual page 639; 1639. More preferably, the first reference point 651; 1651 is a pixel of the at least one first printed individual page 638; 1638 and/or the second reference point 652; 1652 is a pixel of the at least one second printed individual page 639; 1639. Particularly preferably, the first reference point 651; 1651 is a center point and/or focal point of the first printed individual page 638; 1638 and/or the second reference point 652; 1652 is a center point and/or focal point of the second printed individual page 639; 1639. The virtual first reference point 654; 1654 is preferably a component and more preferably a pixel of the at least one first individual page 638; 1638 in the template image data 641; 642; 643; 644; 1643; 1644, and/or the second virtual reference point 656; 1656 is a component and more preferably a pixel of the at least one second individual page 639; 1639 in the template image data 641; 642; 643; 644; 1643; 1644. The first virtual reference point 656; 1656 is particularly preferably a center point and/or focal point of the first individual page 638; 1638 in the template image data 641; 642; 643; 644; 1643; 1644 and/or the second virtual reference point 656; 1656 is particularly preferably a center point and/or focal point of the second individual page 639; 1639 in the template image data 641; 642; 643; 644; 1643; 1644.

In a first variant of the method, individual pages 638; 639 of the at least one first complete printing image 636 are preferably displaced relative to one another in stored form within this at least one first complete printing image 636. This is preferably carried out only after the template image data 641; 642; 643; 644; 1643; 1644 have been prepared, and thus only when operators no longer have direct access to the image data.

The first variant of the method by which print quality can be increased in terms of color-to-color registration and/or register preferably relates, on one hand, to a method for printing at least one printing material 02, in particular at least one printing material web 02, by means of at least one printing element 211; 411 of printing machine 01, wherein first output data 646 for production or for actuating at least one component of at least one first printing unit 200 of printing machine 01, which component determines at least one form of printing images, in particular at least individual pixels of printing images, are generated from template image data 641; 642; 643; 644, particularly stored in digital form, for at least one first complete printing image 636, in order to produce at least one first printed complete printing image 636, and wherein the stored template image data 641; 642 of the at least one first complete printing image 636 contain at least template image data 643 for at least one first individual page 638 and template image data 644 for at least one second individual page 639, and wherein the at least one first individual page 638 and the at least one second individual page 639 are displaced relative to one another in at least one template direction B; D, in particular in first template direction B, within stored data, preferably based on order data that refer to a print order and/or preferably based on correction data stored in at least one correction memory 666, while maintaining at least their respective absolute virtual page dimensions 663; 664, measured particularly in a template direction B; D, in particular in the first template direction B, and wherein the at least one first printed complete printing image 636 is produced on the at least one printing material 02 in a first printing process by means of the at least one first printing unit 200, according to the first output data 646.

The first variant of the method by which print quality in terms of color-to-color registration and/or register can be increased preferably relates alternatively or additionally to the method for printing at least one printing material 02 by means of at least one printing element 211; 411 of printing machine 01, wherein first output data 646 for production or for actuating at least one component of at least one first printing unit 200 of printing machine 01, which component determines at least one form of printing images, in particular at least individual pixels of printing images, are generated from stored template image data 641; 642; 643; 644 of at least one first complete printing image 636 in order to produce at least one first printed complete printing image 636, and wherein the stored template image data 641; 642 of the at least one first complete printing image 636 contain at least template image data 643 for at least one first individual page 638 and template image data 644 for at least one second individual page 639, and wherein the at least one first printed complete printing image 636 is produced on the at least one printing material 02 in a first printing process, by means of the at least one first printing unit 200, according to the first output data 646, and wherein at least one virtual first page dimension 663 in a template direction B; D, in particular in the first template direction B, and the virtual first reference point 654 are preferably assigned to the at least one first individual page 638 in its template image data 643, and wherein at least the virtual second reference point 656 and/or further preferably a virtual second page dimension 664 in this template direction B; D, in particular first template direction B, is preferably assigned to the at least one second individual page 639 in its template image data 644, and wherein a reference distance 653 measured in the first printing image direction C, by which the first reference point 651 and the second reference point 652 are spaced from one another on the at least one first printed complete printing image 636, on one hand, and the first page dimension 648 of a printed first individual page 638 and/or the second page dimension 664 of at least one printed second individual page 639, on the other hand, are preferably in a dimensional-print ratio to one another which preferably deviates, preferably based on order data that refer to a print order and/or preferably based on correction data stored in the at least one correction memory 666, from a preferable dimensional-template ratio between the virtual reference distance 657, measured in template direction B; D, in particular in first template direction B, which is assigned to the virtual first reference point 654 and the virtual second reference point 656 relative to one another in the template image data 641 of the at least one first complete printing image 636, on one hand, and the virtual first page dimension 663 of the at least one first individual page 639 and/or the virtual second page dimension 664 of the at least one second individual page 639 in the template image data 643, on the other hand.

This relates particularly to cases in which a respective inner edge of at least one individual page 638; 639 is used and retained as a stretching center 674, and in which the size of the individual page 638; 639 in the template image data 641; 642; 643; 644; 1643; 1644 is changed by scaling and/or stretching the at least one individual page 638; 639, wherein a subsequent change in size and simultaneous displacement necessitated by a change in the printing material 02 lead to a desired result, because, for example, center points of the individual pages 638; 639; 1638; 1639 of the at least one first complete printing image 636 and of the at least one second complete printing image 637 come to rest one on top of the other as a result.

The dimensional-print ratio preferably differs from the dimensional-template ratio by at least 0.1%, more preferably at least 0.2%, even more preferably at least 0.5% and more preferably still at least 1%.

The at least one first individual page 638 and the at least one second individual page 639 are preferably displaced relative to one another at least in the template direction B; D, in particular in the first template direction B, within the template image data 641; 643; 644 and/or within raster data 647 of the at least one first complete printing image 636, while maintaining at least their absolute virtual page dimension 663; 664 measured in this template direction B; D, in particular in first template direction B.

The method is preferably characterized in that the stored data within which the individual pages 638; 639 are displaced are template image data 641 and/or raster data 647 of the at least one first complete printing image 636, and thus particularly in that the at least one first individual page 638 and the at least one second individual page 639 are displaced relative to one another at least in the template direction B; D, in particular in first template direction B, within the template image data 641; 643; 644 and/or within raster data 647 of the at least one first complete printing image 636, while maintaining at least their absolute virtual page dimension 663; 664 measured in this template direction, in particular in first template direction B.

The at least one first individual page 638 and the at least one second individual page 639 are preferably displaced within the stored data in this template direction B; D, in particular in first template direction B, before and/or during generation of the first output data 646 from the template image data 641; 642; 643; 644, for example before and/or during the generation of raster data 647 and/or after the template image data 641; 642; 643; 644 have been stored in a data memory of printing machine 01, more preferably independently of whether raster data 647 are generated first or whether the displacement is carried out first.

The at least one first individual page 638 and the at least one second individual page 639 are preferably displaced in this template direction B; D, in particular in first template direction B, within the stored data, based on the order data that refer to the print order and based on the correction data stored in the at least one correction memory 666.

The displacement of the at least one first individual page 638 and the at least one second individual page 639 relative to one another is preferably controlled and/or regulated by a machine controller and/or printing data processor 600 of printing machine 01 itself and/or by means of at least one stored algorithm in a machine controller and/or printing data processor 600 of printing machine 01 itself.

The method is preferably characterized in that the displacement of the first individual page 638 and the second individual page 639 relative to one another is carried out by means of the printing data processor 600 of printing machine 01, and/or in that the displacement of the first individual page 638 and the second individual page 639 relative to one another is carried out at a time when the printing material to be printed with the at least one first complete printing image 636 is already located in the printing machine 01, particularly in the printing material source 100, especially the roll unwinding device 100.

A change in a dimension of printing material 02 is preferably at least partially compensated for by the displacement of the at least one first individual page 638 and the at least one second individual page 639 relative to one another in the template image data 641; 642; 643; 644.

The displacement of the individual pages 638; 639 of the at least one first complete printing image 636 is preferably synchronized with a change in at least one dimension of the printing material 02 such that, after the at least one first complete printing image 636 has been applied by means of a first printing unit 200, and after a change in the at least one dimension of printing material 02, and after a subsequent application of at least one second complete printing image 637 by means of a second printing unit 400, the at least one reference point 651; 652 of the printed individual page 638; 639 that belongs to the printed first complete printing image 636 is arranged in the proper color-to-color registration and/or true-to-register relative to at least one reference point 1651; 1652 of an individual page 1638; 1639 that belongs to the printed second complete printing image 637.

The displacement of the individual pages 638; 639 of the at least one first complete printing image 636 is preferably synchronized with a change in at least one dimension of printing material 02 such that, after the at least one first complete printing image 636 has been applied by means of a first printing unit 200, and after a change in the at least one dimension of printing material 02, and after the subsequent application of the at least one second complete printing image 637 by means of the second printing unit 400, at least one individual page 638; 639 that belongs to the first complete printing image 636 is arranged in the proper color-to-color registration and/or true-to-register relative to an individual page 1638; 1639 printed by the second printing unit 411 and/or belonging to the at least one second complete printing image 637 on printing material 02.

In addition to the displacement, for example, at least the at least one first individual page 638 is preferably stretched with a first stretching factor, at least in the first template direction B, within the stored data, before and/or during the generation of the output data 646, based on the template image data 641; 642; 643; 644 and/or based on the order data that refer to the print order and/or based on the correction data stored in the at least one correction memory 666.

The method is preferably characterized in that, due to the displacement of the at least one first individual page 638 and the at least one second individual page 639 relative to one another in the template image data 641; 642; 643; 644; 1643; 1644, a change in a dimension of the printing material 02, particularly in the first printing image direction C and/or the axial direction A, that takes place particularly during and/or after the generation of the at least one printed first individual page 638 and/or the at least one printed second individual page 639 is at least partially compensated for, more preferably in that the at least one first individual page 638 and the at least one second individual page 639 are synchronized in terms of their position relative to a projected position of individual pages 1638; 1639 and/or complete printing images 637 to be printed by at least one second printing unit 400.

The at least one first individual page 638 and the at least one second individual page 639 are preferably first displaced relative to one another within the stored data, preferably at least in this first template direction B. The at least one printed first complete printing image 636 is then preferably produced by the ejection of coating medium through nozzles of print heads 212; 412 of the at least one inkjet printing element 211; 411, in particular of the first printing unit 200 of printing machine 01. A change in a dimension of printing material 02, for example by the action of at least one dryer 301 on printing material 02, then preferably occurs. The at least one printed second complete printing image 637 is then preferably produced by the ejection of coating medium through nozzles of print heads 212; 412 of at least one additional printing element 211; 411, in particular inkjet printing element 411 of the second printing unit 400 of printing machine 01. The displacement of the individual pages 638; 639 of the at least one first complete printing image 636 is preferably synchronized with the particularly projected or optionally already effected change in the at least one dimension of the printing material 02 such that after the at least one first complete printing image 636 has been applied by means of the first printing unit 200, and after the change in the at least one dimension of printing material 02, and after the application of the at least one second complete printing image 637 by means of the second printing unit 400, at least one and preferably each individual page 638; 639 belonging to the first complete printing image 636 is arranged in the proper color-to-color registration and/or true-to-register in relation to an individual page 1638; 1639 printed on the printing material 02 by the second printing unit 411. Such an arrangement in the proper color-to-color registration and/or true-to-register exists particularly when the at least one and preferably each individual page 638; 639 belonging to the first complete printing image 636 lies with its center point on the center point of another individual page 1638; 1639, which is arranged on the other side or on the same side of the printing material, and which belongs to the second complete printing image 637.

The change in the at least one dimension of printing material 02 also changes at least one page dimension 648; 649 of the already printed individual pages 638; 639. The virtual page dimensions 663; 664 of the individual pages 638; 639 of the first complete printing image 636 are preferably synchronized with the virtual page dimensions 1663; 1664 of the individual pages 1638; 1639 of the second complete printing image 637. For the first variant of the method, this necessarily results in the situation that page dimensions 648; 649 of the printed individual pages 638; 639 of the first complete printing image 636 are different from page dimensions 1648; 1649 of printed individual pages 1638; 1639 of the second complete printing image 637, particularly due to the change in the at least one dimension of printing material 02. However, this is permissible and less objectionable than a displacement of the printed pages relative to one another, and thus a color-to-color registration error and/or a register error. This difference is tolerable, for example, when intervening too deeply in the template image data 641; 642; 643; 644; 1643; 1644 of the individual pages 638; 639; 1638; 1639 for this purpose is undesirable. This results in a savings on computing expense, while at the same time, the template image data 643; 644; 1643; 1644 of the individual pages 638; 639; 1638; 1639 are maintained true to the original, except for their displacements.

The virtual reference points 654; 656 in the template image data 641 of the first complete printing image 636 preferably have a virtual template offset 667 first, prior to the displacement, and thus a template offset 667 particularly within an image which is stored in digitally stored form in a data memory. As a result of the displacement, the virtual reference points 654; 656 thereafter have a particularly virtual output offset 668, which is further a virtual length and is present, for example, in the raster data 647. The virtual output offset 668 is preferably an offset particularly within an image which is stored in digitally stored form in a data memory. Directly following printing by the first printing unit, the corresponding reference points 651; 652 of the printed individual pages 638; 639 have a first, particularly wet print offset 669 in the corresponding printing image direction C. After drying, for example, this first print offset 669 is changed, in particular decreased in size to a second, particularly dry print offset 671. The second complete printing image 637 is then applied by the second printing unit 400, wherein the individual pages 1638; 1639 and particularly reference points 1651; 1652 of said image have a third, particularly likewise wet print offset 672 immediately following application, which offset is preferably precisely as great as the second dry print offset 671 of reference points 651; 652 of the printed individual pages 638; 639 of the first complete printing image 636. Subsequent potential changes in the at least one dimension of printing material 02 affect the first complete printing image 636 and the second complete printing image 637 to the same degree and therefore have no impact on color-to-color registration and/or register.

In the conversion of template image data 641; 642; 643; 644; 1643; 1644 to output data 646, at least two processes are preferably implemented. One of these at least two preferred processes involves the displacement of the individual pages 638; 639 of the first complete printing image 636 relative to one another. Another of these at least two preferred processes involves the generation of raster data 647. The individual pages 638; 639 of the first complete printing image 636 are preferably first displaced relative to one another, wherein geometrically modified template image data 641; 642; 643; 644; 1643; 1644 are generated, after which raster data 647 are generated from the geometrically modified template image data 641; 642; 643; 644; 1643; 1644. The raster data 647 then form the basis for the output data 646 or are identical to the output data 646. Alternatively, raster data 647 are first generated from the template image data 641; 642; 643; 644; 1643; 1644, after which the individual pages 638; 639 of the first complete printing image 636 are displaced relative to one another within the raster data 647, wherein geometrically modified raster data 647 are generated. The geometrically modified raster data 647 then form the basis for the output data 646 or are identical to the output data 646, depending upon whether the raster data 647 can be further processed immediately or whether further modification of the raster data 647 is necessary and/or desired for the actuation of the nozzles. Alternatively or additionally, the individual pages 638; 639 of the first complete printing image 636 are displaced relative to one another and raster data 647 are generated at least partially simultaneously and/or alternatingly, for example by generating raster data 647 by row and/or by column and displacing portions of the individual pages 638; 639 therebetween.

In a second variant of the method by which print quality in terms of color-to-color registration and/or register can be increased, the at least one first complete printing image 636 is preferably modified such that the at least one first individual page 638 and the at least one second individual page 639 are preferably stretched in stored form within this at least one first complete printing image 636, at least in a first template direction B. The at least one first individual page 638 and the at least one second individual page 639 are preferably subjected to a unidimensional central stretching in the first template direction B, more preferably with a common stretching center 674. The particularly common stretching center 674 lies, for example, on a center line 673 of the at least one first complete printing image 636. It is also possible to use other stretching centers, however for reasons of symmetry, center line 673 is preferred. A corresponding stretching of the at least one first complete printing image 636 and/or the individual pages 638; 639 within the at least one first complete printing image 636 prior to the application of this at least one first complete printing image 636 onto printing material 02 preferably allows full compensation for any change in the at least one dimension of printing material 02 that may occur after the printing process. Thus a shrinking of printing material 02 that results from a drying process, for example, can be compensated for even before the printing image is applied. The finished printed product contains printed individual pages 638; 639 of the proper size. The at least one stretching is preferably carried out only after template image data 641; 642; 643; 644; 1643; 1644 have been prepared, and thus only when operators no longer have direct access to the image data.

A stretching is preferably understood as stretching in a mathematic sense, which can result in an increase or, particularly with a stretching factor of between zero and one, in a decrease in size. In the preceding and in the following, the term scaling is also used to refer to this stretching in a mathematic sense, to further clarify the possibility of increasing and decreasing size.

The second variant relates to a method for printing at least one printing material 02, in particular at least one printing material web 02, by means of at least one printing element 211; 411 of printing machine 01, wherein first output data 646 for production or for actuating at least one component of at least one first printing unit 200 of printing machine 01, which component determines at least one form of printing images, in particular at least individual pixels of printing images, are generated from template image data 641; 642; 643; 644, particularly stored in digital form, for at least one first complete printing image 636, in order to produce at least one first printed complete printing image 636, and wherein the stored template image data 641; 642; 643; 644 at least of the at least one first complete printing image 636 contain at least template image data 643 at least of one first individual page 638, and wherein at least the at least one first individual page 638 is stretched within the stored data, before and/or during the generation of the output data 646, with a stretching factor, in particular with a first stretching factor, at least in one template direction B; D, in particular the first template direction B, based on template image data 641; 642; 643; 644 and/or based on order data that refer to a print order, and/or based on correction data stored in at least one correction memory 666, and wherein the at least one first printed complete printing image 636 is produced on the at least one printing material 02 in a first printing process by means of the at least one first printing unit 200, according to the first output data 646.

The statements made in relation to the at least one component of the first printing unit 200 preferably apply similarly to this at least one additional component of the at least one second printing unit 400.

The first stretching factor is preferably determined based on the template image data 641; 642; 643; 644 and/or based on the order data that refer to the print order and/or based on the correction data stored in the at least one correction memory 666. For example, the template image data 636 of a first complete printing image 636 are examined for the presence of individual pages 638; 639, and each individual page 638; 639 is assigned a reference point 651; 652, and a type of printing material is read out from the order data, and based on the correction data, a stretching factor that matches this type of printing material is determined and the distance of the respective reference point 651; 652 from the stretching center 647 is multiplied by the stretching factor.

The at least one second individual page 639 is preferably stretched within the stored data, at least in the template direction B; D, in particular in the first template direction B, more preferably with the same first stretching factor as the at least one first individual page 638, before and/or during the generation of the output data 646, based on the template image data 641; 642; 643; 644 and/or based on the order data that refer to the print order and/or based on correction data stored in the at least one correction memory 666.

The virtual reference distance 657 is preferably stretched at least in the template direction B; D, in particular in the first template direction B, within the stored data, more preferably with the same first stretching factor as the at least one first individual page 638, before and/or during the generation of the output data 646, based on the template image data 641; 642; 643; 644 and/or based on the order data referring to the print order and/or based on correction data stored in the at least one correction memory 666.

The at least one first complete printing image 636 is preferably stretched at least in the template direction B; D, in particular in the first template direction B, within the stored data, more preferably with the same first stretching factor as the at least one first individual page 638, before and/or during the generation of the output data 646, based on the template image data 641; 642; 643; 644 and/or based on the order data referring to the print order and/or based on correction data stored in the at least one correction memory 666.

The reference distance 653, on one hand, and the first page dimension 648 of the at least one printed first individual page 638 and/or the second page dimension 649 of the at least one printed second individual page 639, on the other hand, are preferably in the same ratio to one another as the virtual reference distance 657, on one hand, and the virtual first page dimension 663 of the at least one first individual page 639 in the template image data 641; 642; 643; 644 and/or the virtual second page dimension 664 of the at least one second individual page 639 in the template image data 641; 642; 643; 644, on the other hand.

When the at least one first individual page 638 is stretched in the stored data, at least the virtual first page dimension 663 is preferably stretched in the template direction B; D, particularly in the first template direction B, within the stored data, while maintaining all the ratios of dimensions in relation to the first template direction B, based on the template image data 641; 642; 643; 644 and/or based on order data that refer to a print order and/or based on correction data stored in at least one correction memory 666.

Preferably, at least one first image dimension 658 of the at least one first printed complete printing image 636, measured immediately following the first printing process in the first printing image direction C, is selectively determined based on the template image data 641; 642; 643; 644 and/or based on the order data that refer to the print order and/or based on the correction data stored in the at least one correction memory 666.

Preferably, second output data 646 for production or for actuating at least one component of at least one second printing unit 400 of printing machine 01, which component determines at least one form of printing images, in particular at least individual pixels of printing images, are generated from template image data 641; 642; 643; 644 for at least one second complete printing image 637, in order to produce at least one second printed complete printing image 637. Based on the second output data 646, at least one second printed complete printing image 637 is preferably produced on the at least one printing material 02 in a second printing process by means of the at least one second printing unit 400.

At least one first image dimension 658 of the at least one first printed complete printing image 636, measured in a first printing image direction C immediately following the first printing process, and at least one second image dimension 659 of the at least one second printed complete printing image 637, measured in this first printing image direction C immediately following the second printing process, are in a complete printing image-print ratio to one another. The virtual first image dimension 661 of the at least one first complete printing image 636 in the template image data 641 and the virtual second image dimension 662 of the at least one second complete printing image 637 in the template image data 642 are preferably in a complete printing image-template ratio to one another. The complete printing image-print ratio is preferably different from the complete printing image-template ratio. More preferably, the complete printing image-print ratio differs from the complete printing image-template ratio by at least 0.1%, preferably at least 0.2%, more preferably at least 0.5% and even more preferably at least 1%. In this connection is it noted again that the output data 646 are generated from the template image data 641; 642; 643; 644 and are therefore identical to the template image data 641; 642; 643; 644 in only exceptional cases. The difference between the complete printing image-print ratio and the complete printing image-template ratio is preferably selectively established based on the order data that refer to the print order and based on correction data stored in the at least one correction memory 666, before the at least one first printed complete printing image 636 is produced. A virtual image dimension is preferably a dimension particularly within an image which is stored in digitally stored form in a data memory.

In particular for the selective determination of the first image dimension 658 of the at least one first complete printing image 636, the at least one first complete printing image 636 is preferably stretched within stored data in the first template direction B, particularly while maintaining all the dimensional ratios in relation to the first template direction B. These dimensions in relation to the first template direction B are preferably the at least one virtual page dimension 663 of the at least one first individual page 638 and the at least one virtual page dimension 664 of the at least one second individual page 639 in the first template direction B. If the at least one first complete printing image 636 should become enlarged in template direction B, an edge region of the enlarged complete printing image 636 will be removed, for example, to restore the original image dimension 658; 659 of the at least one complete printing image 636; 637. If the at least one first complete printing image 636 should become smaller in template direction B, then a region representing a blank area will be added, for example, in an edge region of the reduced complete printing image 636, to restore the original image dimension 658; 659 of the at least one complete printing image 636; 637. Such removal or addition is carried out, for example, once the stretching of the at least one first complete printing image 636 is completed and/or gradually during the stretching of the at least one first complete printing image 636.

The at least one first individual page 638 and/or the at least one second individual page 639 and/or the at least one first complete printing image 636 and/or the at least one second complete printing image 637 is preferably additionally stretched within stored data with at least one second stretching factor in a second template direction, which is further preferably oriented orthogonally to the first template direction B, while maintaining all the dimensional ratios with respect to the first template direction B. More preferably, the first stretching factor with respect to the first template direction B is different from the second stretching factor, in relation to the second template direction. More preferably, the second stretching factor is determined based on the template image data 641; 642; 643; 644 and/or based on order data that refer to a print order and/or based on correction data stored in at least one correction memory 666.

The stretching of the at least one first individual page 638, particularly within the stored data, and/or the stretching of the at least one second individual page 639, particularly within the stored data and/or the stretching of the at least one first complete printing image 637, particularly within the stored data, and/or the stretching of the at least one virtual reference distance 657, particularly within the stored data, and/or the selective determination of the at least one first image dimension 658, measured in a first printing image direction C immediately following the first printing process, of the at least one first printed complete printing image 636, preferably enables at least one change in a dimension of the printing material 02 to be compensated for, more preferably even before the change in the at least one dimension of printing material 02 has taken place.

The stretching of the at least one first individual page 638, particularly within the stored data, and/or the stretching of the at least one second individual page 639, particularly within the stored data, and/or the stretching of the at least one first complete printing image 637, particularly within the stored data, and/or the stretching of the at least one virtual reference distance 657, particularly within the stored data, and/or the selective determination of the at least one first image dimension 658 of the at least one first printed complete printing image 636, measured in a first printing image direction C immediately following the first printing process, preferably takes place before and/or during the generation of the first output data 646 from the template image data 641; 642; 643; 644 and/or after the template image data 641; 642; 643; 644 have been stored in a data memory of printing machine 01 and/or before the at least one first printed complete printing image 636 is produced.

The stretching of the at least one first individual page 638, particularly within the stored data, and/or the stretching of the at least one second individual page 639, particularly within the stored data, and/or the stretching of the at least one first complete printing image 637, particularly within the stored data, and/or the stretching of the at least one virtual reference distance 657, particularly within the stored data, and/or the selective determination of the at least one first image dimension 658 of the at least one first printed complete printing image 636, measured in a first printing image direction C immediately after the first printing process, is preferably controlled and/or regulated by a machine controller and/or printing data processor 600 of printing machine 01 itself and/or by means of at least one stored algorithm of a machine controller and/or printing data processor 600 of printing machine 01 itself.

The stretching of the individual pages 638; 639 and/or of the at least one first complete printing image 636 is preferably synchronized with a change in at least one dimension of printing material 02 such that, after the at least one first complete printing image 636 is applied by means of a first printing unit 200, and after a change in the at least one dimension of printing material 02, and after a subsequent application of at least one second complete printing image 637 by means of a second printing unit 400, at least one reference point 654; 656 of a printed individual page 638; 639 belonging to the printed first complete printing image 636 is arranged with the proper color-to-color registration and/or true-to-register with respect to at least one reference point of an individual page 1638; 1639 belonging to the printed second complete printing image 637, and/or such that, after the at least one first complete printing image 636 has been applied by means of a first printing unit 200, and after a change in the at least one dimension of printing material 02, and after a subsequent application of at least one second complete printing image 637 by means of a second printing unit 400, at least one individual page 638; 639 belonging to the first complete printing image 636 is arranged with the proper color-to-color registration and/or true-to-register with respect to a respective individual page 1638; 1639, printed on printing material 02 by the second printing unit 411 and/or belonging to the at least one second complete printing image 637.

The difference between the complete printing image-print ratio and the complete printing image-template ratio is again selectively determined by a machine controller and/or printing data processor 600 of printing machine 01 itself and/or by means of at least one stored algorithm of a machine controller and/or printing data processor 600 of printing machine 01 itself, before the at least one first printed complete printing image 636 is produced.

The distance between the first reference point 651 and the second reference point 652 on the at least one first printed complete printing image 636, on one hand, and a first page dimension 648 of a printed first individual page 638 and/or a second page dimension 649 of a printed second individual page 639, on the other hand, are preferably in the same ratio, in particular a dimensional ratio, to one another as the ratio between an assigned distance between the virtual first reference point 654 and the virtual second reference point 656 in template image data 641 of the at least one first complete printing image 636, on one hand, and the virtual first page dimension 663 of the at least one first individual page 639 in the template image data 641; 642; 643; 644; 1643; 1644, in particular the at least one first individual page 638, and/or the virtual second page dimension 664 of the at least one second individual page 639 in the template image data 641; 642; 643; 644; 1643; 1644, in particular the at least one second individual page 639, on the other hand.

This means that a dimension-template ratio is equal to a dimensional-print ratio. The dimension-template ratio is preferably the dimensional ratio between the assigned virtual reference distance 657 between the virtual first reference point 654 and the virtual second reference point 656 in the template image data 641 of the at least one first complete printing image 636, on one hand, and the virtual first page dimension 663 of the at least one first individual page 639 in the template image data 641; 642; 643; 644; 1643; 1644 and/or the virtual second page dimension 664 of the at least one second individual page 639 in the template image data, on the other hand. The dimensional-print ratio is preferably the dimensional ratio between the reference distance 653 between the first reference point 651 and the second reference point 652 on the at least one first printed complete printing image 636, on one hand, and a first page dimension 648 of a printed first individual page 638 and/or a second page dimension 649 of a printed second individual page 639, on the other hand.

In the conversion of template image data 641; 642; 643; 644; 1643; 1644 to output data 646, at least two processes are preferably implemented. One of these at least two preferred processes is the stretching of the individual pages 638; 639 and/or of the first complete printing image 636. Another of these at least two preferred processes is the generation of raster data 647. The stretching of the individual pages 638; 639 and/or of the first complete printing image 636 is preferably carried out first, resulting in a generation of geometrically modified template image data 641; 642; 643; 644; 1643; 1644, after which the raster data 647 are generated from the geometrically modified template image data 641; 642; 643; 644; 1643; 1644. The raster data 647 then form the basis for the output data 646 or are identical to the output data 646. Alternatively, the raster data 647 are generated from the template image data 641; 642; 643; 644; 1643; 1644 first, after which the individual pages 638; 639 and/or the first complete printing image 636 are stretched within the raster data 647, wherein geometrically modified raster data 647 are generated. The geometrically modified raster data 647 then form the basis for the output data 646 or are identical to the output data 646, depending upon whether the raster data 647 can be further processed directly, or whether a further modification of the raster data 647 is necessary and/or desirable for the actuation of the nozzles. Alternatively or additionally, the stretching of the individual pages 638; 639 and/or of the first complete printing image 636 and the generation of raster data 647 are carried out at least partially simultaneously and/or alternatingly, for example by generating raster data 647 by row and/or by column, and stretching portions of the individual pages 638; 639 and/or of the first complete printing image 636 therebetween.

The individual pages 638; 639 and/or the at least one first complete printing image 636 are preferably stretched, preferably in stored form, within this at least one first complete printing image 636. This is preferably carried out only after the template image data 641; 642; 643; 644; 1643; 1644 have been prepared, in other words only when operators no longer have direct access to the image data.

A preferred third variant of the preferred method represents a combination of the first variant of the method and the second variant of the method. In particular, the preferred third variant of the method thus contains all the features of the first variant of the method and all the features of the second variant of the method, to the extent that these features are not contradictory. In this case, for example, the individual pages 638; 639 are displaced relative to one another within the template image data 641; 642; 643; 644 and are each stretched centrally from a dedicated stretching center 374, which preferably lies on a center line of the respectively displaced individual page 638; 639, or, for example, the individual pages 638; 639 are stretched together and then displaced relative to one another. The third variant is of interest, for example, when the dimensions of printing material 02 change to different degrees in different locations, for example because the application of coating medium causes different changes in the at least one dimension to occur in the region of the individual pages 638; 639 from changes in the region beyond the individual pages 638; 639, particularly in edge regions and/or intermediate spaces. In that case, the at least one first individual page 638 and the at least one second individual page 639 are preferably displaced relative to one another at least in a first template direction B, within stored data, before and/or after stretching, while maintaining at least their respective absolute virtual page dimensions 648; 649, measured in this first template direction B.

Ratios, in particular the dimensional ratio and/or the dimensional-print ratio and/or the dimensional-template ratio and/or the complete printing image-print ratio and/or the complete printing image-template ratio are preferably understood as ratios in a mathematic sense.

Page description data are preferably vector-based data. An individual page 638; 639; 1638; 1639 can be displaced within page description data, for example, by leaving all objects belonging to said individual page unchanged with the exception of a position vector that determines its position, particularly its position in the complete printing image 636; 637. An individual page 638; 639; 1638; 1639 and/or a complete printing image 636; 637 can be stretched, for example, by stretching all the objects of said individual page 638; 639; 1638; 1639 and/or all the objects and/or individual pages 638; 639; 1638; 1639 of said complete printing image 636; 637 themselves, and also stretching the respective position vector that defines their position.

The at least one second printing unit 400 of printing machine 01 preferably imprints a different side of printing material 02 from the side imprinted by means of the at least one first printing unit 200 of printing machine 01. Alternatively and more preferably, however, the at least one second printing unit 400 of printing machine 01 imprints the same side of printing material 02 as is imprinted by means of the at least one first printing unit 200. This allows a greater number of different coating mediums, particularly printing inks, to be applied to the same side of printing material 02. Preferably at least one, and more preferably a plurality of such coating mediums are, for example, printing inks in the colors cyan and/or magenta and/or yellow and/or black, and/or are, for example, printing inks in special colors, for example blue and/or orange and/or green and/or red and/or purple and/or white. Preferably at least one, and more preferably a plurality of such coating mediums are, for example, varnishes and/or special colors such as gold and/or silver. Preferably at least one and more preferably a plurality of such coating mediums contain iron oxide particles, for example, and/or have special magnetic properties, for example a positive or negative magnetic susceptibility and/or ferromagnetic or ferrimagnetic or antiferromagnetic properties. Preferably at least one and more preferably a plurality of such coating mediums are water-based coating mediums, for example, and/or contain at least one organic solvent. Preferably at least one and more preferably a plurality of such coating mediums can be cured by means of UV light, for example, and/or are electrically conductive and/or are visible only under UV light.

Also additionally or alternatively preferred, therefore, is a method for coating, in particular for imprinting a printing material 02 by means of at least one printing element 211; 411 and preferably a plurality of printing elements 211; 411 of printing machine 01, wherein printing material 02 is preferably coated along a transport path by means of particularly at least one printing element 211 of at least one first printing unit 200 and/or particularly at least one printing element 411 of at least one second printing unit 400, and wherein preferably at least five, more preferably at least six, even more preferably at least seven and more preferably still at least eight different coating mediums are applied to the same first side of printing material 02.

Each of these preferably at least five, more preferably at least six, even more preferably at least seven and more preferably still at least eight different coating mediums is preferably applied by means of a plurality of individually actuable components of preferably at least one printing element 211 of at least one first printing unit 200 and/or preferably at least one printing element 211 of at least one second printing unit 400 of printing machine 01, which components preferably determine, in particular produce and/or print, forms of printed printing images, particularly individual pixels of printing images, based on output data 646 and particularly control data 646, particularly in order to produce at least one first printed complete printing image 636 on printing material 02. Each of these components which determines pixels determines a multiplicity of pixels, for example by processing sequences of entries 631 of the raster data 647.

At least one, more preferably at least two, even more preferably at least three and more preferably still at least four different coating mediums are preferably applied to the first side of printing material 02, particularly by means of the at least one printing element 211 of the at least one first printing unit 200. At least one, more preferably at least two, even more preferably at least three and more preferably still at least four coating mediums, which are particularly different from one another and are each different from the coating mediums of the first printing unit 200, are preferably applied to the first side of printing material 02, particularly by means of the at least one printing element 411 of the at least one second printing unit 400.

Printing material 02 is preferably coated along a transport path by means of, for example, the at least one printing element 211 of the at least one first printing unit 200 with at least one, more preferably at least two, even more preferably at least three and more preferably still at least four of the at least five, more preferably at least six, even more preferably at least seven and more preferably still at least eight different coating mediums, and is then preferably dried by means of the at least one first dryer 301, which particularly acts on printing material 02, after which the printing material is preferably coated by means of, for example, the at least one printing element 411 of the at least one second printing unit 400 with at least one, more preferably at least two, even more preferably at least three and more preferably still at least four others of the at least five, more preferably at least six, even more preferably at least seven and more preferably still at least eight different coating mediums, after which it is preferably dried by means of the at least one second dryer 331, which particularly acts on printing material 02.

As has been described, the at least one printing element 211; 411 is preferably embodied at least partially as an inkjet printing element 211; 411, and/or the individually actuable components that determine individual pixels of printing images based on output data 646, in particular control data 646, are nozzles of inkjet print heads 212; 412 of printing elements 211; 411 of the at least one first printing unit 200 and/or of the at least one second printing unit 400 of printing machine 01.

Particularly when the same side of printing material 02 is coated by means of a plurality of printing units 200; 400 and/or the printing elements 211; 411 thereof, it is important for high-quality color-to-color registration to be achieved. Thus it is particularly preferred that the at least one first complete printing image 636 is printed on printing material 02 in the at least one first printing unit 200 of printing machine 01, while at the same time and/or thereafter, at least one dimension of printing material 02 is altered at least in a first printing image direction C, and after this change in the at least one dimension of printing material 02 at least one second complete printing image 637 is printed on printing material 02 by at least one second printing unit 400 of printing machine 01.

Therefore, processes are especially preferably used which are capable of compensating for changes in the dimensions of printing material 02. Thus it is also particularly preferred in this connection that first output data 646 and/or control data 646 for an actuation of the at least one component of the at least one first and/or second printing unit 200; 400, which component determines individual pixels of printing images, are generated from the stored template image data 641; 642; 643; 644 of the at least one first complete printing image 636 for the purpose of producing at least one first printed complete printing image 636, and in that the stored template image data 641; 642 of the at least one first complete printing image 636 contain at least template image data 643 of at least one first individual page 638 and template image data 644 of at least one second individual page 639, and in that the at least one first individual page 638 and the at least one second individual page 639 are displaced relative to one another, at least in a first template direction B, within stored data, while maintaining at least their respective absolute virtual page dimension 663; 664, measured in this first template direction B, based on order data that refer to a print order and/or based on correction data stored in at least one correction memory 666. This displacement is preferably carried out in relation to individual pages 638; 639 of at least one complete printing image 636, which is applied by means of the at least one first printing unit 200. Alternatively or additionally, this displacement is preferably carried out in relation to individual pages 1638; 1639 of at least one complete printing image 637, which is applied by means of the at least one second printing unit 400.

It is therefore also additionally or alternatively preferred that first output data 646 and/or control data 646 for an actuation of the at least one component of the at least one first and/or second printing unit 200; 400, which component determines individual pixels of printing images, are generated from the stored template image data 641; 642; 643; 644 of at least one first complete printing image 636 for the purpose of producing at least one first printed complete printing image 636, and in that the stored template image data 641; 642; 643; 644 of at least the at least one first complete printing image 636 contain at least template image data 643 of at least one first individual page 638, and that at least the at least one first individual page 638 is stretched within stored data, before and/or during the generation of the output data 646, with a first stretching factor, at least in the first template direction B, based on the template image data 641; 642; 643; 644 and based on order data that refer to a print order and based on correction data stored in at least one correction memory 666.

Again, by stretching the at least one first individual page 638 and/or by stretching the at least one second individual page 639 and/or by stretching the at least one virtual reference distance 657 and/or by the relative displacement of the at least one first individual page 638 and the at least one second individual page 639 relative to one another in the template image data 641; 642; 643; 644, at least one change in at least one dimension of printing material 02 is at least partially compensated for.

To allow printing material 02 to be imprinted on the same side particularly by means of a plurality of printing units 200; 400, a modified variant of printing machine 01 is preferred.

Along a transport path through printing machine 01 provided for at least one printing material 02 to be imprinted, at least one first printing unit 200 is preferably arranged aligned particularly toward and/or acting on the provided transport path, and the at least one first dryer 301 and preferably at least one second printing unit 400 are preferably arranged aligned particularly toward and/or acting on the provided transport path. In this case, printing machine 01 preferably has at least five, more preferably at least six, even more preferably at least seven and more preferably still at least eight different intermediate reservoirs for different coating mediums. Each of these at least five, more preferably at least six, even more preferably at least seven and more preferably still at least eight intermediate reservoirs preferably is and/or can be connected to at least a plurality of individually actuable components of the at least one first printing unit 200 or the at least one second printing unit 400 of printing machine 01, preferably assigned exclusively to said reservoir, more preferably each via at least one supply line, in particular at least one supply line per intermediate reservoir.

Each of these elements or components, in particular individually actuable components, can in turn be used particularly to produce forms of printed printing images, in particular individual printed pixels of printed printing images, based on output data 646 and particularly control data 646. Each of these elements or components, in particular individually actuable components, is preferably arranged on the same side of the transport path through printing machine 01 provided for the at least one printing material 02 to be imprinted, and/or is more preferably configured to act on, in particular apply coating medium to, the same side of printing material 02 to be imprinted. The at least one first printing unit 200 preferably has at least one, more preferably at least two, even more preferably at least three and more preferably still at least four of the different intermediate reservoirs for different coating mediums. The at least one second printing unit 400 preferably has at least one, more preferably at least two, even more preferably at least three and more preferably still at least four of the different intermediate reservoirs for coating mediums that are particularly each different from one another and from the coating mediums of the first printing unit 200. It is also possible for a single printing unit 200; 400 to have at least five of the different intermediate reservoirs. Preferably, the at least one first printing unit 200 and/or the at least one second printing unit 400 has at least one printing element 211; 411 embodied as an inkjet printing element 211; 411.

In this case, the first central cylinder 201 and the second central cylinder 401 preferably have the same rotational direction, and/or in this case, a transfer element of the at least one first printing unit 200 and a transfer element of the at least one second printing unit 400 have the same rotational direction. The at least one first printing unit 200 and the at least one second printing unit 400 in this case have substantially the same configuration, particularly in terms of rotational elements and printing elements 211; 411.

To enable printing images with large dimensions to be printed particularly rapidly and without gaps, a method for imprinting at least one first printing material 02, in particular at least one strip-shaped first printing material 02, by means of at least one printing element 211; 411 of a printing machine 01, in particular a web-fed printing machine 01, is additionally or alternatively preferred, wherein output data 646 for actuating at least one component of at least one first printing unit 200 of printing machine 01, which component determines at least one form of printing images, are generated from particularly digitally stored template image data 641; 642; 643; 644 for at least one complete printing image 636; 637, in particular at least one first complete printing image 636 for the purpose of producing at least one printed complete printing image 636; 637, in particular at least one first printed complete printing image 636. Such a complete printing image 636; 637 can contain individual pages 638; 639; 1638; 1639, for example, or consists, for example, of only one print motif and/or only one individual page 638; 639; 1638; 1639 of corresponding size. The method can be used as an independent method or as a supplement to the above-described process steps. This method can be used to produce particularly large printed images and/or, by periodic repetition, even printed images of infinite length, at relatively low cost and with high printing image quality.

The at least one complete printing image 636, 637, in particular first complete printing image 636, preferably will be and/or is determined and/or described in a primary data packet. Such a primary data packet comprises, for example, the template image data 641; 642 of the at least one complete printing image 636; 637, in particular first complete printing image 636, or the geometrically modified template image data 641; 642 of the at least one complete printing image 636; 637, in particular the first complete printing image 636, geometrically modified particularly by stretching and/or displacing individual pages 638; 639; 1638; 1639. Such template image data 641; 642 or geometrically modified template image data 641; 642 are provided, for example, in the form of a vector-based page description, for example as page description data, in particular pdf data. Thus the at least one primary data packet preferably contains, in particular, page description data, especially pdf data. Alternatively, such a primary data packet comprises raster data 647, for example, which have been compiled from the template image data 641; 642 for the at least one complete printing image 636; 637, in particular first complete printing image 636, or from previous geometrically modified raster data 647, modified by stretching and/or displacement, for the at least one complete printing image 636, in particular first complete printing image 636; 637. Such raster data 647 or geometrically modified raster data 647 are provided, for example, in the form of a pixel matrix or partial pixel matrix, for example as pixel matrix data, in particular bitmap data. Thus the at least one primary data packet alternatively contains particularly pixel matrix data, especially bitmap data.

At least one complete image dimension is preferably assigned to the at least one complete printing image 636; 637, in particular first complete printing image 636, in the template image data 641; 642 and/or in the primary data packet. The at least one complete image dimension is, for example, a first complete image dimension measured in the first template direction B, in particular a width of the at least one complete printing image 636; 637, in particular first complete printing image 636. The at least one complete image dimension is preferably a second complete image dimension, measured in the second template direction D, in particular processing direction D, in particular a length of the at least one complete printing image 636; 637, in particular first complete printing image 636. More preferably, at least this length and this width are assigned to the at least one complete printing image 636; 637, in particular first complete printing image 636, in the template image data 641; 642 and/or in the primary data packet.

The at least one particularly first complete image dimension and/or width of the at least one first complete printing image 636 is compared, for example, with at least one threshold value, which is preferably a first threshold value. Preferably, the at least one particularly second complete image dimension and/or length of the at least one complete printing image 636; 637, in particular first complete printing image 636, is compared with at least one threshold value, which is preferably a second threshold value. For example, the at least one first complete image dimension is compared with the at least one first threshold value by the machine controller and/or the printing data processor 600 of printing machine 01 itself and/or by means of at least one stored algorithm of the machine controller and/or data processor 600 of printing machine 01. The at least one second complete image dimension is preferably compared with the at least one second threshold value by the machine controller and/or the printing data processor 600 of printing machine 01 itself and/or by means of at least one stored algorithm of the machine controller and/or printing data processor 600 of printing machine 01.

For example, if the at least one complete image dimension of the at least one complete printing image 636; 637, in particular first complete printing image 636, exceeds the at least one threshold value, the at least one complete printing image 636; 637, in particular first complete printing image 636, is divided, particularly with respect to template direction B, D, into a plurality of sections 679 of the at least one complete printing image 636; 637, in particular first complete printing image 636. More particularly, if the at least one second complete image dimension, in particular the length of the at least one complete printing image 636; 637, in particular first complete printing image 636, exceeds the at least second threshold value, the at least one complete printing image 636; 637, in particular first complete printing image 636, is preferably divided, with respect to this second template direction D or processing direction D, into a plurality of sections 679 of the at least one complete printing image 636; 637, in particular first complete printing image 636. In that case, the section dimensions of each of the sections 679, particularly in the second template direction D, preferably do not exceed the particularly second threshold value. Optionally, the section dimensions of the sections 679 in the first template direction B preferably do not exceed the first threshold value.

For example, a plurality of sections 679 of the at least one complete printing image 636; 637, in particular first complete printing image 636, produced in this manner have section dimensions in the template direction B, D, in particular section dimensions in the first template direction B and/or section dimensions in the second template direction D, which are the same as each other, more preferably the same as the respective particularly first and/or second threshold value. For example, all of sections 679 have the same section dimensions in the first template direction B or the second template direction D, with the exception of a first section, as viewed in the respective template direction B; D, and/or a last section 679, as viewed in the respective template direction B; D, the section dimension of which results from a remainder that remains after the division. Preferably, the sections 679 each have a width that corresponds to the width of the at least one complete printing image 636; 637, and/or the sections 679 each have a length that results from the segmentation into secondary data packets and/or from the maximum data packet size that can be processed. At least two of the sections 679 of the same complete printing image 636; 637 preferably differ in terms of their section dimensions in the template direction D, preferably characterized as processing direction D. For example, the section dimensions of each of sections 679 in the second template direction D are substantially equal in size, and differ from one another only by deviations of less than 5%, more preferably less than 1%.

The particularly second threshold value, which forms the basis for the decision of whether the primary data packet will be segmented into secondary data packets and what the maximum size of the secondary data packets will be, is preferably based on the maximum volume of data that can be processed at any one time by the raster graphics processor. This data volume determines the maximum total number of image elements or pixels a packet of raster data, which is or has been generated from an individual secondary data packet, may contain. The transverse number of image elements or pixels in the widthwise direction of printing material 02 is determined from the width of the complete printing image 636; 637 and the resolution in image elements or pixels per unit of width in the direction of the width of printing material 02. The direction of the width of printing material 02 corresponds to axial direction A. This maximum total number of image elements or pixels that a packet of raster data may contain and the transverse number of image elements or pixels in the widthwise direction of the printing material 02 determine the maximum lengthwise number of image elements or pixels in the lengthwise direction of printing material 02 and/or of the complete printing image 636; 637. The lengthwise direction of printing material 02 is preferably orthogonal to axial direction A and preferably extends parallel to the transport path of printing material 02. This maximum lengthwise number of image elements or pixels in the lengthwise direction of printing material 02 and the resolution in image elements or pixels per unit of length in the lengthwise direction of the printing material 02 determine the maximum length the image described in the secondary data packet may have in the lengthwise direction of the printing material 02 and therefore also in the template direction D or processing direction D per secondary data packet. Thus the maximum value for the particularly second threshold value is preferably determined.

The particularly second threshold value is preferably defined and/or stored in a unit of length, for example in meters or inches. Alternatively, the particularly second threshold value is defined and/or stored in a raster unit of measurement, for example in image elements or pixels. The at least one particularly second complete image dimension is preferably defined and/or stored in a unit of length, for example in meters or inches. Alternatively, the at least one particularly second complete image dimension is defined and/or stored in a raster unit of measurement, for example in image elements or pixels. The at least one particularly second section dimension is preferably defined and/or stored in a unit of length, for example in meters or inches. Alternatively, the at least one particularly second section dimension is defined and/or stored in a raster unit of measurement, for example in image elements or pixels.

The plurality of sections 679 preferably will be and/or is determined and/or described in a plurality of secondary, in particular separate and/or different data packets. The respective secondary data packets are preferably smaller than the primary data packet, particularly with respect to the storage space they require. The secondary data packets can thereby be further processed using relatively limited resources, even if these resources are not sufficient to further process the primary data packet all at once. More particularly, each secondary data packet preferably contains only data relating to precisely one section 679 of the at least one complete printing image 636; 637, in particular first complete printing image 636. Preferably, all the data relating to one section 679 of the at least one complete printing image 636; 637, in particular first complete printing image 636, are contained in precisely one secondary data packet. Thus each secondary data packet preferably corresponds to precisely one section 679 of the at least one complete printing image 636; 637, in particular first complete printing image 636.

By means of printing processes carried out by means of the at least one first printing unit 200, in each of which output data 646 that are based on at least one of the secondary data packets are processed, the plurality of sections 679 of the at least one complete printing image 636; 637, in particular first complete printing image 636, and therefore preferably the at least one printed complete printing image 636; 637, in particular first printed complete printing image 636, is preferably produced on the at least one first printing material 02, more preferably without gaps. In each of the printing processes, output data 646 that are based on at least one and more preferably on precisely one of the secondary data packets are preferably processed. These printing processes are preferably carried out at least partly in sequence by means of the at least one first printing unit 200. This is understood particularly to mean that printing processes that start first are also preferably completed first. However overlaps do occur, for example particularly when nozzles of print heads 212 are arranged at different locations along the transport path of printing material 02, and nozzles which are located further downstream with respect to the transport path are printing a subsequent section 679 while nozzles that are located further upstream with respect to the transport path are still printing a previous section 679. In that case, the method is preferably characterized particularly in that, at least occasionally, at least two of the sections 679 of the particularly first complete printing image 636; 637 are produced at least partially simultaneously on the same printing material 02 and/or in that, at least occasionally, output data 646 that are based on at least two different secondary data packets are used simultaneously, each to generate a part of one of the sections of the particularly first complete printing image 636; 637 on particularly the same printing material 02.

Production without gaps is preferably understood to mean that the point at which printed sections 679 of the complete printing image 636; 637 adjoin one another is not clearly distinguishable in the printed complete printing image 636; 637, in particular first printed complete printing image 636. More particularly, pixels which are directly adjacent to one another, particularly in the template direction B; D, and which have been generated based on output data 646 originating from the same secondary data packet are preferably produced on the same printing material 02 at the same distance from one another as the distance with which pixels which are directly adjacent to one another in this template direction B; D and which were generated on the basis of output data 646 originating from a different secondary data packet are produced on the same printing material 02.

Depending on whether the segmentation into secondary data packets is carried out before or after printing image data have been rastered and/or stretched and/or displaced, the printing image data are each preferably present, at least at first, within the secondary data packets, for example, in the form of at least one vector-based page description, for example as pdf data, or in the form of at least one pixel matrix or partial pixel matrix, for example as raster data, for example bitmap data. Thus the at least one secondary data packet particularly preferably contains page description data, for example pdf data or pixel matrix data, for example bitmap data.

The primary data packet preferably contains the template image data 641; 642; 643; 644 or geometrically modified template image data. Alternatively, the primary data packet contains the raster data 647 or geometrically modified raster data 647. The secondary data packets preferably each contain template image data 641; 642; 643; 644; 1643; 1644 or geometrically modified template image data 641; 642; 643; 644. Alternatively, the secondary data packets each contain raster data 647 or geometrically modified raster data 647. More preferably, the secondary data packets contain the same type of data as the primary data packet, and even more preferably, each contains page description data and/or template image data 641; 642; 643; 644 or geometrically modified template image data 641; 642 643; 644.

The data contained in the secondary data packets are preferably processed by means of at least one raster graphics processor 603. The output data 646 are preferably generated, directly or indirectly, for example via at least one geometric modification, in particular stretching and/or displacement, from packets of raster data 647 obtained in this manner. In particular, packets of raster data 647 that are based on different secondary data packets are preferably used at least partly in sequence for generating output data 646 for printed sections 679 of the at least one complete printing image 636; 637, in particular first complete printing image 637. The secondary data packets and/or the raster data 647 obtained therefrom are preferably processed in sequence to generate output data 646, according to which the printing image is produced, more preferably according to which coating medium is ejected through nozzles. For this purpose the output data 646 are preferably allocated as described to the devices for actuating the nozzles of the print heads 212; 412. Alternatively, it is also possible to first subject the template image data 641; 642; 643; 644; 1643; 1644 to a displacement and/or stretching, if necessary, and in any case to convert these first to raster data 647, and to then use the raster data 647 to carry out the division into sections. However, this requires higher computing capacities and/or storage capacities in connection with the at least one raster graphics processor 603.

The secondary data packets are preferably loaded at least partly in sequence into at least one memory, more preferably into several memories as sections 679, and even more preferably into precisely one memory. Such a memory is, for example, the at least one image data memory 601 and/or the at least one raster data memory 602. The secondary data packets are preferably processed at least partly in sequence by means of at least one raster graphics processor 603. The secondary data packets are preferably read out at least partly in sequence from at least one memory, more preferably from several memories as sections 679, and even more preferably from precisely one memory. Such a memory again is, for example, the at least one image data memory 601 and/or the at least one raster data memory 602. The secondary data packets are preferably processed at least partly in sequence to output data 646. In the above context, "at least partly in sequence" preferably means that a corresponding processing of the first secondary data packet is completed before the same corresponding processing of the last secondary data packet originating from the same primary data packet is begun.

The secondary data packets and/or packets of raster data 647 that are each based on different secondary data packets are preferably each stored as a unit in at least one memory, in particular a buffer and/or ring memory and/or shift register, and are more preferably read out from there at least partly in sequence. For example, at least one second secondary data packet is being stored in the at least one memory while at least one previous first secondary data packet is still being read out. For example, at least one third secondary data packet is being stored in the at least one memory while the at least one previous second secondary data packet is still being read out or has not yet been read out. This preferably serves to ensure that a continuous flow of output data 646 can be generated from raster data 647, even if the memory would not be sufficient to store the raster data 647 if the entire primary data packet were to be stored and/or processed all at once. More particularly, this preferably serves to ensure that a continuous flow of output data 646 can be generated from raster data 647, even if the raster data 647 are loaded by packet into the corresponding memory and also deleted by packet from the memory. Such a memory is, for example, the at least one image data memory 601 and/or the at least one raster data memory 602.

Alternatively, all raster data 647 and/or output data 646 generated from a plurality of or all secondary data packets originating from one primary data packet preferably will be and/or are stored at the same time in at least one memory. All of these raster data 647 and/or output data 646 generated from a plurality of or all secondary data packets originating from said primary data packet are preferably used in sequence, for example in cyclic repetitions, to produce the sections 679 of the particularly first complete printing image 636; 637. A continuous and gapless printing image of any length is thereby generated on the same particularly strip-shaped printing material 02, for example. More preferably, a beginning and an end of the particularly first complete printing image 636; 637 are graphically synchronized with one another, in order to enable a gapless and visually undetectable transition between them.

The method is preferably characterized in that the stored template image data 641; 642; 643; 644 at least of the at least one complete printing image 636; 637, particularly first complete printing image 636, contain at least template image data 643 at least of a first individual page 638, and in that at least the at least one first individual page 638 is stretched within stored data, in particular within data of the secondary data packets, before and/or during the generation of the output data 646, with a stretching factor, at least in one template direction B, D, based on the template image data 641; 642; 643; 644 and/or based on order data that refer to a print order and/or based on correction data stored in at least one correction memory 666. This template direction B is preferably a different template direction B from the template direction D in which the at least one complete printing image 636; 637, in particular first complete printing image 636, is divided into sections 679.

The method is preferably alternatively or additionally characterized in that the stored template image data 641; 642 of the at least one complete printing image 636; 637, in particular first complete printing image 636, contain at least template image data 643 of at least one first individual page 638 and template image data 644 of at least one second individual page 639, and in that the at least one first individual page 638 and the at least one second individual page 639 are displaced relative to one another, at least in a first template direction B, within stored data, in particular within data of the secondary data packets, based on the template image data 641; 642; 643; 644 and/or based on order data that refer to a print order and/or based on correction data stored in at least one correction memory 666, preferably while maintaining at least their respective absolute virtual page dimensions 663; 664, measured in this first template direction B. This template direction B is preferably a different template direction B from the template direction D in which the at least one complete printing image 636; 637, in particular first complete printing image 636, is divided into sections 679.

The method is preferably alternatively or additionally characterized in that the at least one printing element 211; 411 is an inkjet printing element 211; 411 and/or in that the printing machine 01 is an inkjet printing machine 01 and/or in that, from the stored template image data 641; 642; 643; 644 of the at least one complete printing image 636; 637, in particular first complete printing image 636, output data 646 for actuating nozzles of print heads 212; 412 of the at least one first printing unit 200 of printing machine 01 are generated, according to which coating medium is ejected through these nozzles of print heads 212; 412 to produce the at least one printed complete printing image 636; 637, in particular first printed complete printing image 636, and/or in that the respective output data 646 are control data 646 for nozzles to be used, in print heads 212; 412 of at least one inkjet printing element 211; 411 of printing machine 01.

The method is preferably alternatively or additionally characterized in that at least five different coating mediums are applied to the same side of the printing material 02 and in that each of these at least five different coating mediums is applied to printing material 02 by means of a plurality of individually actuable components of the at least one first printing unit 200 and/or at least one second printing unit 400 of printing machine 01 which determine individual pixels of printing images based on output data 646 and particularly control data 646, and in that at least one of the at least five different coating mediums is applied to printing material 02 by means of the at least one first printing unit 200 and is then dried by means of at least one dryer 301, after which at least one other of the at least five different coating mediums is applied to printing material 02 by means of the at least one second printing unit 400 of printing machine 01. Preferably, the sections 679 and therefore also the secondary data packets are generated before data are allocated to the at least one first printing unit 200 and the at least one second printing unit 400. When two printing units 200; 400 are used, a synchronization step is preferably carried out at regular or irregular intervals, more preferably only between output data 646 that are based on secondary data packets from different primary data packets. A processing of output data 646 which are based on secondary data packets from the same primary data packet is preferably not affected and/or interrupted for synchronizations.

The division of the at least one complete printing image 636; 637, in particular first complete printing image 636, into a plurality of sections, and therefore the generation of the secondary data packets, is preferably carried out by means of the at least one image data computer 611 and/or by means of the at least one raster data computer 612 and/or by means of another computer, for example another computer of printing machine 01 and/or machine controller 600 and/or printing data processor 600. More preferably, the secondary data packets are generated by means of the at least one image data computer 611, after which raster data 647 are generated from the secondary data packets by means of the at least one raster data computer 612. All memories in which the secondary data packets or data based on the secondary data packets, for example raster data 647 and/or output data 646, are stored can preferably have relatively small storage capacities, for example storage capacities that are smaller than the primary data packet.

Figure 12:
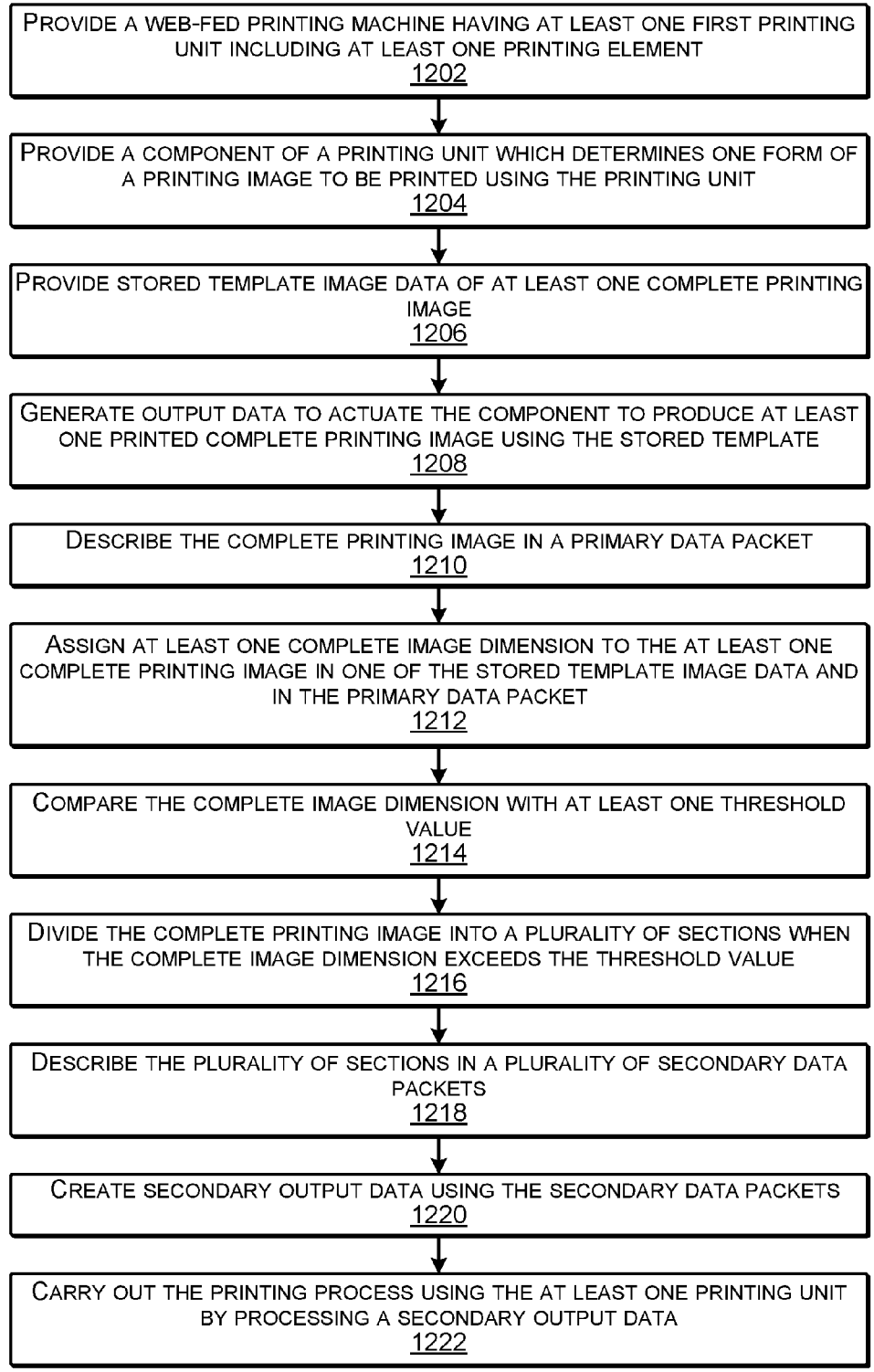
FIG. 12 a schematic illustration of the method of the present invention.

A method for printing a material to be printed, in accordance with the present invention, is depicted in FIG. 12 of the drawings. A web-fed printing machine having at least one first printing unit, including at least one printing element, is provided (1202). A component of the printing unit is provided and determines one form of a printing image to be printed using the printing unit (1204). Stored template image data of at least one complete printing image is provided (1206). Output data is generated to actuate the component to produce at least one printed complete printing image using the stored template (1208). The complete printing image is described in a primary data packet (1210). At least one complete image dimension is assigned to the at least one complete printing image in one of the stored template image data and in the primary data packet (1212). The complete image dimension is compared with at least one threshold value (1214). If the complete image dimension exceeds the threshold value, the complete printing image is divided into a plurality of sections (1216). The plurality of sections are divided into a plurality of secondary data packets (1218). Secondary output data is created using the secondary data packets (1220). The printing process is carried out using the at least one printing unit by processing the secondary output data (1222).

While preferred embodiments of methods for printing a material to be printed have been set forth fully and completely hereinabove, it will be apparent to one of skill in the art that various changes could be made without department from the true spirit and scope of the present invention which is accordingly to be limited only by the appended claims.

What is claimed is:

1. A method for printing on a strip-shaped printing material including:
   providing a web-fed printing machine having at least one first printing unit including at least one printing element;
   providing at least one component of the at least one first printing unit and which determines at least one form of printing images to be printed on the strip-shaped printing material using the at least one first printing unit;
   providing stored template image data of at least one complete printing image;
   generating output data for actuating the at least one component to produce at least one printed complete printing image using the stored template image data of the at least one complete printing image;
   describing the at least one complete printing image in a primary data packet;
   assigning at least one complete printing image dimension, measured in one of a width and a length of the at least one complete printing image, to the at least one complete printing image in one of the stored template image data and in the primary data packet;
   comparing the at least one complete printing image dimension with at least one threshold value;
   dividing the at least one complete printing image, with respect to the one of the width and length of the at least one complete printing image, into a plurality of sections of the at least one complete printing image, when the at least one complete printing image dimension exceeds the at least one threshold value;
   describing the plurality of sections in a plurality of secondary data packets;
   using the plurality of secondary data packets for creating secondary output data; and
   carrying out the printing process, using the at least one printing unit, for producing the plurality of sections of the at least one complete printing image on the strip-shaped printing material by processing the secondary output data based on at least one of the secondary data packets and creating at least one printed complete printing image.

2. The method according to claim 1, further including producing the plurality of sections of the at least one complete printing image on the same printing material.

3. The method according to claim 1, further including comparing at least one complete image dimension with the at least one threshold value by using one of a machine controller and a printing data processor of the printing machine itself and by using one of at least one stored algorithm in a machine controller and a printing data processor of the printing machine.

4. The method according to claim, 1 further including storing all of one of raster data and output data generated from one of a plurality and all of the secondary data packets originating from the primary data packet at the same time in at least one memory.

5. The method according to claim 4, further including one of using one of all of these raster data and output data generated from one of a plurality and all of the secondary data packets originating from this primary data packet in sequence to produce the sections of the at least one printed complete printing image and using one of all of these raster data and output data generated from one of a plurality and all of the secondary data packets originating from this primary data packet in sequence in cyclic repetitions to produce the sections of the at least one printed complete printing image.

6. The method according to claim, 1, further including containing, in one of each secondary data packet, data relating to precisely one section of the at least one complete printing image, and all the data relating to one section of the at least one complete printing image in precisely one secondary data packet.

7. The method according to claim 1, further including loading the secondary data packets one of at least partly in sequence into at least one memory, and processing the secondary data packets at least partly, in sequence by using one of at least one raster graphics processor and reading out the secondary data packets at least partly in sequence from at least one memory.

8. The method according to claim 1, further including providing one of the primary data packet containing page description data and the printing image data within each of the secondary data packets being present, initially, in the form of at least one vector-based page description.

9. The method according to claim 1, further including providing one of a width of each of the sections corresponding to the width of the at least one complete printing image and providing the length of each of the sections resulting from one of a segmentation of the at least one complete printing image into the secondary data packets and from a maximum secondary data packet size that can be processed.

10. The method according to claim 1, further including one of producing at least two of the sections of the at least one complete printing image at least partially simultaneously on the same strip-shaped printing material, and using output data that are based on at least two different ones of the secondary data packets simultaneously, each for producing part of one of the sections of the complete printing image on the same strip-shaped printing material.

11. The method according to claim 1, further including providing the secondary data packets containing the same type of data as the primary data packet.

12. The method according to claim 1, further including one of processing one of the secondary data packets and the raster data obtained therefrom in sequence to generate the secondary output data according to which the printing image is produced, and processing one of the secondary data packets and the raster data obtained therefrom in sequence to generate the secondary output data for ejecting coating medium from nozzles.

13. The method according to claim 1, further including one of storing each one of the secondary data packets and the packets of raster data, which are each based on a different secondary data packet, as a unit in at least one memory, and reading out one of the secondary data packets and the packets of raster data, which are each based on a different secondary data packet, as a unit, at least partly in sequence, from the at least one memory.

14. The method according to claim 1, further including providing one of the at least one printing element as an inkjet printing element, and the printing machine as an inkjet printing machine, and providing the at least one component of the at least one first printing unit, which determines at least one form of printing images, as one of at least one inkjet print head of the at least one first printing unit of the printing machine, and providing the respective output data as control data for respective nozzles to be used in print heads of at least one inkjet printing element of the printing machine, and generating output data for actuating nozzles of print heads of the at least one first printing unit of the printing machine, according to which coating medium is ejected through said nozzles of print heads to produce the at least one printed complete printing image from the stored template image data of the at least one complete printing image.

15. The method according to claim 1, further including compiling the secondary data packets using at least one image data computer, after which, generating the raster data from the secondary data packets by using of at least one raster data computer.

* * * * *